US009739140B2

(12) United States Patent
Zeller et al.

(10) Patent No.: US 9,739,140 B2
(45) Date of Patent: Aug. 22, 2017

(54) COMMUNICATION PROTOCOL IN DIRECTIONAL DRILLING SYSTEM, APPARATUS AND METHOD UTILIZING MULTI-BIT DATA SYMBOL TRANSMISSION

(71) Applicant: Merlin Technology, Inc., Kent, WA (US)

(72) Inventors: Rudolf Zeller, Seattle, WA (US); Gary Garrabrant, Seattle, WA (US); Timothy Bayliss, Maple Valley, WA (US); John E. Mercer, Gig Harbor, WA (US)

(73) Assignee: Merlin Technology, Inc., Kent, WA (US)

( * ) Notice: Subject to any disclaimer, the term of this patent is extended or adjusted under 35 U.S.C. 154(b) by 97 days.

(21) Appl. No.: 14/845,231

(22) Filed: Sep. 3, 2015

(65) Prior Publication Data
US 2016/0069180 A1 Mar. 10, 2016

Related U.S. Application Data

(60) Provisional application No. 62/143,104, filed on Apr. 4, 2015, provisional application No. 62/080,225, filed (Continued)

(51) Int. Cl.
*E21B 47/12* (2012.01)

(52) U.S. Cl.
CPC .................. *E21B 47/122* (2013.01)

(58) Field of Classification Search
CPC ...... E21B 47/122; E21B 17/028; E21B 47/12; E21B 47/16; G01V 11/002
(Continued)

(56) References Cited

U.S. PATENT DOCUMENTS 5,204,673 A * 4/1993 Kyle .................... G01V 11/002
                                                       175/40
5,633,589 A    5/1997 Mercer
(Continued)

FOREIGN PATENT DOCUMENTS

EP       0873465       3/2002
JP       02-021289     1/1990
(Continued)

OTHER PUBLICATIONS

International Preliminary Report on Patentability from the International Preliminary Examining Authority for International Application No. PCT/US2015/048692 which is associated with U.S. Appl. No. 14/845,231, Dec. 7, 2016, Moscow, Russia.
(Continued)

*Primary Examiner* — Omer S Khan
(74) *Attorney, Agent, or Firm* — Pritzkau Patent Group, LLC

(57) ABSTRACT

A system includes a transmitter for use in conjunction with a horizontal directional drilling system that transmits a multi-bit symbol stream that characterizes sensor symbols for receipt by an aboveground portable device. The portable device receives the symbol stream for aboveground recovery of the sensor signals. The transmitter can precisely place the symbol frequencies at least to avoid a noise environment, as well as to avoid powerline harmonics, and can utilize wave shaping for transmitted symbols at least to provide for transmission power control, spectral content control and wideband antenna matching. The receiver can measure the noise environment to identify the symbol frequencies used by the transmitter. The noise can be scanned at an incremental resolution across a wide frequency bandwidth for display or automatic symbol frequency selection.

69 Claims, 31 Drawing Sheets

Related U.S. Application Data on Nov. 14, 2014, provisional application No. 62/046,772, filed on Sep. 5, 2014.

(58) Field of Classification Search
USPC .................................................. 340/854.4
See application file for complete search history.

(56) References Cited

U.S. PATENT DOCUMENTS

| | | | |
|---|---|---|---|
| 6,005,532 | A | 12/1999 | Ng |
| 6,285,190 | B1 | 9/2001 | Brune et al. |
| 6,417,666 | B1 | 7/2002 | Mercer |
| 6,496,008 | B1 | 12/2002 | Brune et al. |
| 6,606,032 | B1 | 8/2003 | Fling |
| 6,727,704 | B2 | 4/2004 | Brune et al. |
| 6,737,867 | B2 | 5/2004 | Brune et al. |
| 6,756,783 | B2 | 6/2004 | Brune et al. |
| 7,151,375 | B2 | 12/2006 | Mercer et al. |
| 7,331,409 | B2 | 2/2008 | Cole et al. |
| 7,495,445 | B2* | 2/2009 | Mercer ............. E21B 47/02216 175/45 |
| 7,624,816 | B2 | 12/2009 | Cole et al. |
| 7,926,589 | B2 | 4/2011 | Mercer |
| 8,305,229 | B1 | 11/2012 | Gard |
| 8,729,901 | B2 | 5/2014 | Lam et al. |
| 8,981,780 | B2 | 3/2015 | Cole et al. |
| 9,274,243 | B2 | 3/2016 | Chau et al. |
| 9,540,879 | B2 | 1/2017 | Kolpack |
| 2002/0105331 | A1* | 8/2002 | Brune ................... E21B 47/02 324/326 |
| 2006/0055556 | A1* | 3/2006 | Memarzadeh .......... E21B 47/12 340/870.07 |
| 2008/0315879 | A1 | 12/2008 | Saha |
| 2013/0106615 | A1* | 5/2013 | Prammer ................. G01V 3/30 340/854.6 |
| 2013/0118810 | A1 | 5/2013 | Mercer |
| 2013/0175092 | A1 | 7/2013 | Kolpack |
| 2014/0144704 | A1 | 5/2014 | Cole et al. |
| 2014/0266771 | A1 | 9/2014 | Chau |

FOREIGN PATENT DOCUMENTS

| | | |
|---|---|---|
| JP | 2003-078500 | 3/2003 |
| WO | WO 2013/062949 | 5/2013 |
| WO | WO 2013/103875 | 7/2013 |

OTHER PUBLICATIONS

Digital Control Incorporated, DigiTrak Mark III Directional Drilling Locating System Operator's Manual, May 2008, Kent, Washington.

The International Search Report and The Written Opinion of the International Searching Authority for International Application No. PCT/US2015/048692 which is associated with U.S. Appl. No. 14/845,231, Dec. 10, 2015, Moscow, Russia.

Simon et al, Digital Communication Techniques, 1995, PTR Prentice Hall, Englewood Cliffs, New Jersey 07632, Chapter 4, pp. 178-201.

* cited by examiner

COMMUNICATION PROTOCOL IN DIRECTIONAL DRILLING SYSTEM, APPARATUS AND METHOD UTILIZING MULTI-BIT DATA SYMBOL TRANSMISSION

RELATED APPLICATIONS

The present application claims priority from U.S. Provisional Patent Application Ser. No. 62/046,772, filed on Sep. 5, 2014, U.S. Provisional Patent Application Ser. No. 62/080,225 filed on Nov. 14, 2014, and U.S. Provisional Patent Application Ser. No. 62/143,104, filed on Mar. 4, 2015, each of which is hereby incorporated by reference in its entirety.

BACKGROUND

The present application is generally related to the field of communications relating to an inground device and, more particularly, to advanced inground device communication protocol using multi-bit data symbol and associated methods.

A technique that is often referred to as horizontal directional drilling (HDD) can be used for purposes of installing a utility without the need to dig a trench. A typical utility installation involves the use of a drill rig having a drill string that supports a boring tool at a distal or inground end of the drill string. The drill rig forces the boring tool through the ground by applying a thrust force to the drill string. The boring tool is steered during the extension of the drill string to form a pilot bore. Upon completion of the pilot bore, the distal end of the drill string is attached to a pullback apparatus which is, in turn, attached to a leading end of the utility. The pullback apparatus and utility are then pulled through the pilot bore via retraction of the drill string to complete the installation. In some cases, the pullback apparatus can comprise a back reaming tool which serves to expand the diameter of the pilot bore ahead of the utility so that the installed utility can be of a greater diameter than the original diameter of the pilot bore.

Steering of a boring tool can be accomplished in a well-known manner by orienting an asymmetric face of the boring tool for deflection in a desired direction in the ground responsive to forward movement. In order to control this steering, it is desirable to monitor the orientation of the boring tool based on sensor readings obtained by sensors that form part of an electronics package that is supported by the boring tool. The sensor readings, for example, can be modulated onto a locating signal that is transmitted by the electronics package for reception above ground by a portable locator or other suitable above ground device. In some systems, the electronics package can couple a carrier signal modulated by the sensor readings onto the drill string to then transmit the signal to the drill rig by using the drill string as an electrical conductor. Irrespective of the manner of transmission of the sensor data and for a given amount of transmission power, there is a limited transmission range at which the sensor data can be recovered with sufficient accuracy. The transmission range can be still further limited by factors such as, for example, electromagnetic interference that is present in the operational region. One prior art approach, in attempting to increase transmission range, is to transmit data from the boring tool or other inground tool at what Applicants refer to herein as a "magic frequency." The latter can be characterized as a carrier frequency that remarkably avoids environmental interference to provide for effective reception range despite the wide variety of environmental interference that may be encountered. As will be further discussed, Applicants submit that such a magic frequency does not exist at least on the basis of application to any sort of broad geographic region and particularly on the basis of worldwide application. Another prior art approach is simply to increase the transmission power. Applicants recognize, however, that this approach can be of limited value, particularly when the inground electronics package is powered by batteries. Still another prior art approach resides in lowering the data or baud rate at which data is modulated onto the locating signal. Unfortunately, this approach is attended by a drop in data throughput.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a transmitter and associated method are described for use in conjunction with a horizontal directional drilling system that includes a drill string that extends from a drill rig to an inground tool that supports the transmitter such that extension and retraction of the drill string moves the inground tool through the ground during an inground operation. The transmitter includes an antenna and one or more sensors for generating one or more sensor signals. A processor is configured for generating a multi-bit symbol stream based on the sensor signals. An antenna driver arrangement is configured for electrically driving the antenna to emit a dipole locating signal, as a depth signal, for aboveground reception at least for use in determining a depth of the inground tool and for electrically driving the antenna based on the multi-bit symbol stream to emit an electromagnetic symbol stream for aboveground recovery of the sensor signals.

In another aspect of the disclosure, a transmitter and associated method are described for use in conjunction with a horizontal directional drilling system that includes a drill string that extends from a drill rig to an inground tool that supports the transmitter such that extension and retraction of the drill string moves the inground tool through the ground during an inground operation. The transmitter includes an antenna and one or more sensors for generating one or more sensor signals. A direct digital synthesizer is configured for generating a symbol stream, made up of a plurality of fixed-frequency symbols, and the direct digital synthesizer is configured to customize a drive waveform shape for different symbol frequencies. An antenna driver is configured for electrically driving the antenna based on the symbol stream to emit an electromagnetic symbol stream for aboveground recovery of the sensor signals.

In still another aspect of the disclosure, a transmitter and associated method are described for use in conjunction with a horizontal directional drilling system that includes a drill string that extends from a drill rig to an inground tool that supports the transmitter such that extension and retraction of the drill string moves the inground tool through the ground during an inground operation. The transmitter includes an antenna and one or more sensors for generating one or more sensor signals. A processor is configured for generating a multi-bit symbol stream based on the sensor signals. An antenna driver arrangement is configured for electrically driving the antenna based on the multi-bit symbol stream to emit an electromagnetic symbol stream at least for aboveground recovery of the sensor signals.

In yet another aspect of the disclosure, a portable device and associated method are described for use in conjunction with a transmitter that is configured to move through the ground in a region during an operational procedure while transmitting a transmitter signal that is receivable by the portable device subject to electromagnetic noise that can vary within the region. The portable device includes a receiver configured to receive the transmitter signal as a multibit symbol stream which at least characterizes a set of sensor information relating to the operation of the transmitter during the inground operation to recover the set of sensor information.

In a continuing aspect of the disclosure, a portable device and associated method are described for use in conjunction with a transmitter that is configured to move through the ground in a region during an operational procedure while transmitting a transmitter signal that is receivable by the portable device subject to electromagnetic noise that can vary within the region. The portable device includes a receiver configured to (i) measure the electromagnetic noise and identify a set of symbol frequencies in response to the measured electromagnetic noise for subsequent transmission from the transmitter to form a multi-bit symbol stream based on the set of symbol frequencies, each of which multi-bit symbols corresponds to one of the symbol frequencies, at least to characterize sensor information relating to the operation of the transmitter, and (ii) receive the multibit symbol stream from the transmitter during the inground operation to recover the sensor information.

In a further aspect of the disclosure, a portable device and associated method are described for use in conjunction with a transmitter that is configured to move through the ground in a region during an operational procedure while transmitting a transmitter signal that is receivable by the portable device subject to electromagnetic noise that can vary within the region. The portable device includes a receiver configured to (i) measure the electromagnetic noise and identify a set of symbol frequencies in response to the measured electromagnetic noise for subsequent transmission from the transmitter at least to characterize sensor information relating to the operation of the transmitter, (ii) receive the symbol frequencies from the transmitter during the inground operation to recover the sensor information and (iii) allocate a transmit power to each of the symbol frequencies.

In another aspect of the disclosure, a portable device and associated method are described for use in conjunction with a transmitter that is configured to move through the ground in a region during an operational procedure while transmitting a transmitter signal that is receivable by the portable device subject to electromagnetic noise that can vary within the region. The portable device includes a receiver configured to receive a packet structure from the transmitter that is made up of a plurality of multi-bit symbols in the symbol stream including at least one group of multi-bit symbols characterizing the sensor information as packet data and at least another group of multi-bit symbols serving as a block of error correction data, the packet data characterizing a set of sensor information relating to the operation of the transmitter during the inground operation. A slicer is configured for receiving each multi-bit symbol as a plurality of symbol slices that are spaced apart in time and each symbol slice includes a set of symbol frequency magnitudes including a magnitude for each symbol frequency. A spectrogram buffer includes a length made up of a series of slice positions, each of which slice positions is configured to store one set of the symbol frequency magnitudes, and the length of the spectrogram buffer is sufficient to store a total number of symbol slices corresponding to a time duration of the packet structure. A time slice switch is configured for routing the symbol slices to the slice positions of the spectrogram buffer to sequentially and selectively store the set of symbol frequency magnitudes associated with each successive symbol slice. A decoder is configured to detect, as part of recovering the packet data, a start symbol of the packet structure in the spectrogram buffer based on the block of error correction data.

In yet another aspect of the disclosure, a system and associated method are described for use with a horizontal directional drilling system that includes a drill string that extends from a drill rig to an inground tool such that extension and retraction of the drill string moves the inground tool through the ground during an inground operation. The system includes a transmitter that is supported by the inground tool including an antenna, one or more sensors for generating one or more sensor signals, a processor configured for generating a multi-bit symbol stream based on the sensor signals, and an antenna driver for electrically driving the antenna to emit an electromagnetic symbol stream based on the multi-bit symbol stream. The system further includes a portable device including a receiver configured to receive the multibit symbol stream in a normal mode during the inground operation to recover the set of sensor information subject to the electromagnetic noise.

In still another aspect of the disclosure, a transmitter and associated method are described for use with a horizontal directional drilling system that includes a drill string that extends from a drill rig to an inground tool that supports the transmitter such that extension and retraction of the drill string moves the inground tool through the ground during an inground operation. The transmitter includes an antenna and one or more sensors for generating one or more sensor signals. A modulator is configured for generating at least one modulated data frequency at a carrier frequency based on the sensor signals. A depth tone generator is configured for producing an unmodulated depth tone frequency that is twenty or more times less than the carrier frequency and an antenna driver for electrically driving at least one antenna to emit the depth tone frequency and the carrier frequency for aboveground detection of the depth tone frequency and for recovery of the sensor signals from the modulated data frequency.

In a further aspect of the disclosure, a portable device and associated method are described for use in conjunction with a horizontal directional drilling system that includes a drill string that extends from a drill rig to an inground tool such that extension and retraction of the drill string moves the inground tool through the ground during an inground operation and the inground tool supports a transmitter that transmits an electromagnetic signal for detection by the portable device such that extension and retraction of the drill string moves the inground tool through the ground during an inground operation. The portable device includes a receiver for detecting the signal with the transmitter above ground in a first operational mode and below a surface of the ground in a second operational mode and a processor configured for selective operation in (i) the first mode to determine an above ground range from the portable device to the transmitter based on an above ground measured signal strength of the electromagnetic signal and a surface effect compensation, and (ii) the second mode with the transmitter in the ground to determine a depth of the transmitter below the surface based on a below ground measured signal strength of the electromagnetic signal.

In yet another aspect of the disclosure, a system and associated method for use in horizontal directional drilling are described, the system includes a drill string that extends from a drill rig to an inground tool such that extension and retraction of the drill string moves the inground tool through the ground during an inground operation. The system includes a transmitter that includes one or more sensors for measuring one or more operational parameters characterizing the status of the inground tool, wherein the transmitter transmits at two or more frequencies with at least one of such frequencies itself representing multiple data bits characterizing the status of the inground tool irrespective of any modulation of the frequencies. A portable device, as another part of the system, includes a receiver configured to receive the two or more frequencies and a processor configured to recover the status of the inground tool from the two or more frequencies. An associated portable device, transmitter and methods are also described.

BRIEF DESCRIPTIONS OF THE DRAWINGS

Example embodiments are illustrated in referenced figures of the drawings. It is intended that the embodiments and figures disclosed herein are to be illustrative rather than limiting.

FIG. 6b is a diagrammatic illustration of one embodiment of a screen shot showing a display 36 including a bar graph display illustrating the average noise per frequency sub-band for the embodiment of sub-bands initially shown in FIG. 5a.

FIG. 10a is an expanded view of frequency sub-band 6 from FIG. 6a.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

A bit, for purposes of the present application, is a binary data value having two states characterized such as 1/0, +/−, and the like. A symbol, for purposes of the present disclosure, is a data value that represents one or more bits. A multi-bit symbol represents two or more bits. A symbol can characterize any suitable type of information such as, for example, pitch data, roll data, temperature data, battery data and synchronization data, without limitation. Different multi-bit symbols represent different, multi-bit data values. For example, 16 different symbols can represent a four bit data value. Each multi-bit symbol, for purposes of the present disclosure, is represented by a distinct frequency that is different from the frequency that is associated with any other multi-bit symbol. A symbol stream is made up of a serial transmission of multi-bit symbols such that the symbol stream is decodable into a corresponding digital data stream, which can be binary. The symbol stream can be transmitted subject to a packet structure such that the particular position of a given symbol within the packet structure defines a data type that is associated with that symbol.

Figure 1:
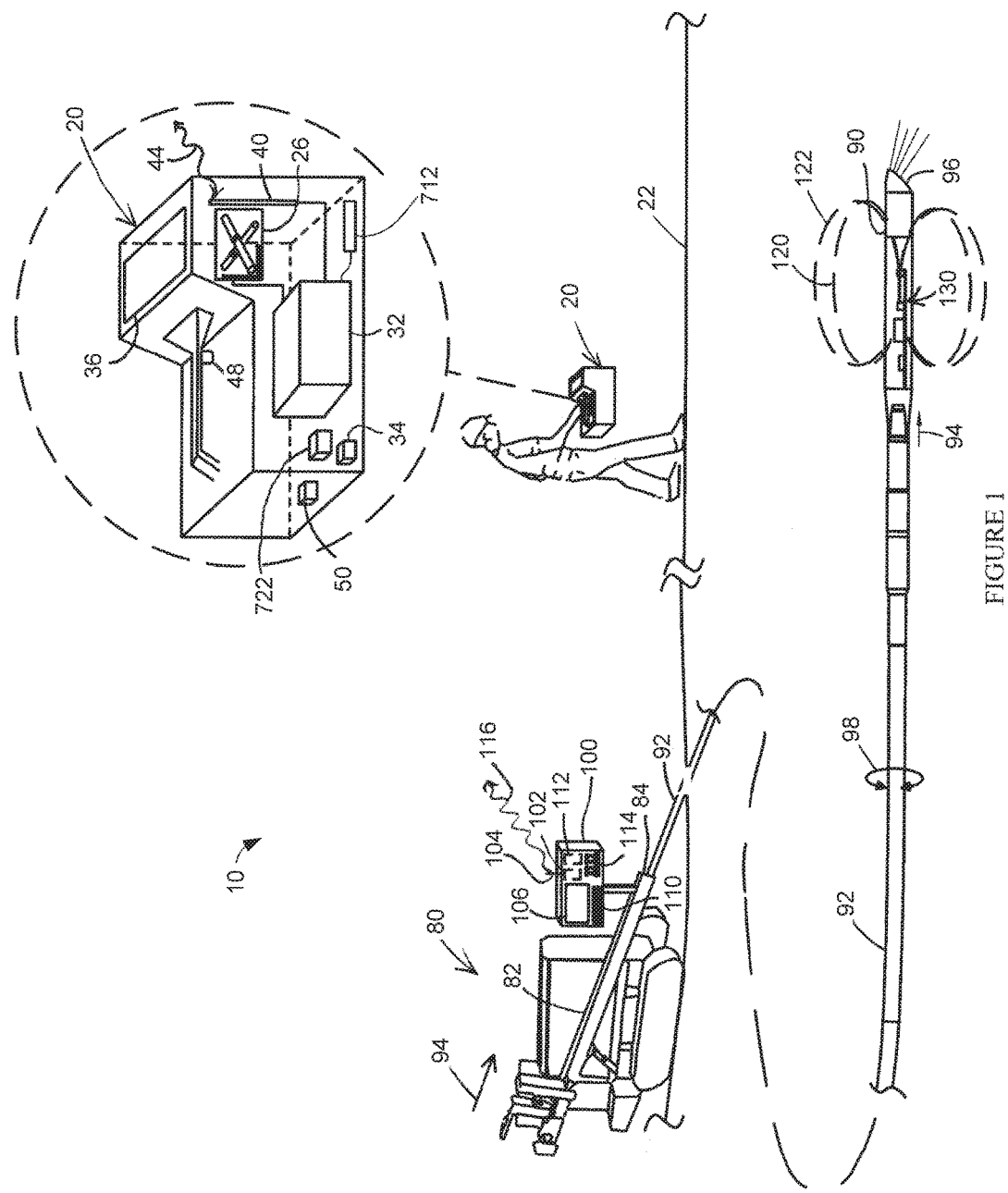
FIG. 1 is a diagrammatic view of an embodiment of a system for performing an inground operation in accordance with the present disclosure using an advanced communication protocol and methods.

Turning now to the drawings, wherein like items may be indicated by like reference numbers throughout the various figures, attention is immediately directed to FIG. 1, which illustrates one embodiment of a system for performing an inground operation, generally indicated by the reference number 10. The system includes a portable device 20 that is shown being held by an operator above a surface 22 of the ground as well as in a further enlarged inset view. It is noted that only limited inter-component cabling is shown within device 20 in order to maintain illustrative clarity, but all necessary cabling is understood to be present and may readily be implemented by one having ordinary skill in the art in view of this overall disclosure. Device 20 includes a three-axis antenna cluster 26 measuring three orthogonally arranged components of magnetic flux. One embodiment of a useful antenna cluster contemplated for use herein is disclosed by U.S. Pat. No. 6,005,532 which is commonly owned with the present application and is incorporated herein by reference. Details with respect to the embodiment of the antenna utilized herein will be provided at an appropriate point hereinafter. Antenna cluster 26 is electrically connected to an electronics section 32. A tilt sensor arrangement 34 may be provided for measuring gravitational angles from which the components of flux in a level coordinate system may be determined. An appropriate tilt sensor includes, by way of non-limiting example, a triaxial accelerometer.

Device 20 can further include a graphics display 36 and a telemetry antenna 40. The latter can transmit or receive a telemetry signal 44 for data communication with the drill rig. It should be appreciated that graphics display 36 can be a touch screen in order to facilitate operator selection of various buttons that are defined on the screen and/or scrolling can be facilitated between various buttons that are defined on the screen to provide for operator selection. Such a touch screen can be used alone or in combination with an input device 48 such as, for example, a trigger button. The latter can be used without the need for a touch screen. Moreover, many variations of the input device may be employed and can use scroll wheels and other suitable forms of selection device either currently available or yet to be developed. The electronics section can include components such as, for example, one or more processors, memory of any appropriate type, antenna drivers and analog to digital converters. As is well known in the art, the latter should be capable of detecting a frequency that is at least twice the frequency of the highest frequency of interest. Other components may be added as desired such as, for example, a magnetometer 50 to aid in position determination relative to the drill direction and ultrasonic transducers for measuring the height of the device above the surface of the ground.

Still referring to FIG. 1, system 10 further includes drill rig 80 having a carriage 82 received for movement along the length of an opposing pair of rails 84. An inground tool 90 is attached at an opposing end of a drill string 92. By way of non-limiting example, a boring tool is shown as the inground tool and is used as a framework for the present descriptions, however, it is to be understood that any suitable inground device may be used such as, for example, a reaming tool for use during a pullback operation or a mapping tool. Generally, drill string 92 is made up of a plurality of removably attachable drill pipe sections such that the drill rig can force the drill string into the ground using movement in the direction of an arrow 94 and retract the drill string responsive to an opposite movement. The drill pipe sections can define a through passage for purposes of carrying a drilling mud or fluid that is emitted from the boring tool under pressure to assist in cutting through the ground as well as cooling the drill head. Generally, the drilling mud also serves to suspend and carry out cuttings to the surface along the exterior length of the drill string. Steering can be accomplished in a well-known manner by orienting an asymmetric face 96 of the boring tool for deflection in a desired direction in the ground responsive to forward, push movement which can be referred to as a "push mode." Rotation or spinning 98 of the drill string by the drill rig will generally result in forward or straight advance of the boring tool which can be referred to as a "spin" or "advance" mode.

The drilling operation can be controlled by an operator (not shown) at a control console 100 which itself includes a telemetry transceiver 102 connected with a telemetry antenna 104, a display screen 106, an input device such as a keyboard 110, a processing arrangement 112 which can include suitable interfaces and memory as well as one or more processors. A plurality of control levers 114, for example, control movement of carriage 82. Telemetry transceiver 104 can transmit or receive a telemetry signal 116 to facilitate bidirectional communication with portable device 20. In an embodiment, screen 106 can be a touch screen such that keyboard 110 may be optional.

In an embodiment, device 20 is configured for receiving an electromagnetic depth signal 120 and an electromagnetic data signal 122 that are transmitted from a transmitter 130 that is supported within the boring tool or other inground tool. These signals may be referred to collectively herein as the transmitter signals. The transmitter signals can be dipole signals. It should be appreciated that the portable device can be operated in either a walkover locating mode, as illustrated by FIG. 1, or in a homing mode having the portable device placed on the ground, for example, as illustrated by U.S. Published Patent Application no. 2013/0175092 which is incorporated by reference in its entirety. While the present disclosure illustrates a dipole locating field transmitted from the boring tool and rotated about the axis of symmetry of the field, the present disclosure is not intended as being limiting in that regard.

Information carried by the data signal can include, but is not limited to position orientation parameters based on pitch and roll orientation sensor readings, temperature values, pressure values, battery status, tension readings in the context of a pullback operation, and the like. Device 20 receives the transmitter signals using antenna array 26 and processes received data signal 122 to recover the data, as will be further described.

Figure 2:
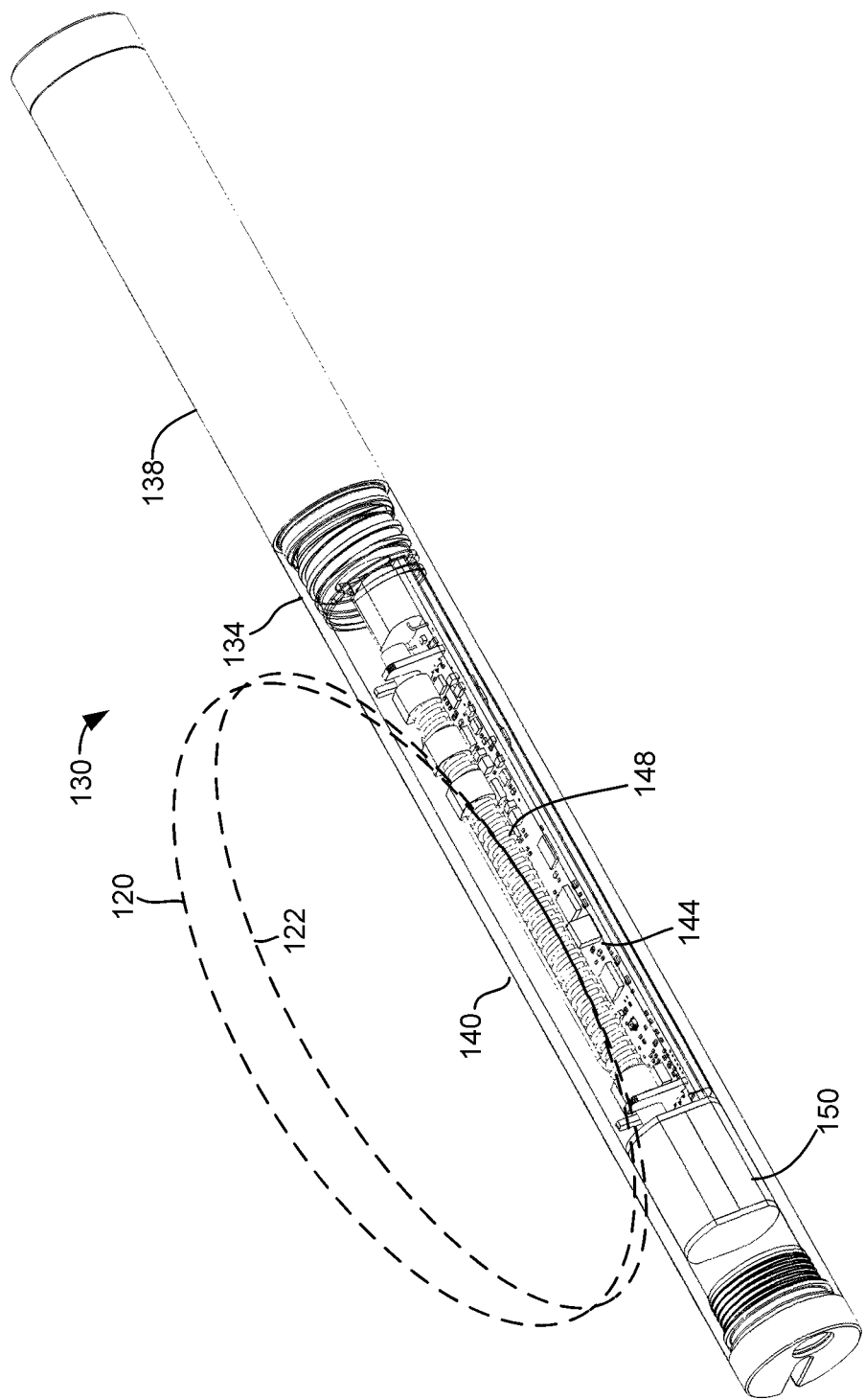
FIG. 2 is a diagrammatic, partially cutaway view, in perspective, which illustrates an embodiment of a transmitter produced in accordance with the present disclosure.

FIG. 2 is a diagrammatic, partially cutaway view, in perspective, which illustrates an embodiment of transmitter 130. The latter includes a main housing 134 that can be at least generally cylindrical in configuration. A battery compartment 138 can be formed at one end of the housing with an opposing end 140 supporting a main printed circuit board (PCB) 144 which itself can support an antenna 148 that emits the transmitter signals. An accelerometer module 150 can be positioned adjacent to one end of PCB 144. Other sensors and components can be located on the main printed circuit board, as will be further described.

Figure 3:
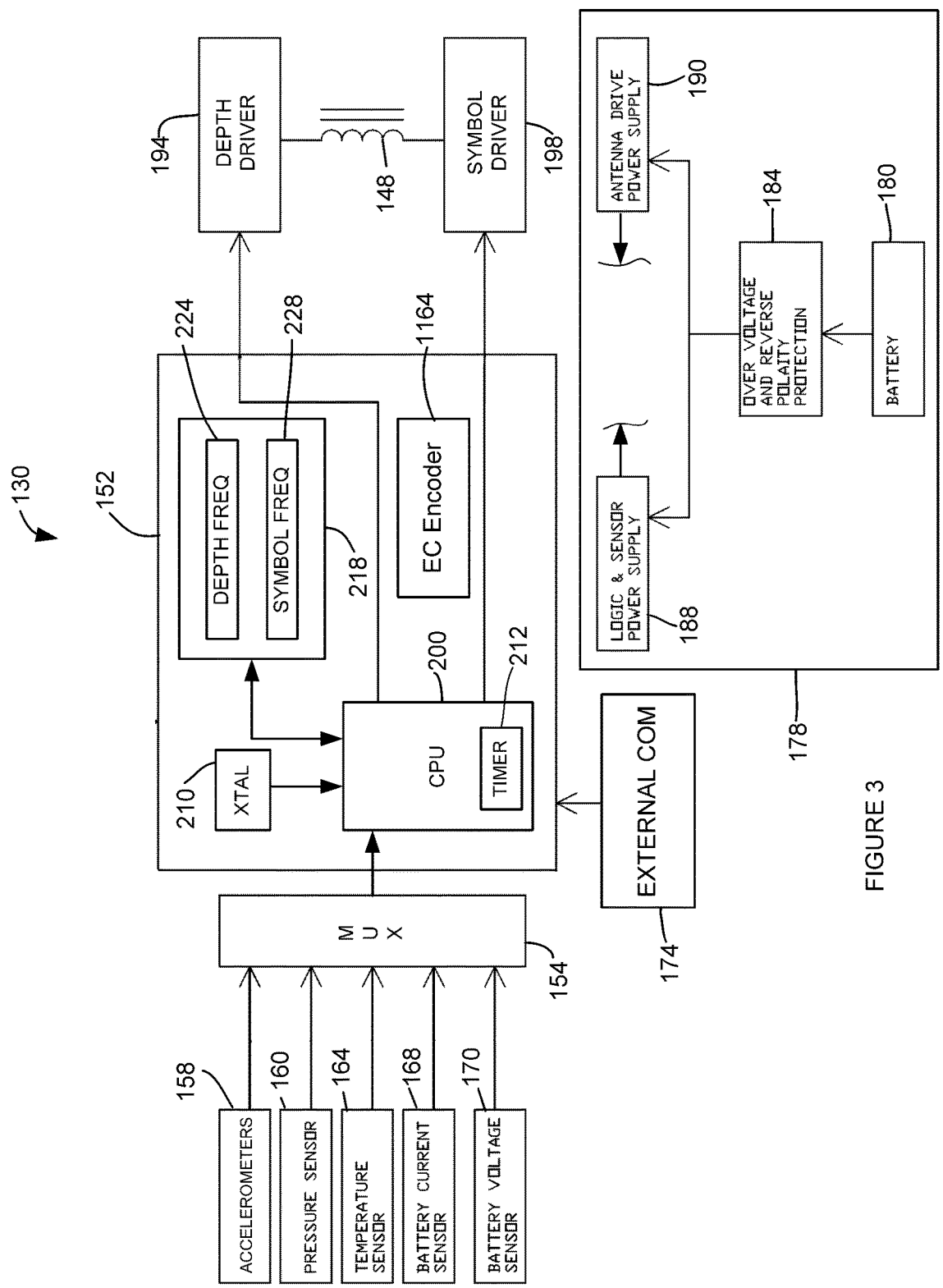
FIG. 3 is a block diagram illustrating additional details of the transmitter with respect to the embodiment of FIG. 2.

Attention is now directed to the block diagram of FIG. 3 in conjunction with FIG. 2 for purposes of describing additional details with respect to an embodiment of transmitter 130. The transmitter includes a processing section 152 that receives sensor information via a multiplexer 154. The multiplexer can be interfaced with any number of sensors forming a sensor suite. In the present example, the sensors include accelerometers 158 that are supported in accelerometer module 150 of FIG. 2, a pressure sensor 160 which can be used to sense the annular pressure within the borehole around the transmitter, a temperature sensor 164, a battery current sensor 168 and a battery voltage sensor 170. External communication for the transmitter can be provided, in some embodiments, by an external communication connection 174. Such communication is not required to be transmitted through the ground but rather can be performed while the transmitter is above ground, for example, in a position adjacent to device 20. The external communication can be implemented in any suitable manner including but not limited to IrDA, NFC, Wi-Fi, Zigbee or Bluetooth. A power supply section 178 can comprise a battery 180 that provides power via an overvoltage and reverse polarity detector 184. The latter provides electrical power to a logic and sensor power supply 188 and to an antenna drive power supply 190. The logic and sensor power supply provides power to the sensor suite as well as to processing section 152. The antenna drive power supply feeds electrical power to a depth antenna driver 194 and a data antenna driver 198 which electrically drive opposing ends of an antenna coil forming part of antenna 148. Drivers 194 and 198, in an embodiment, can be half bridge drivers. The antenna drivers receive input signals from a processor 200 that forms part of the processing section. The processing section further includes an oscillator 210 such as, for example, a crystal oscillator. The oscillator can be selected to provide a relatively high degree of temperature and overall stability. Processor (CPU) 200 includes a timer section 212 that can serve to generate a reference signal having a stability that reflects the stability of oscillator 210. The output frequency of the timer is selectable based on a reload timer value that can be specified by the user. The processor is in data communication with a memory 218 which can include any suitable information including, but not limited to depth frequency information 224 and symbol frequency information 228, each of which will be described at an appropriate points hereinafter.

Figure 4:
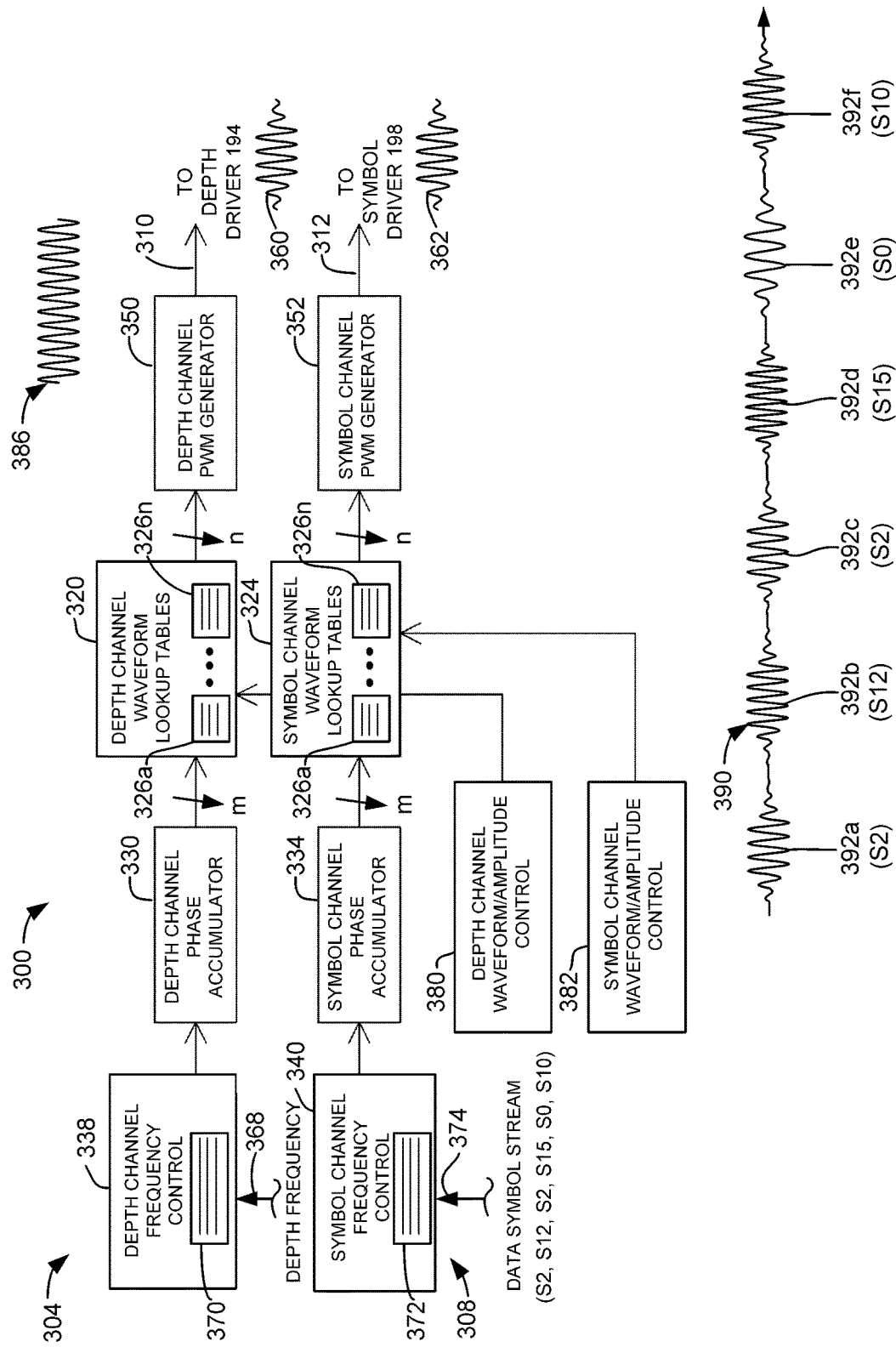
FIG. 4 is a block diagram illustrating details of an embodiment of a frequency synthesizer which forms part of the embodiment of the transmitter of FIGS. 2 and 3.

Turning to FIG. 4, an embodiment of a frequency synthesizer is generally indicated by the reference number 300 and is implemented as part of processing section 152 of FIG. 3. It should be appreciated that the frequency synthesizer can be implemented in hardware, software or any suitable combination thereof. The embodiment of FIG. 4 is a two channel direct digital synthesizer (DDS) having a depth channel 304 and a symbol channel 308. The depth channel provides an output signal 310 to depth driver 194 of FIG. 3 for producing depth signal 120 while the symbol channel provides an output signal 312 to data driver 198 of FIG. 3 for producing data signal 122 (FIGS. 1 and 2). A depth channel waveform lookup table section 320 and a symbol channel waveform lookup table section 324 each includes at least one waveform or phase lookup table that characterizes one period of a selected waveform such as, for example, a sinusoid. In another embodiment, each of the depth channel lookup table section and the symbol channel lookup table section can include a plurality of waveform or phase lookup tables. In the present example, there are n waveform lookup tables diagrammatically shown and indicated by the reference numbers 326*a-n*. It should be appreciated that any desired waveform or waveforms can be characterized by the lookup tables. Further, there is no requirement for the depth channel lookup table(s) and the symbol channel lookup table(s) to characterize the same waveform(s). Each waveform lookup table 326*a-n* can include a large number of samples of the magnitude of the characterized waveform based, for example, on the amount of memory that is available and the desired resolution. The samples are selectively addressable by a depth channel phase accumulator 330 and a symbol channel phase accumulator 334, respectively, using an m-wide addressing arrangement. Each phase accumulator is configured to provide an output count to its respective waveform lookup table section based on an input increment or offset size that is provided by a depth channel frequency control 338 and a symbol channel frequency control 340, respectively. In the present embodiment, the particular one of the waveform lookup tables 326a-n to be used at any given time for each of the depth channel and the symbol channel is based on the frequency to be generated, as will be further described. Each phase accumulator generates what can be described as a quantized sawtooth waveform output that changes from one level or count to the next by a respective one of the input increment sizes. In response to each respective phase accumulator input count, the depth channel lookup table that is currently in use and the symbol channel lookup table that is currently in use sequentially generate digital output magnitudes that are received by a depth channel pulse width modulator (PWM) generator 350 and a symbol channel pulse width modulator (PWM) generator 352, respectively, on an n-wide address arrangement. Based on the magnitude value received by each PWM generator, a pulse width modulator generates an output pulse train having an at least generally constant output magnitude but with a pulse width that increases in proportion to the output magnitude value from each lookup table. Filtering, via the inductive properties of antenna 148, smoothes the waveform to approximate a desired output waveform such as, for example, a sinusoidal waveform.

Still referring to FIG. 4, each of a depth channel output waveform 360 and a symbol channel output waveform 362 can be generated, for example, across a frequency range approaching 0 Hz to 45 KHz with a high degree of accuracy. It should be appreciated that any suitable frequency range can be utilized and the range of 0 to 45 KHz has been described by way of example and is not intended to be limiting. In the present embodiment, the accuracy can be at least approximately +/−0.1 Hz or less at a resolution of at least approximately 5 Hz. It is noted that the specified accuracy, in the context of the present embodiment, is given for at least approximately 45 KHz which represents a lower limit on accuracy across the frequency range. As compared to prior art approaches, it should be appreciated that the present disclosure provides for higher precision, greater consistency and remarkable flexibility with respect to frequency placement across the entire transmission bandwidth. Output frequencies 360 and 362 are established based on the input increment size provided to depth channel phase accumulator 330 via depth channel frequency control 338 and symbol channel phase accumulator 334 via symbol channel frequency control 340. Depth channel frequency control 338 receives a depth frequency input 368 that specifies the depth frequency. The depth channel frequency control can convert a specified depth frequency to an increment size for depth channel phase accumulator 330 in any suitable manner. In an embodiment, the depth channel frequency control can include an increment lookup table 370 that indexes depth frequency against the increment size. In another embodiment, a formula can be used to determine the increment size, as follows:

$$\text{increment size} = \frac{(\text{desired frequency}) \times (\text{phase accumulator size})}{(\text{phase accumulator update rate})} \quad \text{(EQN 1)}$$

Where the phase accumulator size is chosen to provide the minimum required frequency resolution and the phase accumulator update rate is established by timer 212 (FIG. 3). Similarly, the symbol channel frequency control can convert a specified symbol frequency received on a data symbol stream input 374 to an increment size for symbol channel phase accumulator 334 in any suitable manner such as, for example, by using an increment lookup table 372 or a formula. The origin of the data symbol stream for data symbol stream input 374 will be described at an appropriate point hereinafter. It is noted that there is no requirement for the depth and symbol channel frequency controllers to use an identical increment size lookup table. Table 1 below illustrates a portion of increment lookup table 372.

TABLE 1

Desired Output Frequency vs. Phase Accumulator Size Increment

| Desired Output Frequency (Hz) | Phase Accumulator Increment (counts) |
|---|---|
| 5 | 1 |
| 50 | 10 |
| 500 | 100 |
| 32770 | 6554 |
| 45000 | 9000 |

Based on Table 1, it should be appreciated that a high degree of resolution is provided in terms of the frequency that is selectable for each of depth output frequency 360 and symbol output frequency 362. In the present embodiment, a resolution of 5 Hz can be provided across the entire frequency range extending from worldwide AC powerline frequencies to 45 KHz. Of course, other embodiments can utilize a like or different resolution to even higher frequencies. Other resolutions can be used, some of which are larger and some of which are even more fine, however, Applicants recognize that 5 Hz represents a relatively small common multiple of 50 Hz and 60 Hz which are the predominant powerline frequencies around the world. Further discussions with respect to powerline frequencies will be presented below.

With continuing reference to FIG. 4, it should be appreciated that depth output frequency 360 and symbol output frequency 362 are illustrated as frequency tones that are of a limited or fixed duration, an at least essentially fixed frequency and can include a variable magnitude. Magnitude/amplitude shaping can be accomplished using a depth channel waveform/amplitude control 380 for the depth channel which may be referred to as a depth channel shaper and a symbol channel waveform/amplitude control 382 which may be referred to as a symbol channel shaper. Another example output of depth channel PWM generator 350 is a continuous depth signal 386 which is of at least essentially a continuous magnitude. In this instance, depth channel shaper 380 may not be needed, although it should be understood that its operation reflects the operation of the symbol channel shaper, as described herein. It should be appreciated that the depth of the transmitter, based on depth signal 386, can be determined based on the well-known dipole equations, as described for example, in U.S. Pat. No. 5,633,589 which is incorporated herein by reference. Another example output 390 of symbol channel PWM generator 352 illustrates a series of output symbols indicated as 392a-392f which can vary in frequency from one symbol to the next. As will be further described, output 390 can comprise a symbol stream. In the present embodiment, there is no gap or zero magnitude space present or inserted between adjacent symbols by phase accumulator 334. Thus, the frequency can change abruptly from one symbol to the next in a way that can introduce noise responsive to such abrupt frequency transitions. It should be appreciated that symbols 392a-392f are shaped in a way that avoids abrupt frequency transitions by beginning and ending at a value of approximately zero magnitude. Such shaping can be accomplished through the application of a suitable window or tapering function by symbol channel shaper 382 such as, for example, a Hamming window, Hann window, Welch window or a triangular window, among others. What is common to all of the subject window functions resides in a zero magnitude of the waveform for any point that is outside of a window interval such that each symbol starts and ends with a zero magnitude waveform.

Figure 5A:
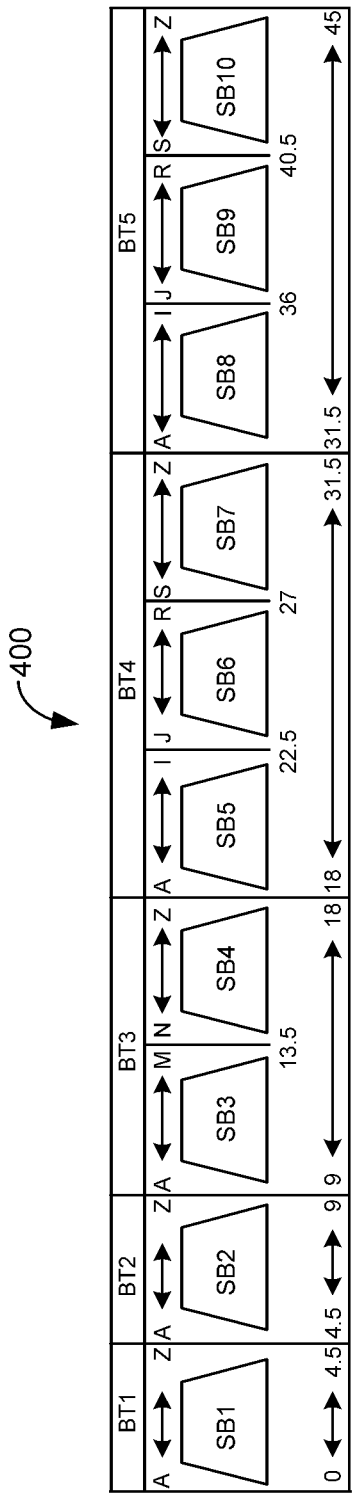
FIG. 5a is a diagrammatic representation of an embodiment of frequency bands and sub-bands based on which various embodiments of a transmitter according to the present disclosure can be configured.

Attention is now directed to FIG. 5a in conjunction with FIG. 2. Although not a requirement, embodiments of transmitter 130 can be configured to transmit depth signal 120 and data signal 122 using a series of transmitter bands, generally indicated by the reference number 400 that extend from approximately 0 to 45 KHz. It should be understood that other embodiments can use different transmitter bands and sub-bands with the present embodiment serving by way of a non-limiting example. While the value of zero is listed as a lower limit, it should be understood that the actual lower limit can be represented by worldwide predominant power line frequencies or some higher value. The transmitter bands are indicated as BT1-BT5 and are also set forth in Table 2. While the descriptive framework employed by Table 2 uses transmitter bands that include frequency sub-bands, it will become evident below that the concept of transmitter bands is not generally applicable to embodiments of a wideband transmitter, yet to be described, even though the term sub-band is considered to be applicable to a wideband transmitter in the sense of defining some limited portion of the overall bandwidth across which the wideband transmitter is capable of transmitting.

TABLE 2

Transmitter Bands and Sub-Bands

| Transmitter Band | Band Frequency Range | Sub-Band No. | Sub-Band Frequency Range |
| --- | --- | --- | --- |
| BT1 | 0-4.5 KHz | SB1 | 0 to 4.5 KHz |
| BT2 | 4.5 KHz-9 KHz | SB2 | 4.5 KHz to 9 KHz |
| BT3 | 9 KHz-18 KHz | SB3 | 9 KHz to 13.5 KHz |
|  |  | SB4 | 13.5 KHz to 18 KHz |
| BT4 | 18 KHz-31.5 KHz | SB5 | 18 KHz to 22.5 KHz |
|  |  | SB6 | 22.5 KHz to 27 KHz |
|  |  | SB7 | 27 KHz to 31.5 KHz |
| BT5 | 31.5 KHz-45 KHz | SB8 | 31.5 KHz to 36 KHz |
|  |  | SB9 | 36 KHz to 40.5 KHz |
|  |  | SB10 | 40.5 KHz to 45 KHz |

Still referring to FIG. 5a, the frequency range from 0 to 45 KHz, in accordance with the present embodiment, is further divided into 10 sub-bands SB1-SB10, each of which is 4.5 KHz in width. Each band above BT1 and sub-band 1 can be considered as including its lower frequency limit. It should be appreciated that any individual transmitter can be configured for transmission in one of transmitter bands BT1-BT5. The use of the transmitter bands, although not required, allows for matching antenna 148 (FIG. 2) to the transmitter band such that transmission efficiency is at least near optimal. While transmitter bands BT1 and BT2 each include a single sub-band, it is noted that transmitter band BT3 includes two sub-bands, SB3 and SB4, and transmitter bands BT4 and BT5 each include three sub-bands: SB5-SB7 and SB8-SB10, respectively. An embodiment of a transmitter according to the present disclosure can be configured to transmit depth signal 120 and data signal 122 in a single sub-band. In another embodiment, a transmitter can be configured to transmit depth signal 120 in a sub-band that is different from the sub-band that is used for data signal 122. In this regard, it should be appreciated that the use of a separate synthesizer channel (FIG. 4) for the depth channel provides for a great degree of flexibility with regard to the frequency of the depth signal in relation to the data signal. In still another embodiment, a transmitter can be configured to transmit on multiple sub-bands. For example, a transmitter configured to transmit on transmitter band BT3 can transmit on both SB3 and SB4. As another example, a wideband transmitter, as further described below, can transmit on two or more sub-bands, such as SB4 and SB10 such that the sub-bands can even be spaced apart by other sub-bands. With regard to the aforementioned wideband transmitter, which is described immediately hereinafter, it will be apparent that the concept of transmitter bands can be thought of as inapplicable since a single antenna can be used for the entire bandwidth of the transmitter.

In some embodiments, transmitter 300 can be configured to cooperate with antenna 148 such that transmitter 130 transmits over a wide frequency range or band extending from a lowermost frequency to approximately 45 KHz or higher. In this way, this wide frequency band can be covered by a single wideband transmitter, using a single antenna, while maintaining suitable efficiency with respect to power consumption across the entire wide frequency range. It should be appreciated that, in the absence of the provisions described immediately hereinafter for at least part of the wide frequency range, an unmatched condition between the antenna and the input frequency can produce unacceptable battery power consumption to achieve the same RF output power.

Referring again to FIG. 4, in order to transmit across an entire frequency range from a lowermost frequency to approximately 45 kHz, by way of non-limiting example, embodiments of depth channel lookup table section 320 and symbol channel lookup table section 324 can be configured to include sets of lookup tables 326a-n. Any suitable number, n, of lookup tables can be used in each set. Depth channel phase accumulator 330 and symbol channel phase accumulator 334 can be configured to utilize the appropriate depth channel lookup table and symbol channel lookup table, respectively, based on the frequency to be generated. As will be described in further detail at an appropriate point hereinafter, each individual lookup table of these sets of lookup tables can be customized to drive antenna 148 in a way that maintains power at an at least generally constant power consumption over a portion of the overall wide transmission bandwidth such that the combination of lookup tables maintains a desired level of power consumption over the entire wide transmission bandwidth. Each lookup table can be configured for driving the antenna not only based on providing a particular wave shape but also using a selected drive waveform magnitude. Accordingly, transmission power and transmitter power consumption can be controlled or regulated, at least in part, based on the magnitude of the lookup table waveform. While some of the lookup tables in a set can be provided for purposes of limiting and/or controlling power consumption, one or more lookup tables can be provided for purposes of implementing a high output power mode. In such a case, a high output power lookup table can exhibit the same sampled waveform shape as a corresponding lower power lookup table, but the high power lookup table includes an increased magnitude version of the sampled waveform. The antenna, in the embodiments presented herein, is not required to be driven at a resonant frequency. In this regard, the resonant frequency that is presented by the inductance of antenna 148, in combination with any parasitic capacitances, is generally far higher than a highest frequency of the transmission range such as, for example, 45 kHz. For instance, the resonant frequency can be in the megahertz range. In this regard, the antenna can exhibit an impedance across the transmission frequency range that can be considered as a constant, at least from a practical standpoint. Thus, antenna 148 can include a number of windings that is selected based, at least in part, on a selected or targeted amount of current draw from battery 180.

Figure 5B:
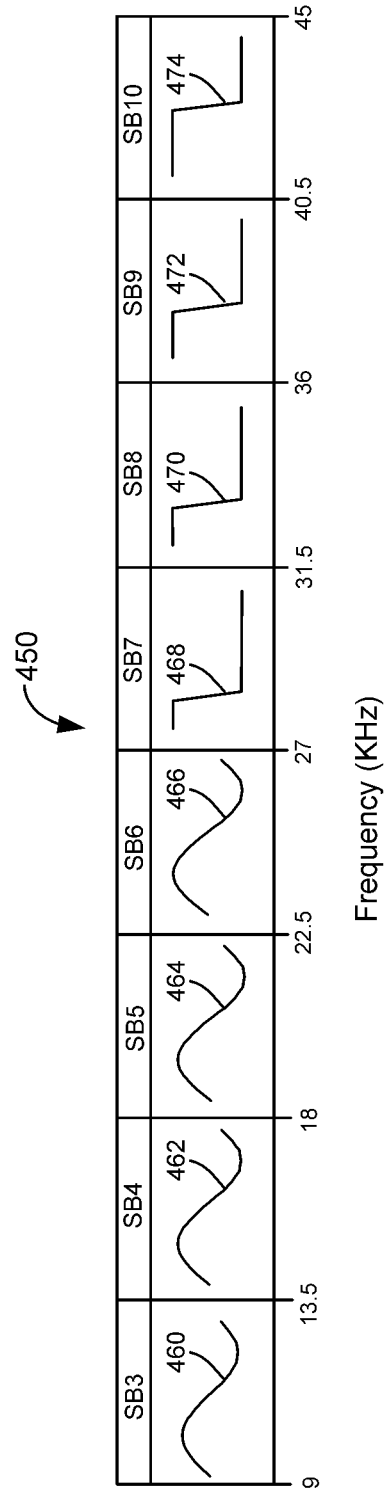
FIG. 5b is a diagrammatic representation of an embodiment of a set of lookup tables that can be used for the depth and symbol frequency lookup tables shown in FIG. 4.

FIG. 5*b* illustrates an embodiment of a set of lookup tables, generally indicated by the reference number 450, that can be used for the depth and symbol frequency lookup tables 326*a-n*. In this case, the set comprises 8 lookup tables. It should be noted that there is no requirement to use the same set of lookup tables for depth and data transmission. In this embodiment, the lookup table set covers SB3 through SB10, corresponding to a wideband frequency range of 9 KHz to 45 KHz. While the wide frequency range is characterized in terms of sub-bands for purposes of descriptive continuity, it should be appreciated that there is no need for frequency confinement based on the previously described transmitter bands and/or sub-bands (see, for example, Table 2) in the context of a wideband transmitter. FIG. 5*b* illustrates general lookup table waveform shapes 460, 462, 464, 466, 468, 470, 472 and 474 that are used for each sub band SB-3-SB10, respectively. For SB3-SB6, a sinusoidal sampled waveform is used. For SB7-SB10, a stepped sampled waveform is utilized. Further details will be provided immediately hereinafter.

Figure 5C:
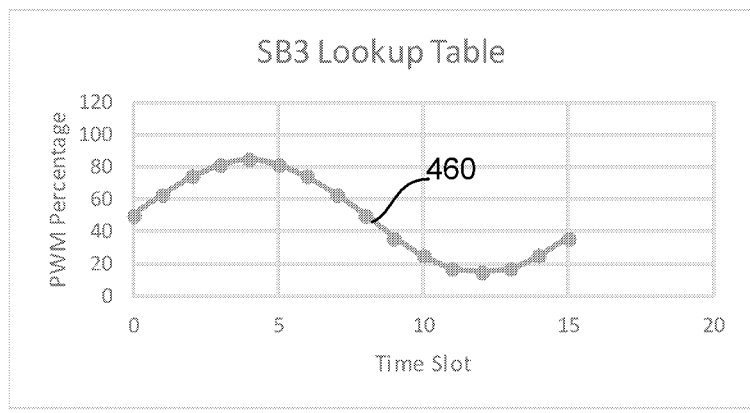
FIGS. 5c-5j are diagrammatic representations of embodiments of the look-up tables in the set of look-up tables of FIG. 5b, shown here to illustrate further details with respect to each look-up table.
Figure 5D:
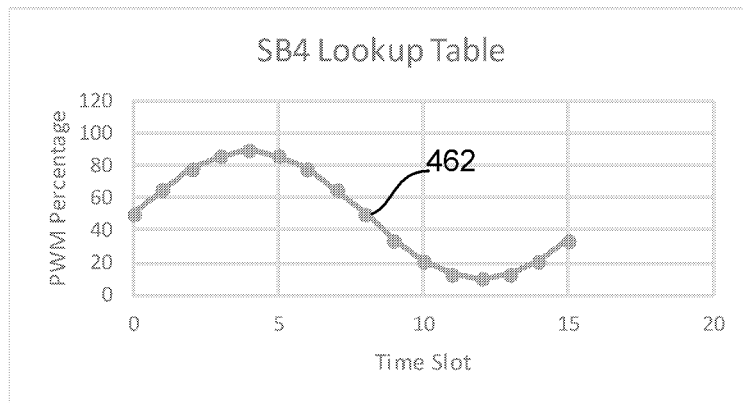
Figure 5E:
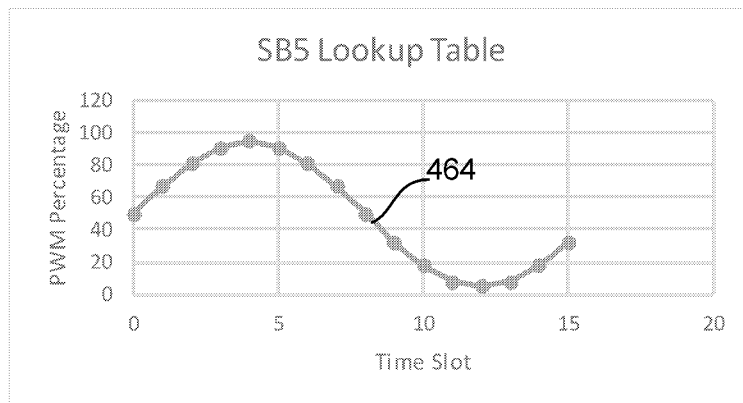
Figure 5F:
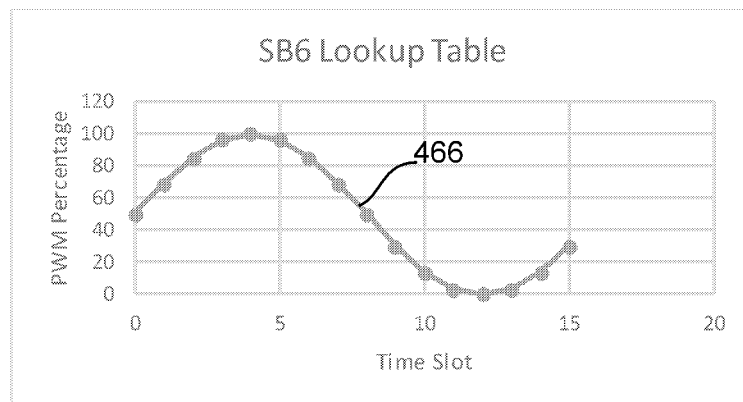
Figure 5G:
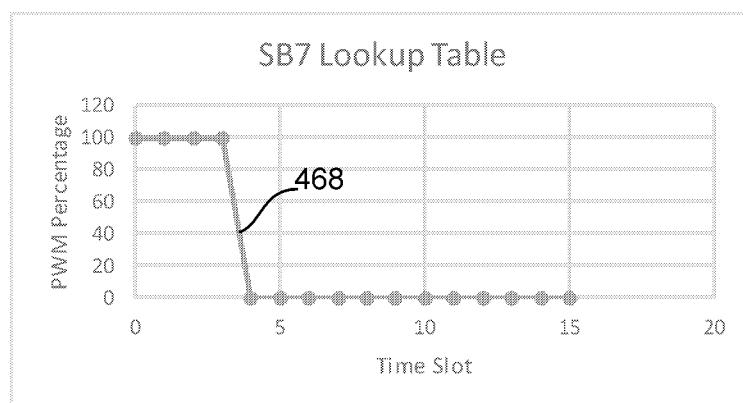
Figure 5H:
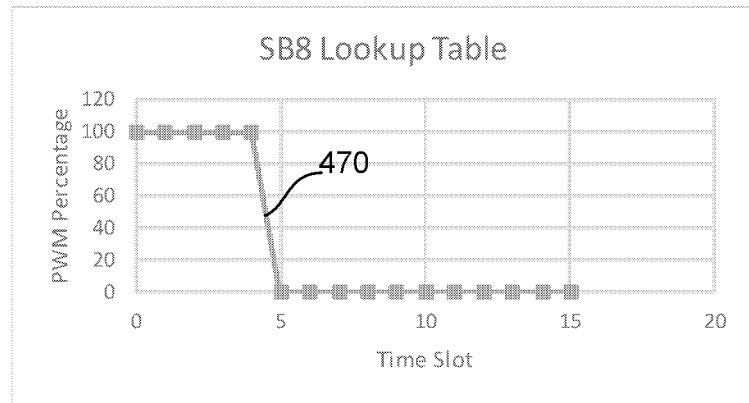
Figure 5I:
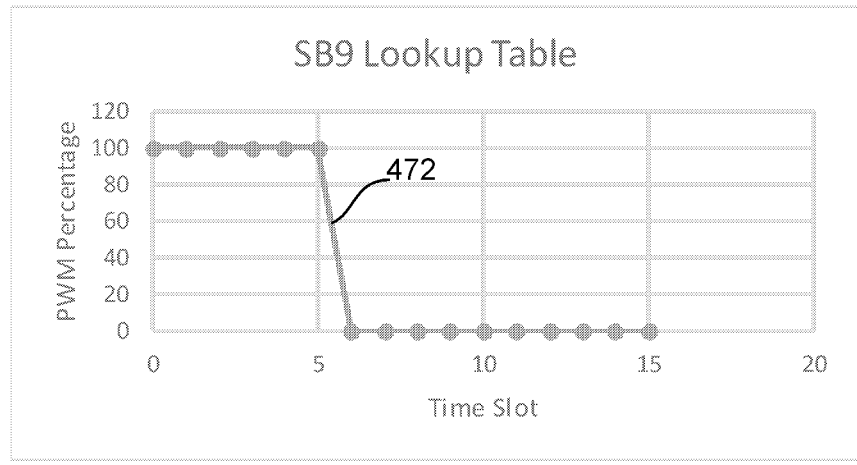
Figure 5J:
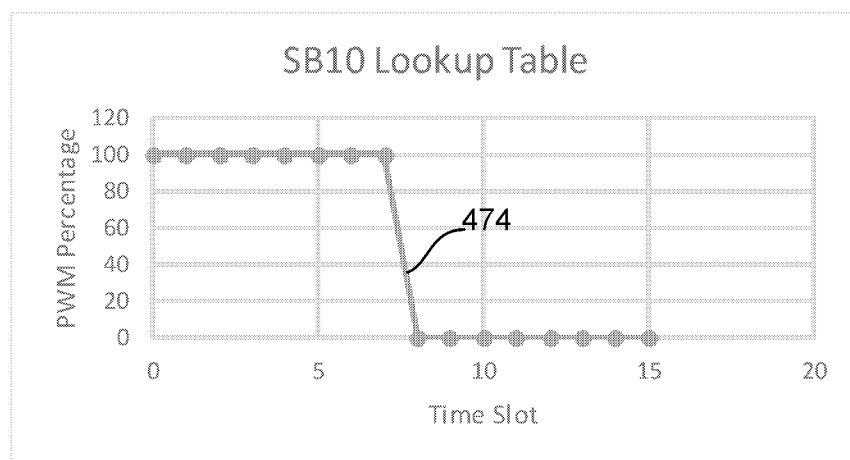

FIGS. 5*c*-5*j*, illustrate further enlarged plots of lookup table sampled waveforms 460, 462, 464, 466, 468, 470, 472 and 474, respectively, for the present embodiment of the set of lookup tables for purposes of depth and data transmission. The horizontal axis of each of these figures illustrates the sampled waveform period or time slot, while the vertical axis designates a Pulse Width Modulation percentage. It is noted that the actual duration of the sampled waveform period is limited to 0-15 on the time slot axis shown in each of these figures. In FIG. 5*c*, waveform 460 includes a sinusoidal shape having a PWM percentage that ranges from approximately 15% PWM to 85% PWM. In FIG. 5*d*, waveform 462 includes a sinusoidal shape having a PWM percentage that ranges from approximately 10% PWM to 90% PWM. In FIG. 5*e*, waveform 464 includes a sinusoidal shape having a PWM percentage that ranges from approximately 5% PWM to 95% PWM. In FIG. 5*f*, waveform 466 includes a sinusoidal shape having a PWM percentage that ranges from approximately 0% PWM to 100% PWM. Thus, the magnitude of the sampled waveform increases by approximately 10% progressively through the subject figures until 100% PWM modulation is reached at waveform 466. Starting, however, with sampled waveform 468 of SB7 in FIG. 5*g*, the sampled waveform changes dramatically. In particular, a stepped sampled waveform is utilized wherein the waveform transits from 100% PWM to 0% PWM. For waveform 468, the on-time of the waveform is approximately 20%. Thus, the use of sampled waveform 468 generates a pulse train as an antenna drive signal with an on-time of approximately 20%. Referring to FIG. 5*h*, for waveform 470 which corresponds to SB8, the on-time of the waveform is approximately 27%. Thus, the use of sampled waveform 470 generates a pulse train as an antenna drive signal with an on-time of approximately 27%. Referring to FIG. 5*i*, for waveform 472 which corresponds to SB9, the on-time of the waveform is approximately 33%. Thus, the use of sampled waveform 470 generates a pulse train as an antenna drive signal with an on-time of approximately 33%. Referring to FIG. 5*j*, for waveform 474 which corresponds to SB10, the on-time of the waveform is approximately 50% corresponding to a square wave. Thus, the use of sampled waveform 470 generates a pulse train as an antenna drive signal with an on-time of approximately 50%.

Referring collectively to the set of lookup tables of FIGS. 5*c*-5*j*, it should be appreciated that this embodiment has been developed for purposes of power control such that the transmitter draws or consumes approximately the same amount of power irrespective of the specific transmission frequency within a wide bandwidth. In this regard, given a constant drive voltage and waveform, the transmitter would otherwise draw increasingly more power as the frequency is reduced. Accordingly, the descriptions which follow will consider the lookup table set beginning from the upper end of the transmitter bandwidth.

Lookup table waveform 474 of FIG. 5*j* for SB10, from 40.5 KHz to 45 KHz, drives the antenna using a square wave at the fundamental of the frequency that is to be transmitted. In doing so for the higher frequencies, the amplitude of the fundamental, as a first harmonic component of the square wave, is higher by about 2 dB than the amplitude of a pure sinewave of a corresponding power. As the transmit frequency reduces from SB9 to SB8, FIGS. 5*i* and 5*h* demonstrate that the on-time of waveforms 472 and 470 progressively decreases. Accordingly, as the transmit frequency becomes lower, the drive waveform becomes more pulselike to progressively lower the amount of energy at the fundamental frequency of the pulse train. By progressively narrowing the pulses in the pulse train, the power that is drawn by the transmitter is compensated and does not significantly increase with decreasing transmit frequency. This pulse train drive signal approach is employed until a sinewave drive signal of at least approximately full magnitude matches the available transmit power from a pulse train drive signal. Such a condition is satisfied at SB6 which utilizes sinewave-shaped lookup table waveform 466. As the transmit frequency is lowered still further in the SB5 and SB4 lookup tables, the magnitude of the sinewave drive waveform is further reduced in order to compensate for the tendency of transmit power to increase responsive to decreasing transmit frequency. The lookup table approach developed by Applicants, which is submitted to be heretofore unknown, provides for varying the drive frequency over a wideband transmit range using a single antenna and without the need for using different antennas which would necessitate the use of multi-coil antennas, complex antenna coil switching and/or complex variable drive voltage arrangements.

Based on the foregoing, the present disclosure can provide a wideband transmitter having a single antenna that is driven across a wide frequency band in a way that can maintain constant or controlled power consumption, at least to an approximation, when the power consumption would otherwise exhibit large variations across that same frequency band by using a single drive signal waveform. Variation in the power consumption across the wide frequency band can be limited to acceptably low levels across the range of 9 KHz to 45 kHz. In this way, Applicants are able to provide a wideband transmitter that operates across a wide frequency range with power consumption regulation and control that is submitted to have been unseen heretofore. In the past, performing inground operations at different frequencies for depth and locating data often required the purchase of a transmitter that was dedicated to each frequency of interest. The recognitions that have been brought to light herein can result in significant cost savings since a single wideband transmitter can replace a plurality of prior art transmitters. In this regard, the teachings herein are equally applicable with respect to a transmitter that transmits a depth frequency or tone at one discrete frequency and transmits a data signal at a different frequency that is modulated in any suitable manner such as, for example, using BPSK, QPSK or Manchester encoding.

With reference to FIG. 4 and in an embodiment, the symbol channel can be set up to output a single carrier frequency, much like depth signal 386 of the depth channel, and that carrier frequency can be modulated in any suitable manner, for example, to carry sensor data based, at least in part, on the set of lookup tables 326. It should be appreciated that there are benefits associated with transmitting the depth frequency or tone at a relatively low frequency such as, for example, 1.5 kHz and transmitting a modulated data frequency at a much higher frequency such as, for example, in the range of 30 kHz to 45 kHz. Thus, a factor of 20 or more can be provided between the modulated carrier frequency and the depth tone as a result of the remarkable frequency generation capabilities of a transmitter that is produced in accordance with the present disclosure. In this regard, low depth tone frequencies are associated with avoiding sources of passive interference such as rebar while higher data frequencies are associated with higher rates of data throughput based on the Nyquist rate. The present disclosure allows for the transmission of a depth tone that is spaced apart from a modulated data frequency by an amount that is submitted to be heretofore unseen, particularly when a single antenna is used to transmit both. For example, the depth tone can be transmitted at 1.5 kHz or less and the modulated data frequency can be transmitted in the range from 30 kHz to 45 kHz. In another embodiment, 10 kHz can be used for the depth tone while 40 kHz can be used for the modulated data frequency.

Having described in detail above transmitters and associated components according to the present disclosure, details with respect to transmission of data signal 122 will now be brought to light. In particular, an M(ary) frequency shift keying approach is used such that a plurality of different symbols can be streamed to make up data signal 122. In an embodiment, the data signal can serve to transmit a multi-bit symbol stream. The ability to transmit a multi-bit symbol stream is facilitated, at least in part, based on the use of synthesizer 300 of FIG. 4. In particular, a multi-bit data symbol stream can be provided at data symbol stream input 374 to symbol channel frequency control 340. In this way, data symbols corresponding to a wide variety of distinct frequencies can be specified as part of the data symbol stream with each different symbol corresponding to a different frequency. In an embodiment, the data symbols of the symbol stream can correspond to 16 symbols (4 bits), although any suitable number of symbols can be used, based on a desired data throughput. FIG. 4 illustrates output 390 based on 16 symbols, S0-S15, with S0 corresponding to a lowest frequency and each successively higher-numbered symbol corresponding to a relatively higher frequency, although this is not required and the mapping or assignment of symbols to frequencies can be performed in any suitable manner. Thus, output 390 corresponds to an example input symbol stream of S2, S12, S2, S15, S0 and S10 at input 374.

Figure 6A:
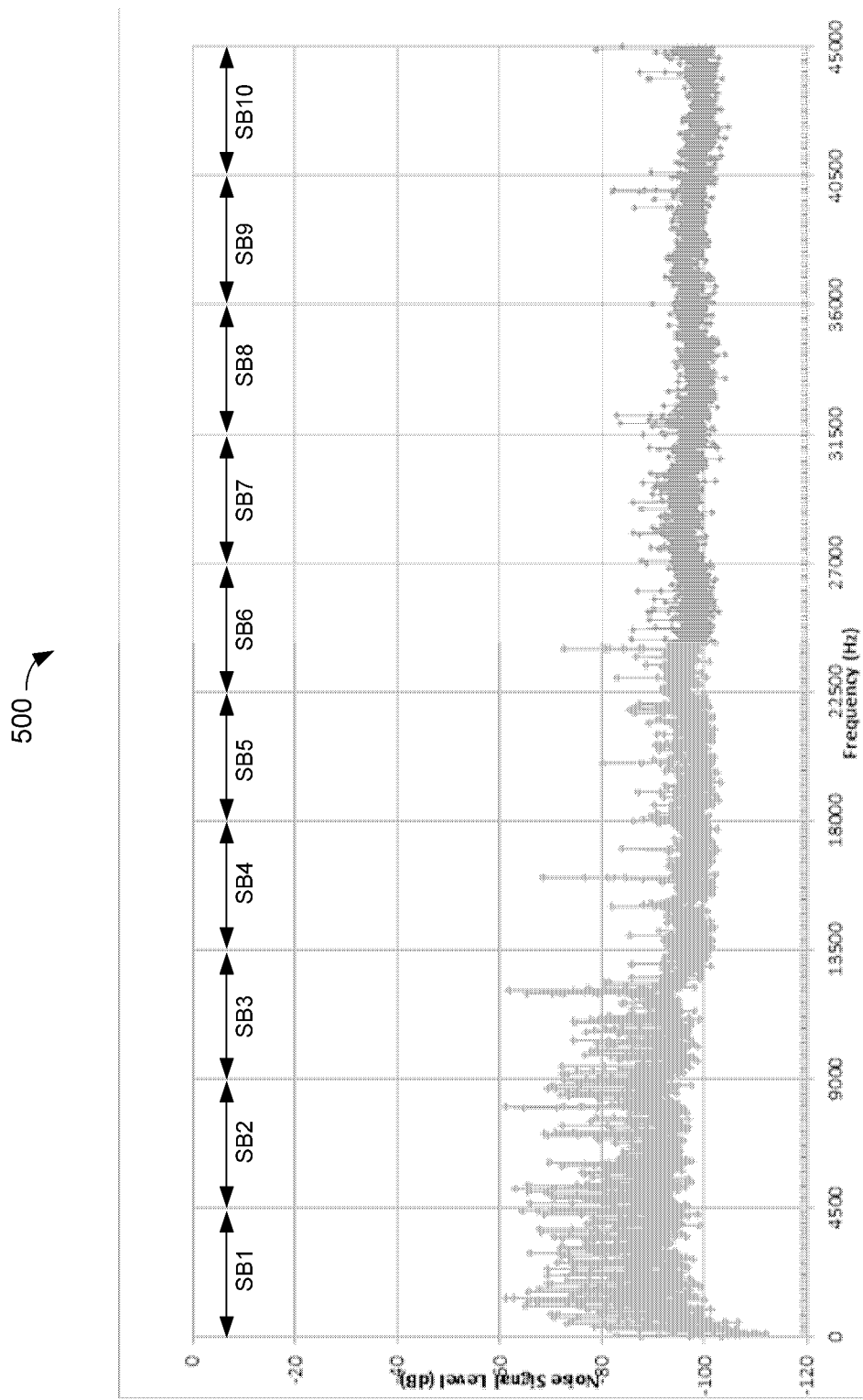
FIG. 6a is a plot of the power spectral density of noise taken at a high resolution, corresponding to an actual physical location at which a 50 Hz powerline frequency is in use.

FIG. 6*a* is a plot of the power spectral density of noise taken at a high resolution, generally indicated by the reference number 500, corresponding to an actual physical location at which a 50 Hz powerline frequency is in use. The signal level is shown on the vertical axis and the frequency is shown on the horizontal axis. The frequency range of 0 to 45 KHz corresponds to the frequency range that is covered by the range of transmitters described in accordance with the present disclosure, for example, with regard to FIG. 5*a*. As noted above, the present embodiment, utilizing the range of 0 to 45 KHz, has been provided by way of non-limiting example. Transmitter sub-bands SB1-SB10 are also indicated. An initial choice of which sub-band is most suitable can be based on a determination of an average noise value per sub-band. On this basis, any one of sub-bands SB8-SB10 appears to represent an acceptable choice while one of sub-bands SB1-SB3 appears to represent the worst choice.

While the spectral scan of FIG. 6*a* illustrates spectral information essentially at a single location, it should be appreciated that spectral information can be collected in a cumulative manner. For example, spectral scanning can be performed while an operator walks the planned borepath with device 20 while the device characterizes the noise environment. In this way, the spectral plot of FIG. 6*a* can be thought of as representing the noise environment along the entire planned borepath with subsequent frequency selections being based on the noise environment as characterized for the entire length of the planned borepath while still utilizing the frequency selection techniques that have been brought to light herein.

Figure 7:
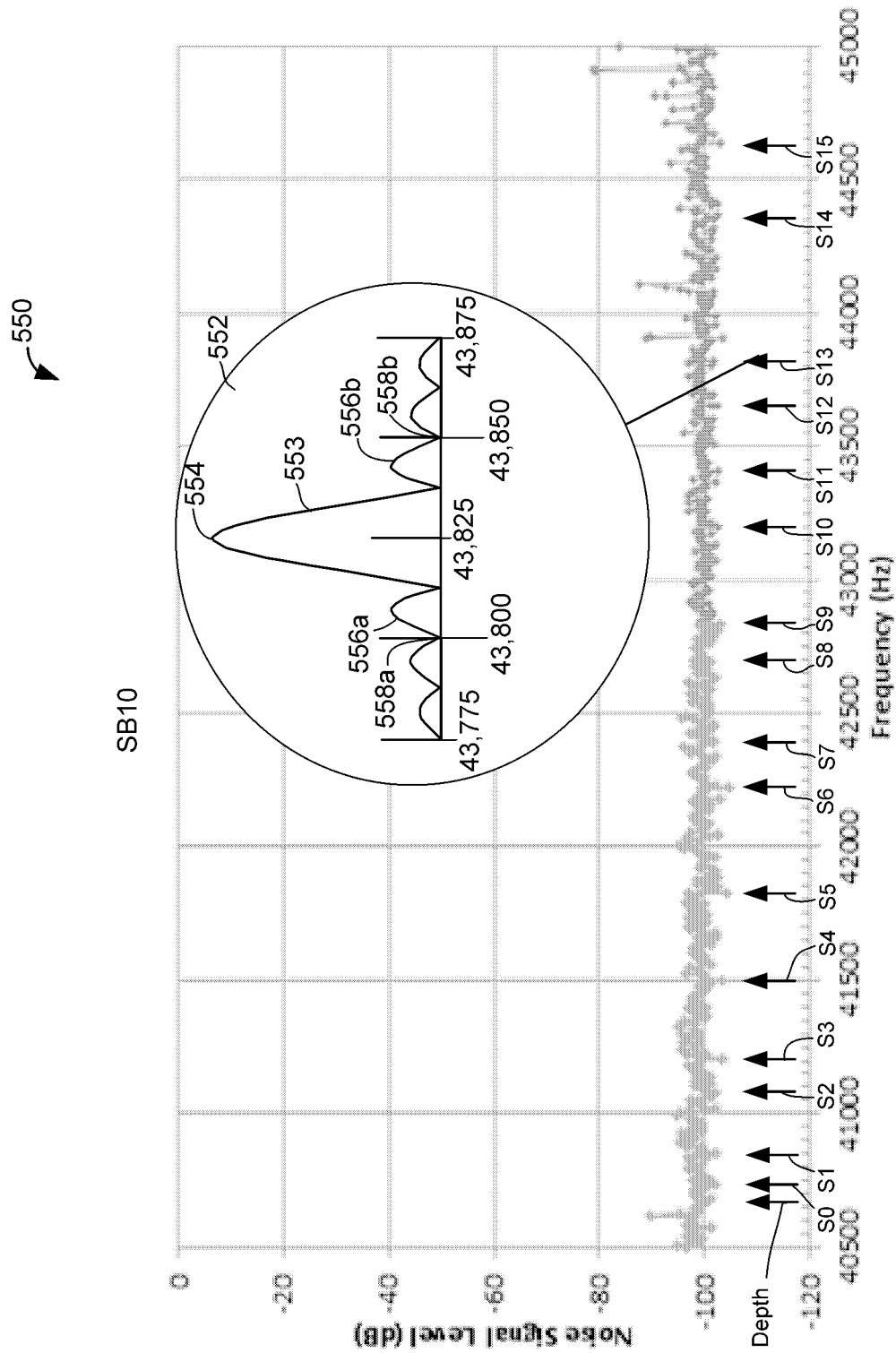
FIG. 7 is a further enlarged view of sub-band 10 from FIG. 6a, shown here to facilitate a discussion of the section of a depth frequency and symbol frequencies and including an inset view that illustrates an embodiment of the spectral content of symbols transmitted in accordance with the present disclosure.

FIG. 7 is a further enlarged view of sub-band 10 from FIG. 6*a*, generally indicated by the reference number 550, and is shown here to illustrate the selection of a depth frequency and sixteen symbol frequencies S0-S15 within this sub-band. Each selected frequency has been designated by an arrow. The various frequencies have been selected, for example, based on their correspondence to low noise points in the noise plot. Based on the selection of frequencies, such as S0-S15 either automatically and/or manually, Applicants submit that system 10 can provide a level of noise immunity that has heretofore been unseen with respect to performing an inground operation such as, for example, horizontal directional drilling and related pull-back or back-reaming operations. Related considerations and further details will be provided in the context of a discussion of device 20 which receives the depth signal and the data signal and which also can assist in the identification of the depth signal frequency and symbol frequencies to be used by the transmitter.

Attention is now directed to considerations with regard to powerline harmonics that are frequently encountered in an ambient noise environment. It should be appreciated, however, that frequency selection based on attempting to avoid powerline harmonics is not a requirement herein. That is, frequency selection based on low noise measurements, potentially in conjunction with other statistical noise characterization parameters can provide remarkable benefits with respect to providing noise immunity. Nonetheless, Applicants recognize that detailed examination of noise plots, such as the one illustrated in FIG. 6*a*, at least generally reveal the presence of powerline harmonics that are spaced apart by an increment that is established by the local powerline frequency. In the instance of a 60 Hz powerline frequency, the harmonics are at least generally spaced apart by 60 Hz and can extend to values upwards of 30 KHz. Similarly, in the instance of a 50 Hz powerline frequency, the harmonics are at least generally spaced apart by 50 Hz and can extend to values upwards of 30 KHz. Therefore, powerline harmonic noise can be reduced by choosing symbol frequencies that fall at least between or halfway in between the powerline harmonics. Given the assumption of stability in the powerline frequency, for a 50 Hz powerline frequency, symbol frequencies in the series 75 Hz, 125 Hz, 175 Hz, 225 Hz, and so on can be selected while, for a 60 Hz powerline frequency, symbol frequencies in the series 90 Hz, 150 Hz, 210 Hz, 270 Hz, and so on can be selected. The subject symbol potential frequencies may be referred to herein as the in-between frequencies. As discussed above, synthesizer 300 can be configured with a frequency resolution of 5 Hz such that any desired in-between harmonic frequency of 50 Hz or 60 Hz can be selected as a symbol frequency. Applicants recognize that instability in the powerline frequency, however, will cause a shift in the harmonic frequencies. This shift increases with increasing frequency. For example, if the fundamental powerline frequency is shifted by 0.1 Hz from 50 Hz, the 100th harmonic will shift by 10 Hz. Frequency selection, in view of such harmonic shifts, will be addressed at an appropriate point hereinafter.

Referring again to FIG. 7 and in an embodiment, synthesizer 300 can be configured to allow for frequency selection at a resolution of 5 Hz. In this regard, it should be appreciated that this level of resolution provides for frequency selection that is half way between adjacent powerline harmonics. For a 50 Hz powerline frequency, the bandwidth between adjacent harmonics is at least approximately 50 Hz. For a 60 Hz powerline frequency, the bandwidth between adjacent harmonics is at least approximately 60 Hz. Due to the stability with which the symbols are generated in conjunction with symbol shaping as seen in FIG. 4, the symbols transmitted to make up the symbol stream of data signal 122 can exhibit limited spectral spreading. Further, the spectral spreading that is present can exhibit a particular relationship with adjacent powerline harmonics based on transmission rates. For example, a data throughput of 50 bits per second requires transmission of 12.5 symbols per second for 4 bit symbols for a symbol duration of 0.08 sec. As another example, a data throughput of 60 bits per second requires transmission of 15 symbols per second for 4 bit symbols for a symbol duration of approximately 0.067 sec. Based on a 50 bit per second transmission rate (12.5 symbols per second), an inset view 552 in FIG. 7 includes a plot 553 that illustrates the spectral content of symbol S13 in Hertz relative to its nearest powerline harmonics. The fundamental frequency of S13 is 43,825 Hz which is half way between adjacent 50 Hz powerline harmonic frequencies of 43,800 Hz and 43,850 Hz. A fundamental peak 554 is present in the spectral plot of the symbol at 43,825 Hz such that all of the spectral energy of this peak falls between the adjacent powerline harmonics. Side lobes 556a and 556b also fall entirely between the adjacent powerline harmonics. It is noted that several additional side lobes are shown having energy that falls outside of the adjacent powerline harmonics at 43,800 Hz and 43,850 Hz. Remarkably, it should be appreciated that the spectrum of the symbol exhibits nulls 558a and 558b that fall directly on the adjacent powerline harmonic frequencies. Thus, the spectral content of each symbol frequency effectively places no signal power on the adjacent powerline harmonics. The nulls are positioned to fall on the adjacent powerline harmonics, as shown in FIG. 7, based on the data transmission rate of the symbol stream. As discussed above, symbol stream 390 is transmitted without gaps between the symbols. It should be appreciated that additional side lobes will likewise be separated by nulls that are located directly on powerline harmonic frequencies such as, for example, 43,750 Hz and 43,900 Hz, which have not been shown due to illustrative constraints. In this regard, the symbol spectra includes a null positioned at every powerline harmonic frequency. It is noted that an additional portion of the spectral energy that is associated with each symbol can be moved between adjacent powerline harmonics. For example, if the symbol transmission rate is reduced by one half, additional side lobes shown in inset view 552 of FIG. 7 will be positioned between the adjacent powerline harmonics at 43,800 Hz and 43,850 Hz along with the fundamental peak. At the same time, nulls continue to fall directly on all of the powerline harmonics. For the spectral plot of FIG. 7, it is noted that approximately 94 percent of the total energy associated with the symbol is contained by the fundamental and side lobes 556a and 556b.

Table 3 provides at least approximate values for each of the selected frequencies shown in FIG. 7. The reader is reminded that frequencies S0-S15 were selected on the basis of exhibiting low noise, as opposed to attempting to avoid power line harmonics. In this regard, Table 3 also lists a nearest powerline harmonic based on a 50 Hz powerline frequency. In some instances, such as with respect to the frequency choices for S1, S4, S7 and S8, it appears that these frequencies correspond to a 50 Hz powerline harmonic while, in other cases, the frequency choices only for the depth signal, S5 and S13 fall on in-between harmonic frequencies. In this regard, it should be appreciated that such shifting of low noise points in the noise spectrum can result from powerline frequency drift, as discussed above.

TABLE 3

EXAMPLE SELECTED FREQUENCIES

| Designation | Frequency (Hz) | Nearest Between Harmonic Frequency |
|---|---|---|
| Depth Signal | 40,675 | 40,675 |
| S0 | 40,740 | 40,725 |
| S1 | 40,850 | 40,825 or 40,875 |
| S2 | 41,085 | 41,075 |
| S3 | 41,210 | 41,225 |
| S4 | 41,500 | 41,475 or 41,525 |
| S5 | 41,825 | 41,825 |
| S6 | 42,235 | 42,225 |
| S7 | 42,400 | 42,375 or 42,425 |
| S8 | 42,700 | 42,675 or 42,725 |
| S9 | 42,845 | 42,825 |
| S10 | 43,205 | 43,225 |
| S11 | 43,420 | 43,425 |
| S12 | 43,665 | 43,675 |
| S13 | 43,825 | 43,825 |
| S14 | 44,360 | 44,375 |
| S15 | 44,635 | 44,625 |

Based on the foregoing, Applicants submit that system 10 can provide a level of noise immunity that has heretofore been unseen with respect to performing an inground operation such as, for example, horizontal directional drilling and related pull-back or back-reaming operations. Related considerations and further details will be provided in the context of a discussion of device 20 which receives the depth signal and the data signal and which also can assist in the identification of the depth signal frequency and symbol frequencies to be used by the transmitter. It should be appreciated that the depth signal frequency and symbol frequency ordering given by Table 3 are not required. That is, the depth signal frequency can be positioned between symbol frequencies. Based on the use of a separate channel for purposes of generating the depth signal (FIG. 4), the depth signal can be positioned in a different sub-band than the symbol frequencies. Further, the symbol frequencies can be reordered or rearranged in any suitable manner. With regard to constraining frequency selection to a single sub-band, it should be understood that an embodiment of a wideband transmitter can be configured to operate in a manner that mimics the operation of a transmitter that is constrained to operate based on sub-bands. For example, the selected frequencies in a wideband transmitter can be limited or constrained to a single sub-band, even though the wideband transmitter is capable of transmission over a wide range of sub-bands.

Figure 8:
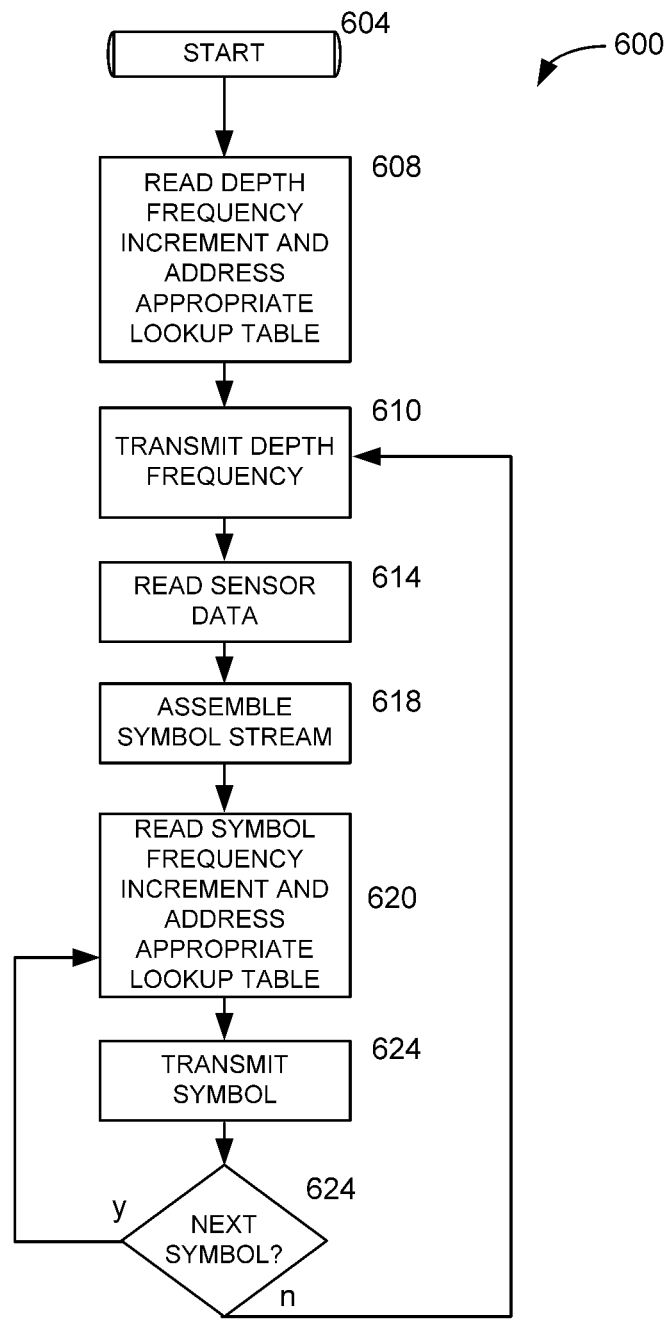
FIG. 8 is a flow diagram that illustrates an embodiment for the operation of a transmitter according to the present disclosure.

FIG. 8 is a flow diagram that illustrates an embodiment for the operation of a transmitter, generally indicated by the reference number 600, according to the present disclosure. It is noted that, for purposes of the present discussion, it will be assumed that the depth frequency as well as the frequencies associated with symbols S0-S15 have already been selected. These frequency choices can be stored at any suitable location such as, for example, in depth frequency table 224 and symbol frequency table 228 of FIG. 3. The method begins at 604 and proceeds to 608 which looks up the depth frequency increment, for example, from lookup table 370 (FIG. 4) as part of the operation of depth channel frequency control 338. In an embodiment that uses a single depth channel waveform lookup table such as table 326a in FIG. 4, depth channel phase accumulator 330 can always address that single waveform lookup table. On the other hand, in an embodiment that uses a plurality of depth waveform lookup tables, step 608 also can identify the correct waveform lookup table 326a-n as part of depth channel waveform tables section 320 in FIG. 4 such that depth channel phase accumulator 330 addresses the appropriate depth channel lookup table waveform based on frequency. At step 610, depth channel phase accumulator 330 receives the value and begins counting based on the depth frequency increment, thereby causing the appropriate depth channel lookup table 326a-n and depth channel PWM generator 350 to begin continuously generating depth channel frequency 386 to emit depth signal 120 at this frequency. At 614, CPU 200 reads sensor information via multiplexer 154 to collect sensor data that is to be transmitted. At 618, the CPU assembles the sensor data into a symbol stream which can invoke a packet structure that is yet to be described. The symbol stream is provided as data stream symbol input 374 to symbol channel frequency control 340 in FIG. 4. At 620, the symbol channel frequency control can utilize its lookup table 372 to identify the appropriate frequency for a current symbol to be transmitted. In an embodiment that uses a single symbol channel waveform lookup table such as table 326a in FIG. 4, symbol channel phase accumulator 334 can always address that single waveform lookup table. On the other hand, in an embodiment that uses a plurality of symbol waveform lookup tables, step 620 also can identify the correct waveform lookup table 326a-n as part of symbol channel waveform tables section 324 in FIG. 4 such that symbol channel phase accumulator 334 addresses the appropriate symbol channel lookup table waveform. It should be appreciated that the transmission of a given symbol stream can necessitate that step 620 switches data waveform lookup tables 326a-n on a symbol-by-symbol basis from one symbol to the next, based on frequency. At 624, the current symbol is transmitted. Step 624 checks for the availability of another symbol to transmit. If a symbol is available, operation returns to 620 such that the process repeats for the next symbol. On the other hand, if the next symbol is not yet ready, operation can return to 610 which continues transmission of the depth signal. Sensor data is then again read at 614 and the process continues therefrom. It should be appreciated that data signal 122 is most often transmitted on an essentially continuous basis simultaneously with depth signal 120.

Figure 9:
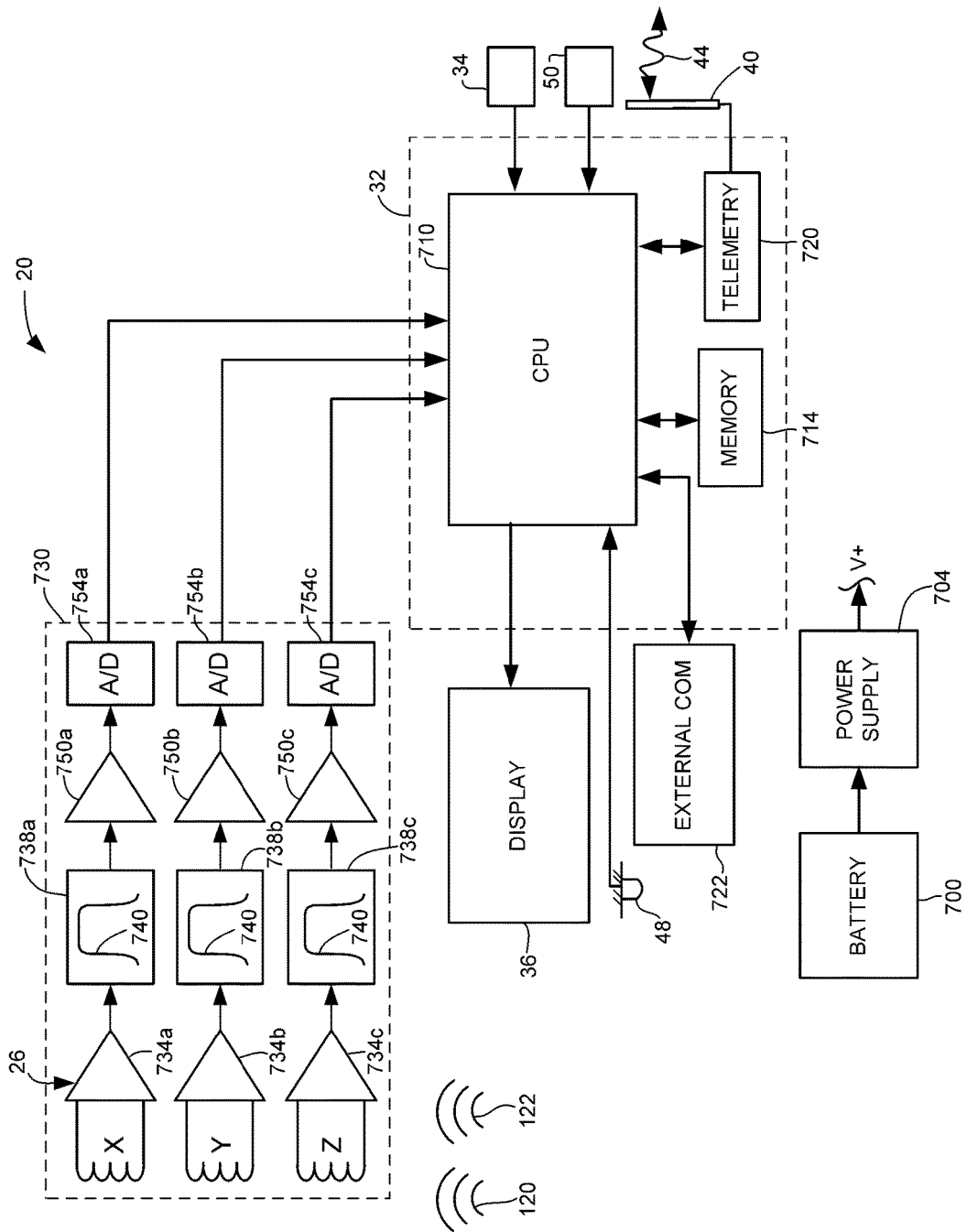
FIG. 9 is a block diagram illustrating an embodiment of the portable device shown in FIG. 1.

Having described embodiments of transmitter 130 in detail above, attention is now directed to FIG. 9 in conjunction with FIG. 1 for purposes of describing additional details with respect to device 20 which may be referred to interchangeably as a locator or receiver. Device 20 includes a battery 700 that feeds a power supply 704 which supplies appropriate electrical power to all of the components of the device, indicated as V+. Electronics section 32 includes a processor 710 that is interfaced with a memory 714. A telemetry section 720 is controlled by the processor and coupled to antenna 40 for bidirectional communication via signal 44. In some embodiments, the telemetry link can be unidirectional from device 20 to the drill rig, in which case transceiver 102 need only include receiver functionality. An external communication arrangement 722 provides for external communication with a transmitter using external communication connection 174 (FIG. 3) of the transmitter. As discussed above, such communication is not required to be transmitted through the ground but rather can be performed while the transmitter is above ground, for example, in a position adjacent to device 20. The external communication can be implemented in any suitable manner including but not limited to IrDA, NFC, Wi-Fi, Zigbee or Bluetooth. A wide-band front end 730 is configured for receiving depth signal 120 and data signal 122 using X, Y and Z antennas which make up antenna cluster 26 for measuring three orthogonal components of the subject signals as well as for performing noise measurements along these axes, as is yet to be described. Additional details with respect to an embodiment of the antenna cluster will be provided at an appropriate point hereinafter. Each of the X, Y and Z antennas is interfaced to a low noise amplifier (LNA) 734a, 734b and 734c, respectively, each of which can be identically configured. The amplified output of each LNA is supplied to a respective one of filters 738a, 738b and 738c, each of which can be configured identically and which may be referred to collectively as filters 738. Each filter serves as a bandpass filter 740 exhibiting a low frequency roll-off or corner and a high frequency roll-off or corner. While filters 738 are illustrated as individual functional blocks, it should be appreciated that the filters can be implemented in any suitable manner. By way of non-limiting example, each filter can be implemented as a series of RC high-pass and low-pass filters that are distributed throughout the signal chain. In an embodiment, two high-pass filters can each be set at a low corner frequency of about 4 KHz and four low pass filters can be set at a high corner frequency of about 90 KHz. This embodiment yields a relatively flat frequency response from 10 KHz to 50 KHz. The roll-off below 10 KHz is approximately 40 dB of attenuation per decade and the roll-off above 50 KHz is approximately 80 dB of attenuation per decade. It should be appreciated that the low end response of filters 738 and the low corner frequency can be established in consideration of the fundamental and low order power line harmonics, which can be very strong. Amplifiers 750a-750c can follow each respective one of filters 738a-738c with sufficient gain for purposes of driving each of analog-to-digital converters A/D 754a-754c. Each A/D 754 provides an output to CPU 710. In an embodiment, device 20 can be configured to receive the symbol stream in a way that suppresses powerline harmonic frequencies since there is effectively no energy present in the symbol stream at the powerline harmonics. For example, the received signal can be processed such that the receiver response matches the symbol spectra as illustrated by plot 553 of FIG. 7. In particular, the spectral response of the receiver can be matched to the spectral characteristics of the transmitter by integrating the received symbol stream over a time period that corresponds to the time duration or period of each symbol. In this way, the receiver frequency response matches the response of the transmitter with respect to exhibiting null reception points at the powerline harmonic frequencies. Accordingly, energy at the harmonic frequencies is suppressed or ignored by the receiver while sweeping up the spectral energy that is associated with the symbol. The receiver can employ any suitable demodulation process that provides periodic nulls including but not limited to a Discreet Fourier Transform (DFT).

Still referring to FIG. 9 and having described an embodiment of locator 20 in detail above, it should be appreciated that the locator can be configured for performing noise measurements and analysis for purposes of selecting a transmitter for transmission of the depth signal and the data signal as well as establishing the frequencies to be associated with each of these signals. Of course, band selection may not be required when a wideband transmitter is used. Noise measurements can be determined based on each orthogonal axis of antenna 26 (X, Y and Z antennas, as shown in FIG. 9). These individual noise components can be used to establish a three dimensional noise value, for example, based on a vector sum of the three antenna components. The vector sum can be useful since the noise reading at a given point will essentially be invariant with changes in the orientation of the locator. On the other hand, displaying the noise reading obtained from a single axis will generally exhibit variation at a given point as the orientation of the locator is changed. By allowing for monitoring noise along a single antenna axis such as for example the X axis, an operator can identify which particular axis along the bore path may be problematic in terms of interference. Noise values can be determined in any suitable manner such as, for example, based on a Fast Fourier Transform (FFT). In an embodiment, a noise scan can be produced from each axis for comparative purposes. For example, an axis that exhibits relatively higher noise than the other axes can be handled differently for purposes of data recovery.

As discussed above with regard to FIG. 6*a*, an initial choice of which sub-band is most suitable can be based, for example, on an average noise value per sub-band. In an embodiment, the locator can automatically make a recommendation to use the lowest average noise sub-band such as, for example, SB-9. For example, display screen 36 can illustrate a plot, bar graph or any suitable form of display format based on the spectral scan of FIG. 6*a*, highlighting the selected sub-band. In some embodiments, the sub-band selection process can involve other statistical values for purposes of characterizing the noise, as will be described immediately hereinafter.

Figure 6B:
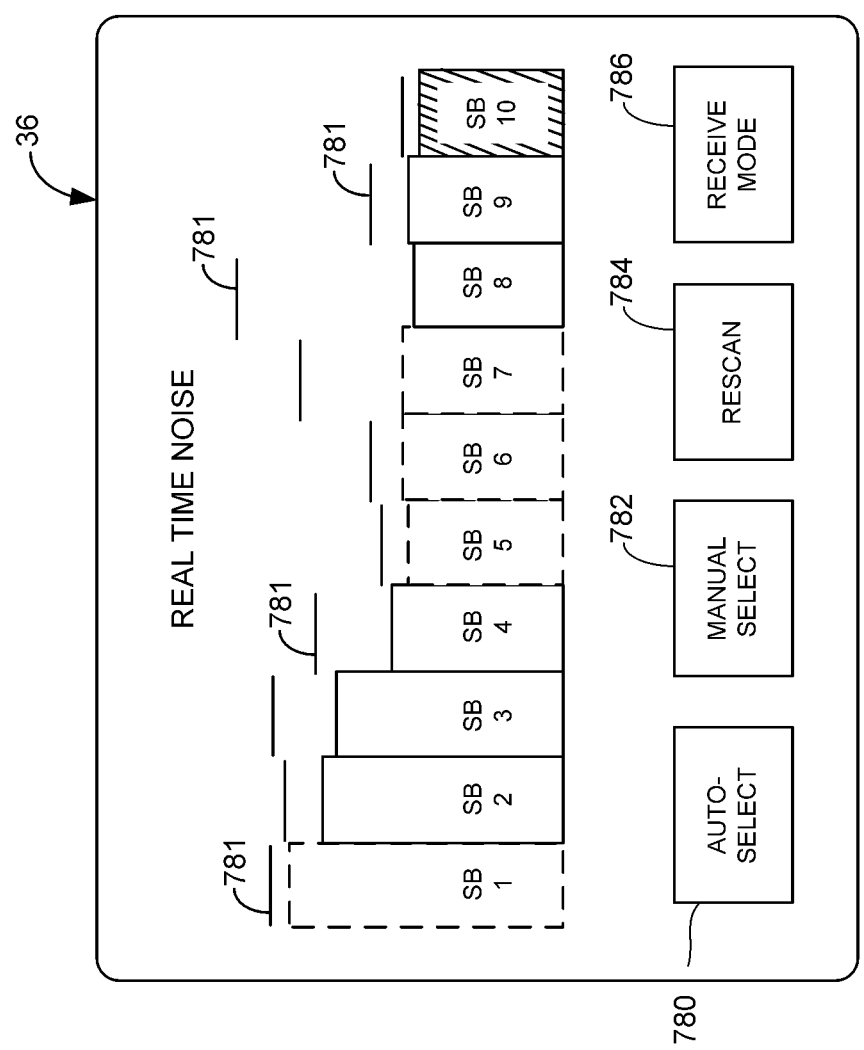

FIG. 6*b* illustrates one embodiment of a screen shot showing display 36 including a bar graph display illustrating the average noise per sub-band wherein sub-band SB-10 is highlighted, for example, using hatching and/or color or in some other suitable manner to indicate that SB-10 has been automatically selected. In another embodiment, the locator can make an automatic recommendation based on average noise per sub-band in conjunction with other statistical values. Any suitable statistical value(s) can be utilized including, for example, standard deviation, minimum noise and peak noise. In still another embodiment, more than one sub-band can be recommended, in which case the user can select between the recommended sub-bands. Recommending multiple sub-bands can be based on a limited amount of statistical variation between the sub-bands. For example, sub-bands 9 and 10 can both be recommended based on the relatively limited difference between the two sub-bands, as seen in FIG. 6*b*. As another example, multiple sub-bands can be recommended, for instance, based on the average noise for a first sub-band being lower than the average noise for a second sub-band while the peak noise for the first sub-band is higher than the peak noise for the second sub-band. In an embodiment wherein more than one sub-band is recommended, the system can be configured such that the user can select one of such multiple recommended sub-bands for transmission. In another embodiment, the user can select multiple recommended sub-bands for transmission. In yet another embodiment, one or more of such multiple recommended sub-bands can be automatically selected for transmission. Since the information presented in FIG. 6*a* is based on a high resolution noise scan using a 5 Hz increment, a significant amount of noise information can be extracted from the data. For example, the standard deviation of the noise values within each sub-band can be determined. The heights of the various bars in FIG. 6*b* can be weighted by adding or subtracting a value based on one or more other statistics. For example, if the standard deviation for a given sub-band is high, meaning that the noise values are relatively more widely spread out, the height of the associated bar can be maintained or even increased by some amount. On the other hand, if the standard deviation for a given sub-band is low, meaning that the noise values within that sub-band are relatively consistent, the height of the associated bar in FIG. 6*b* can be lowered. Similarly, the heights of the bars in the bar graph can be weighted based on peak noise such that a sub-band having a high peak noise can be increased in height by some amount. In any case, weighting can be performed based on thresholds for the respective statistical values. Weighting can be applied based on individual statistical values or combinations of statistical values. The automatically selected sub-band can be accepted by the operator touching an Auto-Select button 780 or by touching any sub-band which he or she wishes to choose. The operator can override the automatic selection, for example, based on which specific transmitters are currently available for performing the inground operation. As another basis to present information to the operator, other statistical values can be presented. For example, overbars 781 (a number of which are individually designated) show the peak noise per sub-band. The operator may choose to avoid a sub-band that exhibits a particularly high peak noise level, even if the average noise for that sub-band is relatively low. For purposes of over-riding the automatic selection, the operator can touch a Manual Select button 782 and then touch a sub-band which he or she wishes to choose. In another embodiment, display 36 on the locator can display a plot, bar graph or any suitable form of display format that is derived from the spectral scan that is shown in FIG. 6*a* such that the operator is then allowed to manually select one of the sub-bands, for example, by touching the sub-band of choice on the display screen. In still another embodiment, locator 20 can allow the operator to initially enter information relating to the transmitters that are available for automatic selection of a sub-band that is covered by one of those transmitters, excluding sub-bands that are not available, in a manner that is consistent with the teachings of U.S. Pat. No. 8,729,901 which is commonly owned with the present application and hereby incorporated by reference in its entirety. FIG. 6*b* illustrates sub-bands that are not available, based on unavailable transmitters, using dashed lines. Conversely, solid lines indicate sub-bands that are available. In the present example, SB-1 and SB-5 through SB-7 are not available. In an embodiment, sub-bands can be excluded based on regulatory constraints. In this way, the portable device itself and the operator are not allowed to make frequency selections that would violate regulations in a particular jurisdiction. Such frequency restrictions can be predetermined by the manufacturer on a regional basis. In an embodiment, portable device 20 or some other component of the system such as, for example, drill rig 80 can be equipped with a GPS receiver that can establish the location of the inground operation and then look up the local frequency requirements.

Still referring to FIG. 6b, the display screen that is shown can remain "live" at least until the frequency selection process is completed. That is, the average noise per sub-band can be monitored and displayed, either alone or weighted by other statistical parameters, in real time for operator monitoring purposes. In this way, the operator can move the locator about while observing the average noise in the various sub-bands. For example, the operator can walk a planned borepath and monitor the noise along the borepath prior to beginning drilling. In this way, a sub-band that is particularly noisy at one or more points along the borepath can be avoided. If the operator so chooses, he or she can move the locator to a different point, for example, along the borepath and initiate a rescan of the noise across the entire bandwidth by selecting a rescan button 784. As discussed above, the noise environment can be characterized based on reception using one or more antennas. The operator can change the receiving mode using a button 786. For example, in one receiving mode, the bar chart of FIG. 6b can be presented based on reception along a single axis such as, for example, the X axis. In another receiving mode, the bar chart can be presented based on a vector sum produced from three orthogonal receiving axes. Once the operator changes receiving modes, rescan button 784 can initiate a new noise scan and present the noise values based on the selected receiving mode. The operator can switch between the various noise scanning modes at will. In an embodiment, the noise scan that forms the basis for the display of FIG. 6b can be a high resolution scan. In conjunction with performing the noise scan, a number of optimized, low noise frequencies can be selected automatically based on the number of symbol frequencies that is needed. For example, sixteen symbol frequencies and a depth frequency can be selected per sub-band. In an embodiment, during the presentation of live noise on the screen of FIG. 6b, noise per sub-band can be presented as an average of the noise values measured at each of the selected frequencies within each sub-band. It is noted that selection of rescan button 784 causes a new or updated selection of frequencies within each sub-band. Locator 20 can be configured to store sets of frequency selections that are associated with different measurement positions, for example, in memory 714 of FIG. 9. Accordingly, the frequency selections are optimized for each measurement position such that different selections can be used at different times during the operation. The term "optimized" is intended to mean that the selected frequencies are chosen with the intent of avoiding interference based on one or more statistical parameters such as, for example, average noise, standard deviation and peak noise. The frequency selection sets can be communicated to the transmitter, for example, above ground using external communication connection 174 of FIG. 3. An inground transmitter can be commanded in any suitable manner to switch to a different set of frequency selections during the inground operation. For example, switching can be commanded based on a predetermined roll sequence of the drill string or by transmission of an electromagnetic signal from above ground for reception by transmitter 130 which is, in this case, configured as a transceiver. Some embodiments can use the drill string as an electrical conductor or can include a well-known wire-in-pipe arrangement such that data can be transmitted between the inground transmitter/transceiver and the drill rig. For example, the drill rig can send a command via the drill string to cause the depth frequency to change.

Figure 10A:
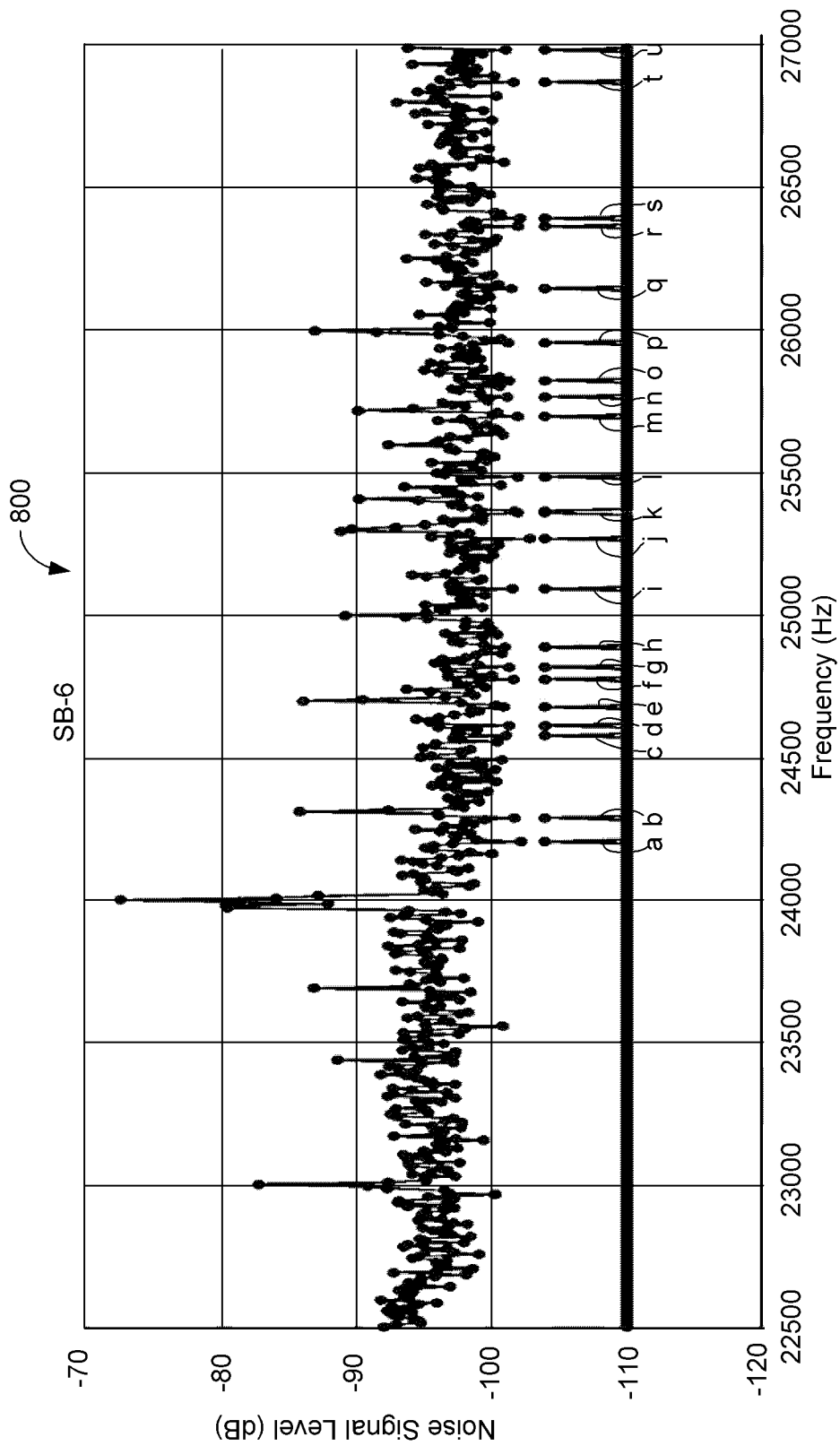
Figure 10B:
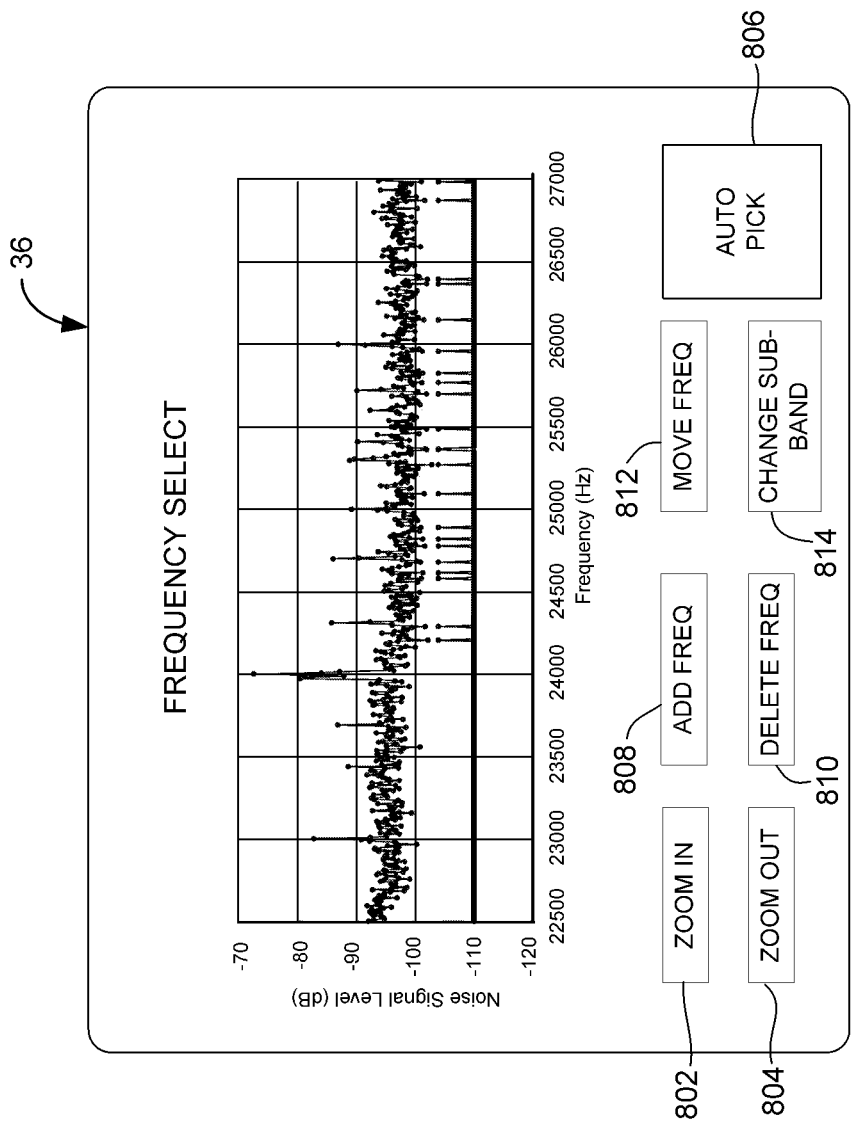
FIG. 10b is a diagrammatic illustration of one embodiment of a screen shot illustrating the appearance of sub-band 6 on a display screen for purposes of operator selection and modification of symbol frequencies, as well as other functions in accordance with the present disclosure.

Attention is now directed to FIG. 10a which is an expanded view of sub-band 6 from FIG. 6a, generally indicated by the reference number 800. For purposes of the present discussion, it will be assumed that SB-6 is available and has been selected by the operator for use during the inground operation. Having selected a sub-band, the frequencies for depth signal 120 and data signal 122 can be established. In an embodiment, the frequencies can be predetermined, for example, by the manufacturer or based on a previous noise scan, as described above. In another embodiment, display 36 can be used to represent the spectral plot of FIG. 10a, in any suitable form, to an operator of the locator such that the operator can make frequency selections. FIG. 10b illustrates one embodiment of a screen shot which shows display 36 illustrating SB-6. It should be appreciated that the locator can provide a zoom function on display 36 that uses Zoom In button 802 and Zoom Out button 804 such that the operator can expand the horizontal extents of the spectral display to provide for detailed frequency selection. Generally, the operator can select frequencies that correspond to low noise points on the displayed spectrum. The selections can be rounded to reflect the frequency resolution of the transmitter that is to be used. As discussed above, embodiments of transmitters according to the present disclosure can have a frequency resolution of 5 Hz, by way of non-limiting example. Twenty-one low noise points are identified on FIG. 10a indicated as upticks (a)-(u). In an embodiment using one depth frequency for depth signal 120 and 16 symbol frequencies, seventeen of these 21 frequencies can be utilized. As described above, the depth frequency can be located at any position within the sub-band, intermingled with the symbol frequencies, at either end of the sub-band or even in a different sub-band. As one example, the depth frequency can be selected as the lowest noise point among the identified frequencies, which is frequency (j) in the present example. In still another embodiment, the frequencies can be automatically picked or re-picked by locator 20, for example, responsive to the operator selecting an "Auto-Pick" button 806 on display 36. In one embodiment, processor 710 can examine the spectrum of FIG. 6a to identify the lowest noise points until a suitable number of symbol frequencies is available. In other embodiments, the processor can perform the selection process based on any suitable method. For example, the lowest noise frequencies can be selected in conjunction with maintaining a minimum separation between adjacent frequencies.

Still referring to FIG. 10b, a frequency can be added, for example, by touching an Add Frequency button 808 and then touching the spectral plot. A frequency can be deleted, for example, by touching a Delete Frequency button 810 and then touching the frequency to be deleted. A frequency can be moved, for example, by touching a Move Frequency button 812 and then touching and dragging the frequency to be moved. The selected sub-band can be changed by touching a Change Sub-Band button 814. As will be further described immediately hereinafter, frequency selection is not limited to identification of low noise points but also can consider high noise points or areas of the spectral scan.

Figure 11:
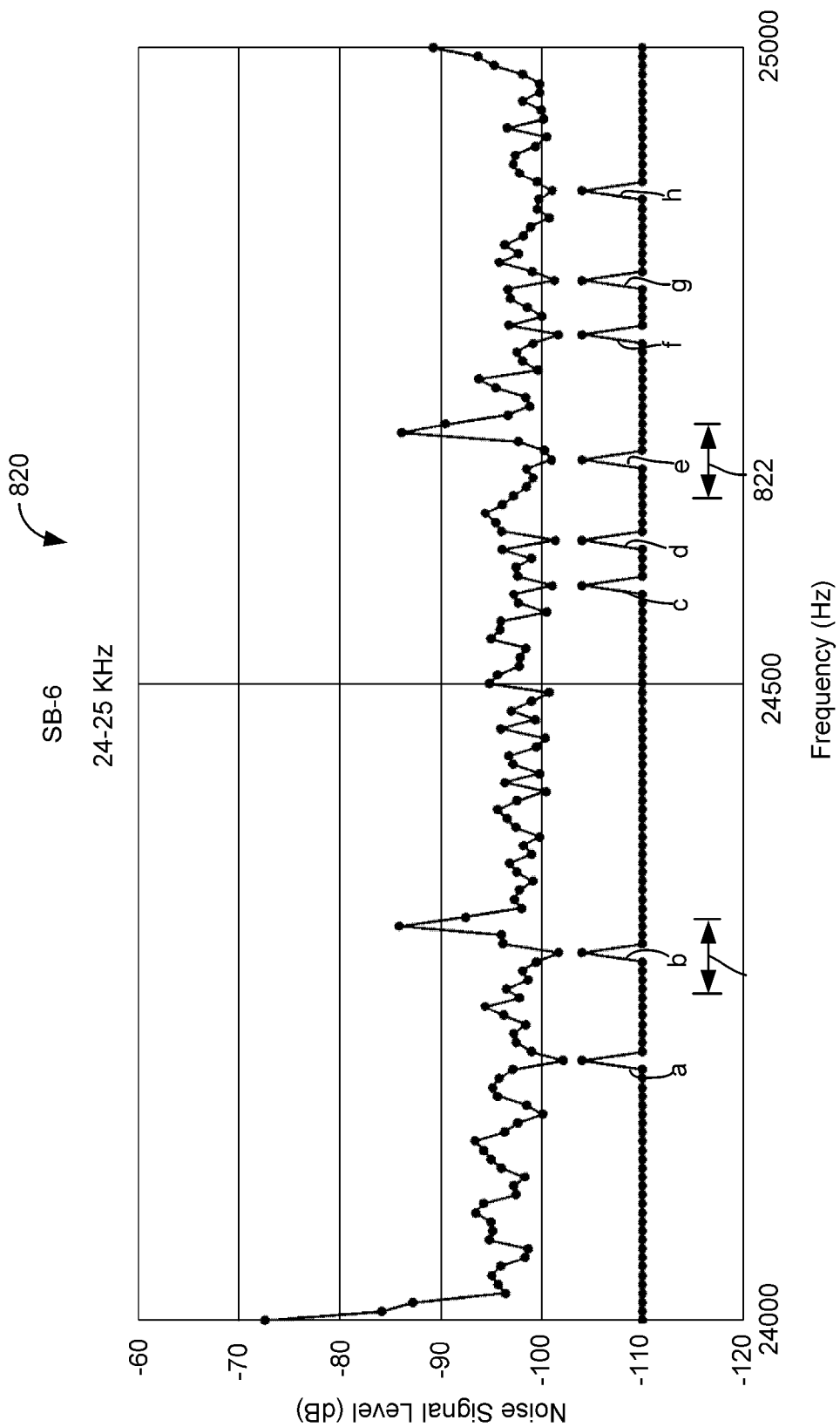
FIG. 11 is a further enlarged view of a portion of sub-band 6 of FIGS. 10a and 10b, shown here for purposes of describing further details with respect to symbol frequency selection.

FIG. 11 is a further expanded view of the spectral region of FIG. 10a from 24 KHz to 25 KHz, generally indicated by the reference number 820 and shown here for purposes of describing further details with respect to frequency selection. In addition to identifying low noise points, as described with regard to FIG. 10a, processor 710 can apply what can be referred to as a "keep-out region". The later will exclude any identified low noise frequency having a noise peak within a selected frequency window 822 that is centered on that low noise frequency. The noise can be identified, for example, based on a magnitude that exceeds a threshold 824 based on the average noise value for the sub-band and/or the noise value associated with the nearby low noise point. In an embodiment, the frequency window can be approximately 60 Hz (+/−30 Hz) in width and the threshold can be 10 dB or more above the associated low noise point. Based on the use of such a frequency window, frequencies (b) and (e) can be excluded due to the proximity of peaks 826 and 830, respectively. In the event that more frequencies are needed, processor 710 can re-examine the spectrum of FIG. 11 for purposes of identifying a new set of frequency candidates.

Figure 12:
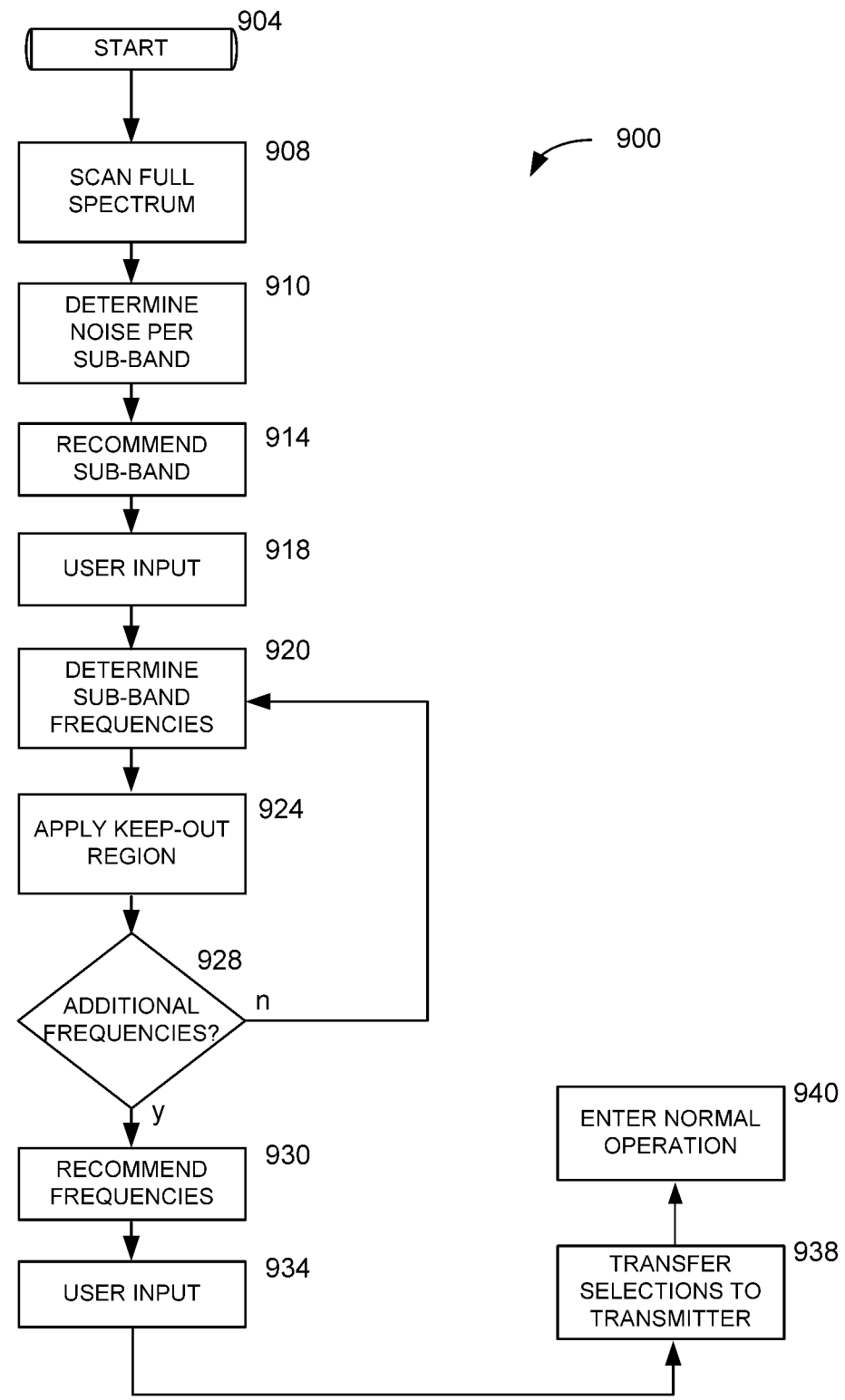
FIG. 12 is a flow diagram illustrating an embodiment of a method for operating a portable device in accordance with the present disclosure for purposes of spectral scanning and symbol frequency assignment.

FIG. 12 is a flow diagram that illustrates an embodiment of a method, generally indicated by the reference number 900, for the operation of locator 20 in performing spectral scanning and frequency assignment in accordance with the present disclosure. The method begins at 904 and proceeds to 908 which performs a scan of the full frequency spectrum, for example, from 0 Hz to 45 KHz for the present embodiment, although any suitable range can be used for this scan. The scan can be a high-resolution scan, for example, utilizing a resolution of 5 Hz, as discussed above. In another embodiment, an initial, lower resolution scan can be utilized such that the resolution is just sufficient to establish an average noise value for each sub-band. If the sub-band selection process relies on a lower resolution spectral scan, a high resolution spectral scan can subsequently be performed as part of the frequency selection procedure, described below. When a wideband transmitter will be used for the inground operation, a single high resolution scan can be employed for frequency selection purposes. At 910, the average noise value per sub-band is determined. At 914, a sub-band can be recommended based on the average noise values. Generally, the sub-band having the lowest average noise value can be recommended, although other embodiments can utilize different recommendation protocols. For example, the sub-band having the lowest noise peak value can be recommended. By way of another example, as discussed above, more than one sub-band can be recommended. At 918, user input can be requested on display 36 wherein the user can accept the recommended sub-band or choose a different sub-band. For example, the user may choose a different sub-band based on an awareness of transmitters that are available for performing the inground operation. As discussed above, this information can serve as an initial input such that method 900 excludes sub-bands that are not covered by the currently available transmitter(s). Once the sub-band has been selected, the method proceeds to 920 which determines the sub-band frequencies. In an embodiment, the sub-band frequencies can be predetermined and stored in memory 714 of the locator or in memory 218 of the transmitter. In another embodiment, the sub-band frequencies can be determined by the operator on-the-fly by presenting the sub-band on display 36, as discussed above. In another embodiment, the sub-band frequencies can be determined automatically in accordance with the discussions relating to FIGS. 10 and 11 with or without the application of a keep-out window as applied by step 924. In the instance of the use of a wideband transmitter for performing the inground operation, steps 910 and 914 are not required since the entire transmission bandwidth can be available for frequency selection without the need to confine the frequencies to any particular sub-band(s) and step 920 can allocate frequencies across the entire transmission bandwidth. Accordingly, transmission frequencies can be selected automatically across the entire available bandwidth and/or customized by the user based on a high resolution noise scan without the need for frequency assignment limitations based on sub-bands. It should be appreciated that an embodiment of a wideband transmitter can be configured to operate, for example, based on operator preference, using sub-bands in the same manner as sub-band limited transmitters wherein frequency assignment can be confined to one or more sub-bands, although this is not required. At 928, a determination is made as to whether a sufficient number of frequencies have been identified. If not, operation returns to 920 for identification of additional frequencies. If a sufficient number of frequencies have been identified, operation proceeds to 930 which recommends frequencies for depth signal 120 and data signal 122. This latter step may be optional in a fully automated embodiment. At 934, information can be presented on display 36 for purposes of gathering user input, for example, approving the frequency selections or changing the frequency selections. For instance, the user may prefer to move the depth frequency to a different location within the sub-band or to an altogether different sub-band. Of course, in a wideband transmitter embodiment, no restrictions need be imposed with respect to limiting frequency selection to a particular band and/or sub-band. At 938, the frequency selections can be transferred to transmitter 130 using external communication arrangement 722 of the locator and external communication link 174 (FIG. 3) of the transmitter. Normal operation can then be entered at 940.

In an embodiment of method 900, the number of frequencies that is selected can be based on the noise environment. For example, if a noise scan, whether sub-band limited or not, shows a low noise environment, relatively more frequencies can be selected. In this case, 32 or more symbol frequencies can be used instead of 16 symbol frequencies. If the noise scan shows a high noise environment, relatively fewer symbol frequencies can be used such as, for example, 4 or 8 symbol frequencies instead of 16 frequencies. Generally, the use of relatively fewer frequencies can aid in avoiding variable noise sources in a high interference environment. On the other hand, using a higher number of symbol frequencies can increase data throughput.

Figure 13:
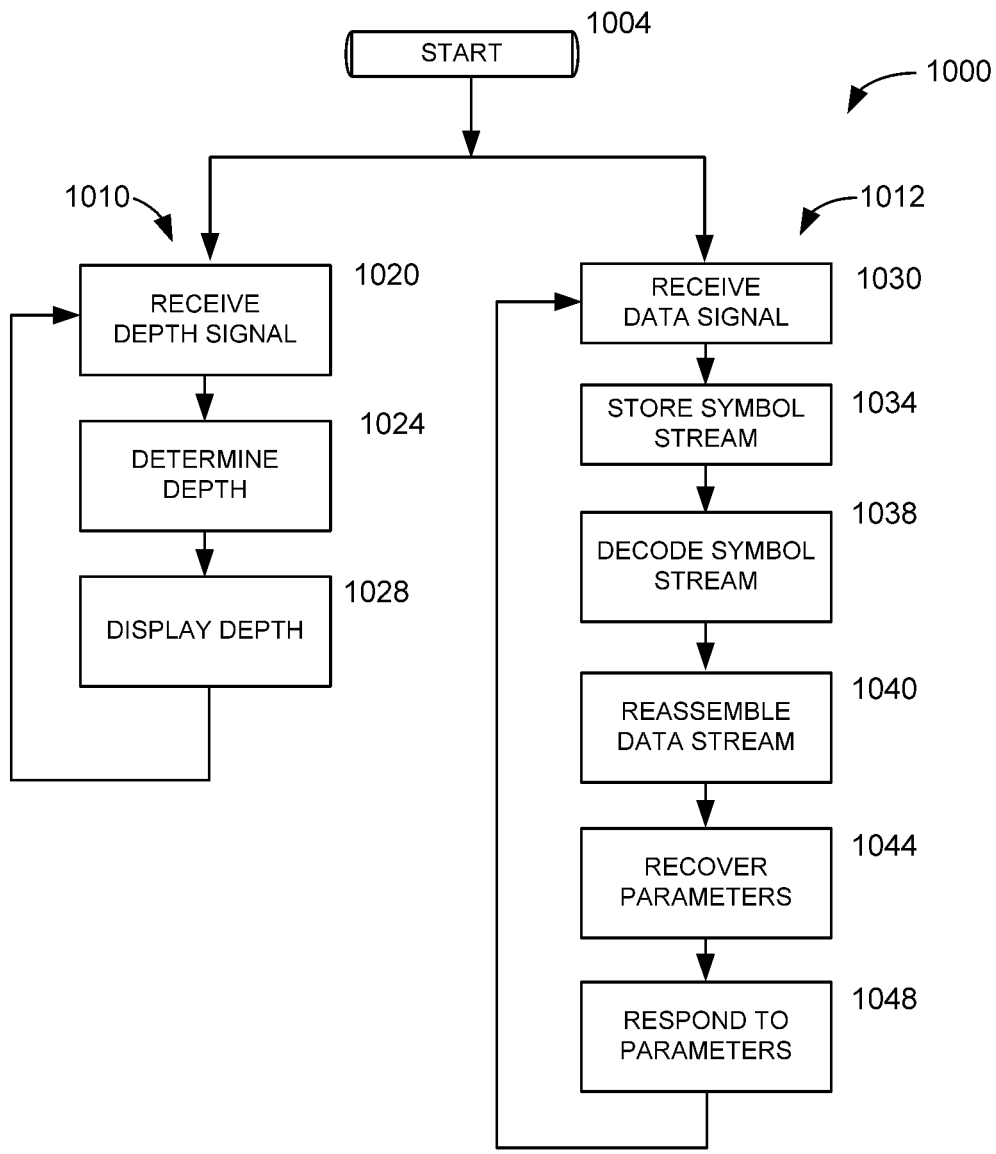
FIG. 13 is a flow diagram illustrating an embodiment of a method for operating a portable device in accordance with the present disclosure in a normal mode during an inground operation.

FIG. 13 is a flow diagram illustrating an embodiment of a method for operation of locator 20 in a normal mode during an inground operation, generally indicated by the reference number 1000. The method begins at 1004 and proceeds simultaneously along a depth determination branch 1010 and a data recovery branch 1012. Depth branch 1012 receives depth signal 120 at 1020 and then determines the depth of the transmitter at 1024. Because the depth signal is transmitted on a dedicated frequency, the depth signal is receivable on an essentially continuous basis throughout the inground operation. Accordingly, steps 1020 and 1024 repeat in a loop fashion throughout the normal operation mode of the locator. As described above, step 1024 can utilize the depth signal to determine the depth of the transmitter based on the dipole equations. In an embodiment, part of the depth determination can include compensation for the distance of the locator above the surface of the ground. Data recovery branch 1012 begins at 1030 with reception of data signal 122 in the form of a symbol stream that can be made up of multi-bit symbols. At 1034, the symbol stream can be temporarily stored for decoding, for example, in memory 714 (FIG. 9). At 1038, processor 710 decodes the symbol stream. In this regard, one of the symbols can be used as a synchronization symbol that can identify the start of a packet structure. In an embodiment that uses a 4 bit symbol (i.e., 16 symbol frequencies), a seventeenth symbol frequency can be added for purposes of representing a synchronization symbol in the symbol stream. One suitable packet structure, by way of non-limiting example, can be represented by a series of 4-bit variables as S, P1, R1, P2, R2, BT1, BT2, R3 wherein S has a fixed value that corresponds to the sync symbol, P1 is a variable representing the first four bits (0-3) of a pitch value, R1 is a first roll variable characterizing the roll orientation, P2 is bits 4-7 of the pitch value, BT1 is a first four bits (0-3) of battery and temperature data, BT2 is bits 4-7 of battery and temperature data, and R3 is a third roll variable. In this regard, it should be appreciated that the pitch value is accumulated based on two different variables corresponding to two symbols in the symbol stream that are separated by another symbol. That is, the four bits of P2 can be appended to the four bits of P1 to represent a complete pitch value. Still further bits can be appended based on another pitch variable, if desired. Similarly, 8 bits of battery and temperature data can be assembled based on two successive variables BT1 and BT2. At 1040, a data stream can be reassembled based on the decoded symbol stream to reconstruct the original data that was the basis for the symbol stream in transmitter 130. At 1044, processor 710 recovers parameters from the data stream. These parameters can represent orientation parameters such as pitch and roll, temperature, pressure, battery voltage and current, and any other data that is of interest. At 1048, processor 710 responds to the recovered parameters in any suitable manner such as, for example, by driving display 36 to indicate pitch and roll, battery status, temperature and pressure and/or as inputs for other processes such as, for example, providing warnings when thresholds relating to temperature and pressure have been violated. Operation then returns to step 1030.

Still considering the operation of transmitter 130 in the normal mode, it should be appreciated that transmission power can be allocated unevenly between the various frequencies that are transmitted such as, for example, those that are shown in Table 3. In one embodiment, each frequency can be allocated an equal amount of transmission power. In another embodiment, transmission power can be allocated non-uniformly among the frequencies. For example, one or more frequencies can be assigned a higher transmission power than another group of frequencies. In still another embodiment, each frequency can be assigned a different transmission power. Such power allocation can be performed in any suitable manner. For example, in an embodiment, portable device 20 of FIGS. 1 and 9 can be configured to monitor the average signal strength associated with each frequency as each frequency is received during normal operation. Transmission power can then be reallocated on-the-fly among the frequencies based on a running average signal strength. For example, a sudden increase in signal strength of a given frequency will generally be attributable to interference such that additional power can be allocated to that frequency. In some embodiments, low noise frequencies can be allocated relatively lower transmission powers while higher noise frequencies can be allocated relatively higher transmission powers. The reallocated transmission power values can be transferred to transmitter 130 in any suitable manner. For example, portable device 20 can transmit the reallocated power scheme to drill rig 80 via telemetry signal 44. The drill rig can then transfer the new power scheme to transmitter 130 via the drill string by using the latter as an electrical conductor. In another embodiment, portable device 20 can be configured with an additional antenna 712 (FIG. 1) such as a dipole antenna for transmitting a signal for direct reception by transmitter 130. Modulation of this signal can be decoded by transmitter 130 to recover the new power scheme.

Referring again to FIG. 10b, power allocation among selected frequencies can also be performed during the frequency selection process or mode, prior to entering normal operation. For example, power allocation can be based on a noise value that is associated with each selected frequency, as shown in FIGS. 10 and 10a. Although the low noise frequencies identified in FIGS. 10 and 10a appear to exhibit relatively equal noise values for illustrative purposes, this may not necessarily be the case. If there is significant variation among the noise values for the lowest noise frequencies that are identified, transmission power can allocated in a higher proportion to those frequencies exhibiting relatively higher noise values. Conversely, transmission power allocated to a very low noise frequency can be relatively low to allow for additional power allocation to one or more other frequencies. Transmission power can also be allocated in a manner that is consistent with the application of a keep-out window, as described above. For example, if a particular frequency is selected such that a powerline harmonic or other noise anomaly falls within a keep-out widow for that particular frequency, additional power can be allocated to the particular frequency. It should be appreciated that in any embodiment that uses allocated transmission power that can vary from frequency to frequency, such allocation can be performed based on overall power consumption, particularly when transmitter 130 is battery powered. In this way, the overall power consumption can be reduced or a target overall power consumption can be maintained.

Figure 14:
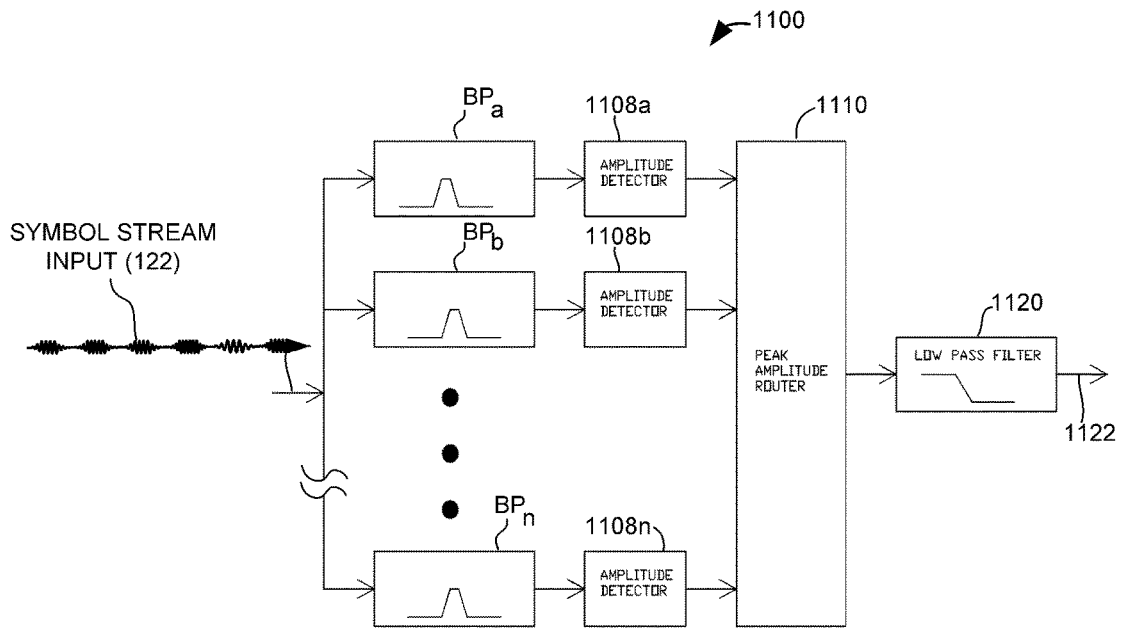
FIG. 14 is a block diagram illustrating an embodiment of a depth detector for determining the depth of the transmitter based on reception of symbol frequencies in accordance with the present disclosure.

Turning now to FIG. 14, in another embodiment, system 10 can be configured for depth determinations based on data signal 122 such that transmission of the depth signal is not necessary. It is noted that receiver 20 of FIG. 9 can be configured to include any of the described detectors described hereinafter. FIG. 14 is a block diagram of an embodiment of a depth detector, generally indicated by the reference number 1100 that forms part of locator 20. In this embodiment, a series of n band-pass filters $BP_a$-$BP_n$ are shown with each band-pass filter being wide enough to allow symbols of each frequency to pass therethrough. In an embodiment, a band-pass filter is provided for every symbol frequency a-n. The filter outputs are provided to respective ones of amplitude detectors 1108a-1108n each of which provides an output to a peak amplitude router 1110 which monitors the outputs of the amplitude detectors to determine which amplitude detector is providing the highest output value. During operation, peak amplitude router 1110 transfers the highest detected amplitude output to a low-pass filter 1120. An output 1122 of the low-pass filter is proportional to the depth of the transmitter for purposes of depth calculation.

Figure 15:
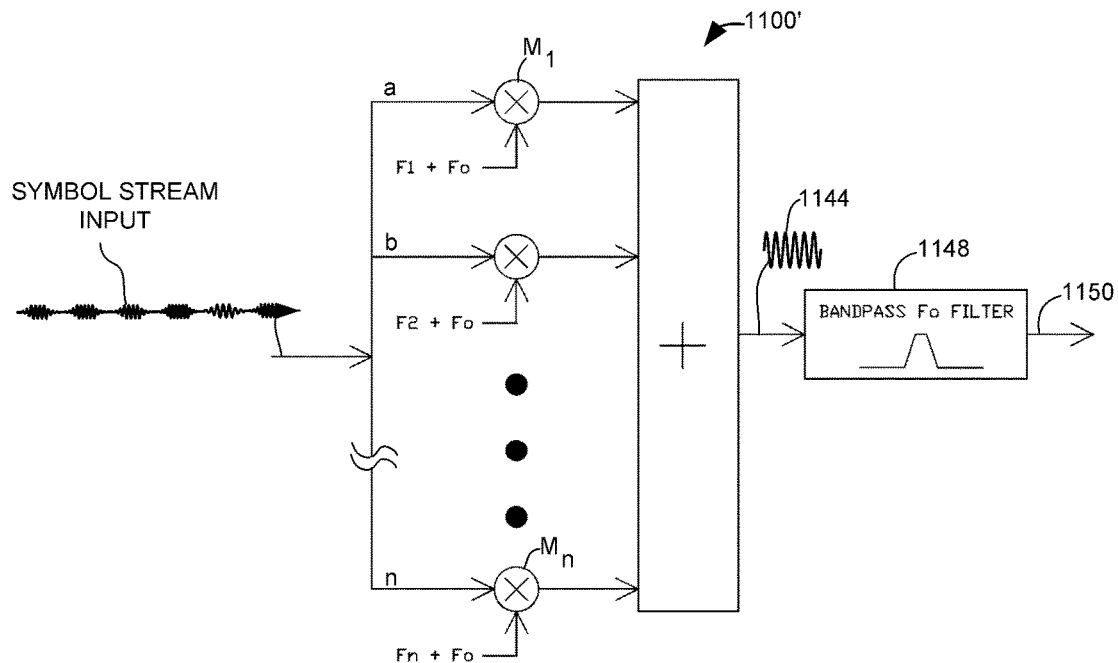
FIG. 15 is a block diagram illustrating another embodiment of a depth detector for determining the depth of the transmitter based on reception of symbol frequencies in accordance with the present disclosure.

Referring to FIG. 15, another embodiment of a depth detector is generally indicated by the reference number 1100'. In this embodiment, n multipliers $M_1$-$M_n$ multiply each frequency or tone by a different frequency that is offset by a constant amount from one frequency to the next. The resulting signal for each frequency or tone is comprised of the sum of the two frequencies and the difference of the two frequencies which is equal to the offset. For n multipliers each with the correct multiplier frequency, the outputs can be added by an adder 1140 resulting in a phase continuous signal 1144 at the offset frequency. The phase continuous signal is provided to a narrow band-pass filter 1148. An output 1150 of band-pass filter 1148 is then proportional to the depth of the transmitter.

Figure 16:
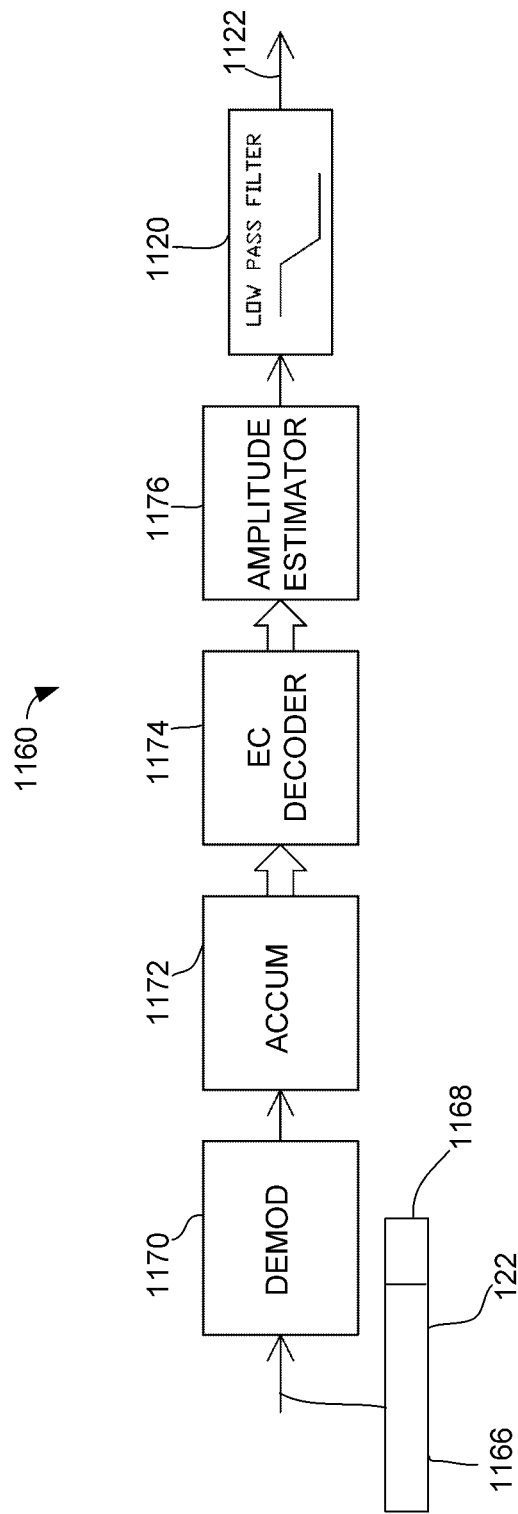
FIG. 16 is a block diagram illustrating yet another embodiment of a depth detector for determining the depth of the transmitter by using an error correction code to correct amplitudes associated with received symbols.
Figure 17:
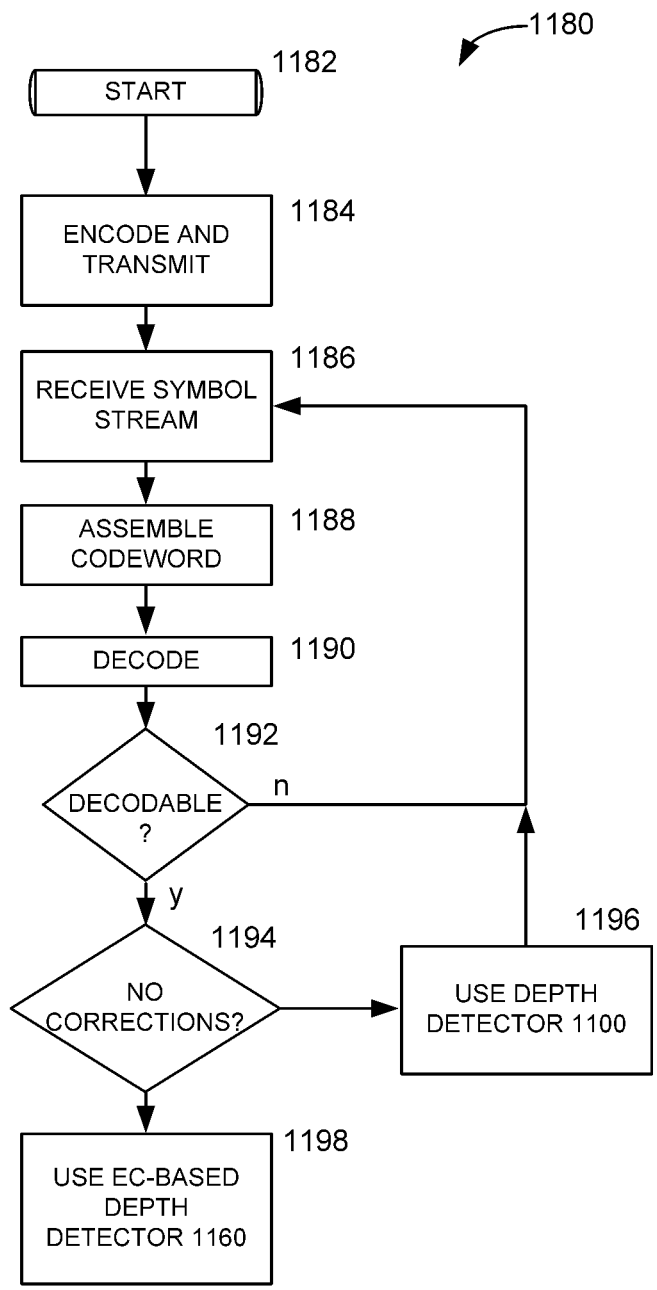
FIG. 17 is a flow diagram illustrating an embodiment of a method for depth determination based on the reception of symbol frequencies, in accordance with the present disclosure.

Referring to FIG. 16, still another embodiment of a depth detector is generally indicated by the reference number 1160. In this embodiment, an input 1162 receives input symbol stream 122 subject to an error correction code such as, for example, a Reed Solomon (RS) code. The latter can be applied by an EC (Error Correction) Encoder 1164 of FIG. 3 via processor 200. FIG. 17 illustrates a Reed Solomon codeword as part of the symbol stream including a block of data symbols 1166 starting with a sync symbol to which is appended a block of RS correction or parity data 1168. It is noted that data symbols and Reed Solomon symbols can be transmitted in a variety of different ways. For example, the RS symbols can be appended as a block, as illustrated. In another embodiment, the RS symbols can be interspersed among the data symbols. The input symbol stream is received by a demodulator 1170 which recovers the data stream subject to potential transmission errors. It is noted that the RS code is capable of correcting up to a certain number of symbols per RS codeword, based on parameters that are well-known. In the present embodiment, up to two symbols can be corrected. The recovered symbol stream is transferred to an accumulator 1172 which can buffer the recovered data for purposes of identifying the RS codewords as part of the data stream. As part of the data, a received amplitude can be associated with each data symbol. The start of a codeword, for example, can be identified based on the presence of a synchronization symbol. Once a codeword is available, the codeword can be transferred to an Error Correction (EC) Decoder 1174. The EC decoder then decodes the codeword and performs corrections up to the limit of the correction capability of the code. Each corrected symbol is identified as such during this process. At 1176, an amplitude estimator associates correct amplitudes with the symbols that were corrected by the RS code. In this regard, it should be appreciated that a symbol that was incorrectly identified by demodulator 1170 is misassociated in terms of symbol frequency. Estimator 1176 corrects this misassociation. The corrected symbol frequency amplitudes are transferred to low pass filter 1120. An output 1122 of the low-pass filter is proportional to the depth of the transmitter for purposes of depth calculation. In an embodiment, the depth determination can be based on a number of amplitude values from one or more symbol frequencies.

Attention is now directed to FIG. 17 which is a flow diagram illustrating an embodiment of a method, generally indicated by the reference number 1180 for depth determination based on symbol frequencies and without the need to transmit a depth signal. The method begins at 1182 and proceeds to 1184 which encodes and transmits symbol stream 122 from an embodiment of a transmitter in accordance with the present disclosure, subject to an error correction code such as, for example, a Reed Solomon code. At 1186, the symbol stream is received by receiver 20 (FIG. 9). At 1188, the received symbol stream is buffered and the current RS codeword is recovered. At 1190, the codeword is decoded. At 1192, if it is determined that the current codeword is not decodable, since the number of symbols in error exceeds the correction capability of the code, operation is routed to 1186 to receive the next codeword such that the current codeword is ignored at least in terms of contributing to depth determinations. On the other hand, if the codeword is decodable, operation is routed to 1194. At 1194, if no symbols were corrected, operation proceeds to 1196 which utilizes depth detector 1100 of FIG. 14 to determine the depth of the transmitter. Operation then returns to 1186 to receive the next symbol. If one or more symbols were corrected, step 1194 routes operation to 1198 which utilizes error correction based depth detector 1160 of FIG. 16 to determine the depth of the transmitter.

Figure 18:
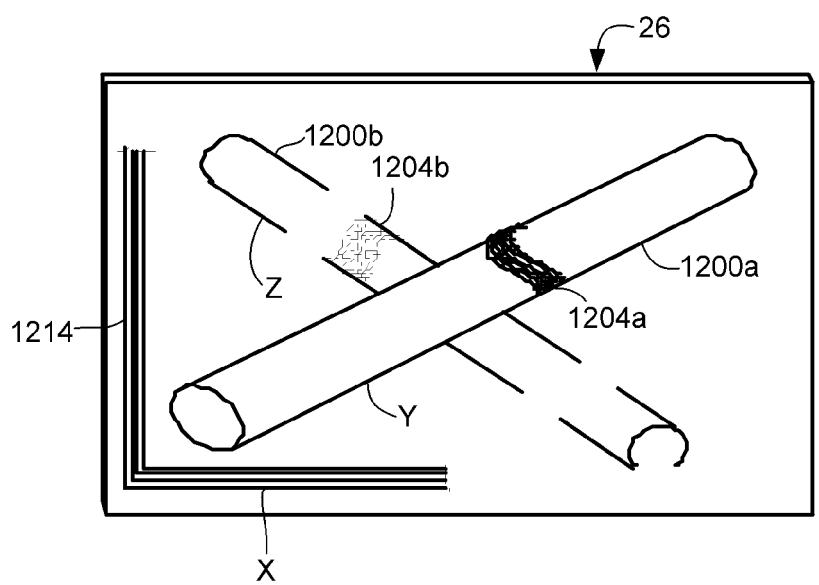
FIG. 18 is a diagrammatic illustration of an embodiment of an antenna for use in the portable device of FIG. 1.

Referring to FIG. 18, an embodiment of antenna 26 of FIG. 1 is shown in a further enlarged diagrammatic view for purposes of illustrating details of its structure. Antenna 26 includes first and second ferrite rod antennas 1200a and 1200b, each supporting a respective antenna coil 1204a and 1204b representing antennas Y and Z of FIG. 9. The ferrite rod antennas can be supported on opposite major surfaces of a printed circuit board (PCB) 1210. The latter defines an antenna coil 1214 (partially shown) that serves as antenna X in FIG. 9. As shown in the latter figure, the PCB is vertically oriented at least generally along the axis of the locator. It is noted, however, that the antenna may be oriented in any suitable manner within locator 20 and is not limited to the orientation that is shown.

In view of the foregoing, it is submitted that the system, associated apparatus and methods of the present disclosure sweep aside the limitations of the prior art with respect to attempt to the prior art hit or miss proposition of identifying a "magic" frequency. In contrast, the use of a multi-bit symbol stream structure, which assigns a different frequency to each symbol, can serve to enhance the data throughput rate and/or limit the transmitted spectral content to provide enhanced noise immunity. Further, the present disclosure provides for frequency customization which affirmatively avoids noise interference in a given region. This frequency customization can even be different at different times for the same region. Further, the present disclosure brings to light capabilities with respect to avoiding power line harmonic frequencies that are submitted to be heretofore unknown at least with respect to horizontal directional drilling for purposes of utility installation. In particular, symbol frequencies that are transmitted in the context of the present disclosure are modulated in a manner that places essentially no spectral content at adjacent power line harmonics. Prior art techniques, in contrast, often utilize a spectral modulation envelope that overlaps a number of powerline harmonics, thereby placing signal content on top of the powerline harmonics. On the receiver side, the overlapped powerline harmonics are then necessarily picked up along with the modulated signal. The present disclosure, in contrast, utilizes symbol frequency reception, based on the transmission technique that has been brought to light, which suppresses adjacent powerline harmonics. These capabilities arise at least on the basis of the transmission of a multi-bit symbol stream in a manner that provides for precision positioning of symbol frequencies while limiting and positioning the spectral bandwidth that is associated with each symbol of the symbol stream in a heretofore unseen manner relative to powerline harmonics.

Figure 19:
FIG. 19 is a diagrammatic illustration of a symbol stream including a silent sync implementation, in accordance with the present disclosure.

In another embodiment, system 10 can utilize what may be referred to as "silent sync" or "null sync." In this embodiment, instead of transmitting a sync symbol, a symbol interval is left blank, null or silent. This symbol interval may be referred to hereinafter as a null symbol. FIG. 19 illustrates another example output 390' of symbol channel PWM generator 352 (FIG. 4) in which the symbol stream, indicated as symbols 392b-392f, is preceded by a null symbol 1300 having the same time duration as one of the symbols in the symbol stream, although any suitable duration can be used. It should be appreciated that silent sync can be used with forms of modulation including, but not limited to Binary Phase Shift Keying (BPSK), Differential Binary Phase Shift Keying (DBPSK), Manchester encoding, Quadrature Phase Shift Keying (QPSK), M(ary)PSK and so on.

Figure 20:
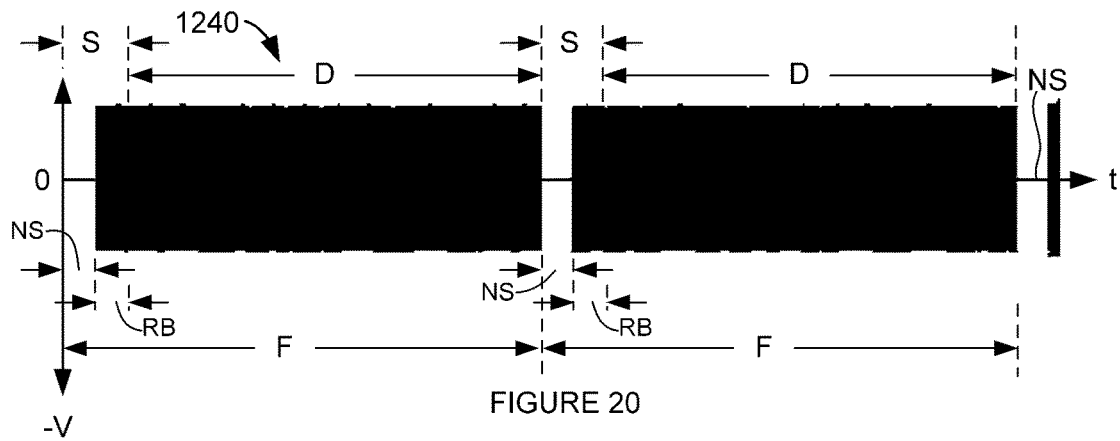
FIG. 20 is a diagrammatic plot of a transmitted data waveform, shown here to illustrate further details with respect to silent sync, in accordance with the present disclosure.

FIG. 20 illustrates an embodiment of a transmitted data stream, generally indicated by the reference number 1240, illustrating further details with respect to silent sync. For purposes of the present example, it is assumed that a form of modulation such as BPSK is used, although the present descriptions enjoy broad applicability with respect to modulation type. A frame interval F includes an overall duration that can correspond to a packet or frame of data. Frame interval F is made up of a sync portion S and a data portion D, comprising information that can be modulated based on one or more carrier frequencies. Sync portion S can be made up of a null symbol, NS, or null bit and a reference bit, RB. In the example of BPSK, a single carrier frequency can be utilized.

Figure 21:
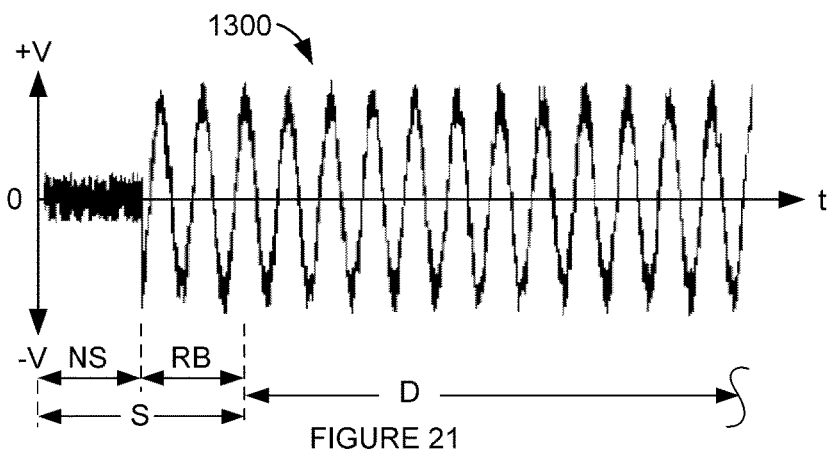
FIG. 21 is a diagrammatic further enlarged plot of a portion of a received signal based on the transmitted data stream of FIG. 20, shown here subject to noise.
Figure 22:
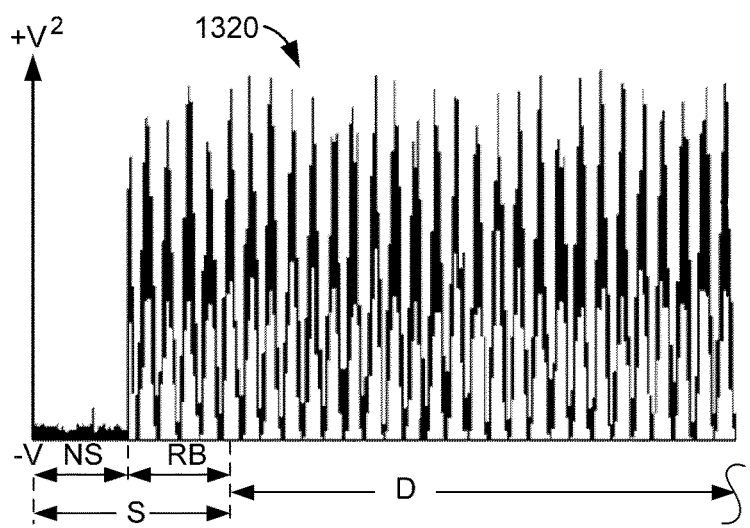
FIG. 22 is a diagrammatic plot illustrating a waveform that is the square of the waveform of FIG. 21 such that a null symbol is readily identifiable.

Referring to FIG. 21, a portion of a received signal, corresponding to the transmitted data stream of FIG. 20, is generally indicated by the reference number 1300. The received signal, subject to noise, is centered on 0 volts and is plotted against time on the horizontal axis. Sync portion S is shown along with part of data portion D. FIG. 22 illustrates a waveform 1320 that is the squared value of the waveform of FIG. 21. Although squaring is not required, based on squaring the waveform, null symbol NS is seen to exhibit a dramatically lower magnitude in FIG. 22 than the peak amplitudes that are present in reference bit, RB, and data portion D of the waveform such that the null symbol can readily be identified, for example, by storing the received signal in a buffer. It is noted that this technique can be effective even in environments with relatively high levels of interference and/or at depths of the boring tool that significantly decrease the signal-to-noise ratio. In high noise environments, ensemble averaging can be applied wherein multiple frames of data can be stored in buffer memory and then added for purposes of recovering synchronization. Ensemble averaging is described in detail, for example, in U.S. patent application Ser. No. 14/208,470 which is commonly owned with the present application and incorporated herein by reference.

Figure 23:
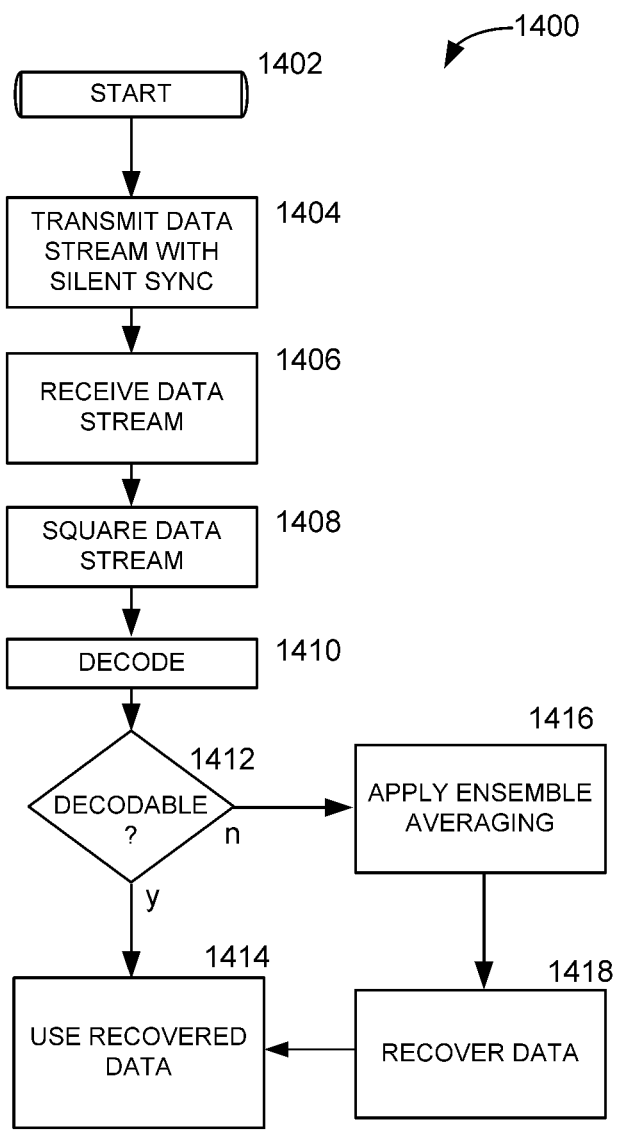
FIG. 23 is a flow diagram illustrating an embodiment of a method for operating the system of the present application using silent sync.

Attention is now directed to FIG. 23 which illustrates an embodiment of a method for operating the system of the present application using silent sync, generally indicated by the reference number 1400. The method starts at 1402 and proceeds to 1404 which transmits a data stream including a null sync portion or symbol. At 1406, the data stream is received. At 1408, the data stream can be squared. For relatively low noise environments, it should be appreciated that squaring the data stream may not be necessary. At 1408, the data stream is decoded, premised on an identification of the null sync symbol. At 1410, an attempt to decode the squared data stream is made including an identification of the null sync symbol. At 1412, if decoding was successful, operation proceeds to 1414 such that the recovered data is used. On the other hand, if the decoding attempt was unsuccessful, operation can proceed to 1416 such that ensemble averaging is applied. At 1418, data is recovered based on the ensemble averaging. The recovered data is then used at 1414.

It is well-known that the accuracy of a system for electronically measuring the depth of a boring tool while underground can be impaired as a result of skin effect that results from the conductivity of the earth. Without compensation, error can be introduced that can cause the boring tool to appear to be at a depth that is less than its actual depth. Techniques to compensate for skin effect error, as limited to influencing depth readings of the boring tool, are described in detail in U.S. Pat. No. 6,285,190 (hereinafter, the '190 patent) which is commonly owned with the present application and incorporated herein by reference. Applicants further recognize herein that a similar phenomenon at the surface of the ground, hereinafter referred to as "surface effect," can impair the accuracy of such a system while it is operated above ground, for example in connection with a customer demonstration or testing of the system. That is, with the boring tool and a portable device separated at the surface of the ground by a known distance, a signal-strength-based distance between the two, as determined by the portable device, can vary dramatically from the known distance absent surface effect compensation. While one might assume that the solution is to perform skin effect calibration at the surface of the ground to compensate for the surface effect, the '190 patent recognizes that skin effect calibration at the surface of the ground is problematic during the actual drilling operation, since significant depth error can be encountered as compared to the depth error that is seen in response to a below ground skin effect calibration procedure. Based on the unresolved difficulties that are presented by the foregoing, Applicants bring to light a multi-mode arrangement which operates in an above ground mode to provide for enhancing signal-strength-based accuracy for above ground readings relating to surface effect and a below ground mode that does not apply the same surface effect compensation as the above ground mode such that below ground performance is not compromised with respect to depth reading accuracy. Accordingly, surface effect compensation in the above ground mode is different than the compensation, if any, that is applied in the below ground mode. In some embodiments, the below ground mode can apply skin effect compensation. In other embodiments, the below ground mode can operate without skin effect compensation.

Figure 24:
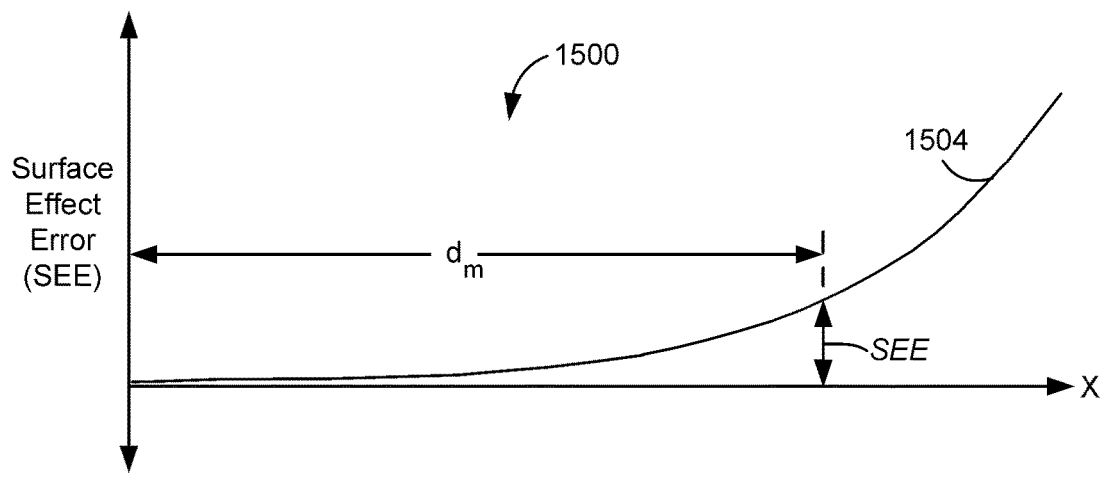
FIG. 24 is a plot that diagrammatically illustrates a surface effect error versus distance in accordance with the present disclosure.

Referring to FIG. 24, a plot is generally indicated by the reference number 1500 and illustrates surface effect error plotted on the vertical axis versus horizontal distance, on an X axis, between a portable device such as, for example, portable device 20 of FIG. 1 and a boring tool, or other transmitter that transmits an electromagnetic signal such as, for example, depth signal 120 of FIG. 2 or a modulated signal from which depth can be determined based on signal strength. Surface effect error 1504 can be characterized as:

$$SEE = kx^3 \qquad (EQN\ 2)$$

Where x is the separation or distance between the boring tool and the portable device, SEE is the Surface Effect Error and k is a constant for a particular measurement location. The constant k can vary by location as a result of active and/or passive interference in the region, soil conditions and other factors. It is noted that the SEE can be expressed in terms of any suitable function and is not limited to a cubic function. A calibration procedure based on Equation (2) can be performed by placing the portable device at a known or measured distance, $d_m$, from the boring tool at the surface of the ground. Applicant has identified that a suitable value of $d_m$ for performing the calibration procedure can be 50 feet; however, calibration can be performed with other values of $d_m$ so long as (1) the value of $d_m$ is not so small that the measured SEE at a particular measurement location is not appreciable, and (2) the value of $d_m$ is not so large that it is beyond the range of the measuring device. With this physical arrangement in place, the portable device determines a distance, $d_{SS}$, to the boring tool based on the signal strength of depth signal 120. The surface effect error value for measured distance $d_m$ is shown in FIG. 24 as an offset from the X axis at $d_m$ and can be determined based on:

$$SEE = d_m - d_{ss} \quad (EQN\ 3)$$

It should be appreciated that the value of SEE will generally be greater than zero, since the surface effect typically causes $d_{ss}$ to be less than $d_m$. Equation 2 can now be solved for the value of constant k using the value of SEE determined from Equation 3 and the measured value of $d_m$. Subsequently, compensation for surface effect can be applied based on Equation (2) using the determined value of k whenever the above ground range (AGR) between the boring tool and portable device is being determined based on signal strength. In particular, a compensated above ground range, $AGR_{COMP}$, value can be determined for any measured signal strength value $d_{ss}$ based on:

$$AGR_{COMP} = d_{ss}(1 + kd_{ss}^2) \quad (EQN\ 4)$$

Based on the foregoing, portable device 20 can be operated in an Above Ground Range Test (AGRT) mode that applies surface effect compensation to any signal-strength-based distance or range that is determined by the portable device. When the boring tool is below ground, portable device 20 can be operated in a normal mode that can be configured to determine depth of the boring tool based on signal strength without applying surface effect compensation or by applying skin effect compensation that is different than the manner in which the surface effect compensation is applied such that the depth of the boring tool can be established with a higher degree of accuracy. It is noted that surface effect compensation parameters and skin effect compensation parameters, if used, can be stored in memory 714 of the portable device as seen in FIG. 9.

Figure 25:
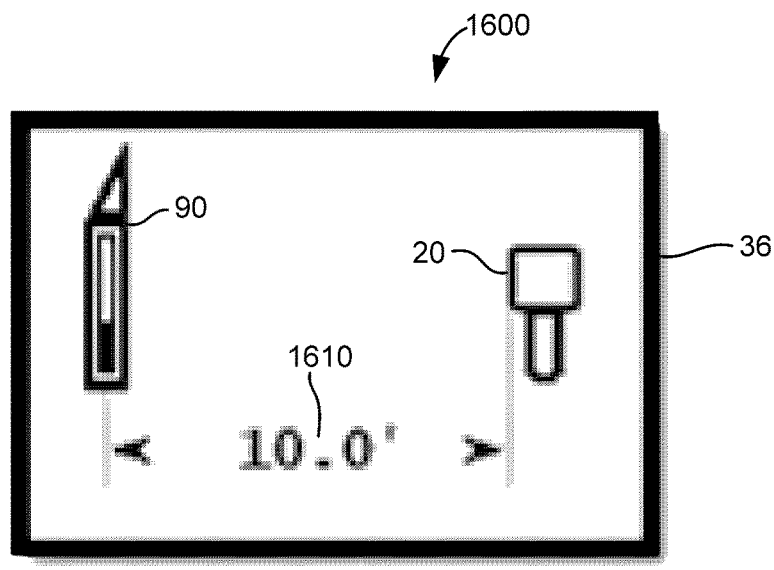
FIG. 25 is a diagrammatic illustration of an embodiment of the appearance of the display screen of a portable device operating in an above ground range test mode in accordance with the present disclosure.

FIG. 25 is a diagrammatic illustration of an embodiment of the appearance of display 36 (FIG. 1) of portable device 20, operating in the AGRT mode and generally indicated by the reference number 1600. Boring tool 90 is indicated in a laterally spaced apart relationship from portable device 20 with the surface effect compensated offset value indicated at 1610 as 10 feet. It should be appreciated that the graphics shown in the screen shot of FIG. 26 clearly indicate to the user that distance to the side of the locator is being shown, as opposed to depth beneath the locator. The AGRT mode can be entered, for example, based on an operator selection of the AGRT mode that is available on a calibration screen. Otherwise, the portable device operates in the normal mode.

Figure 26:
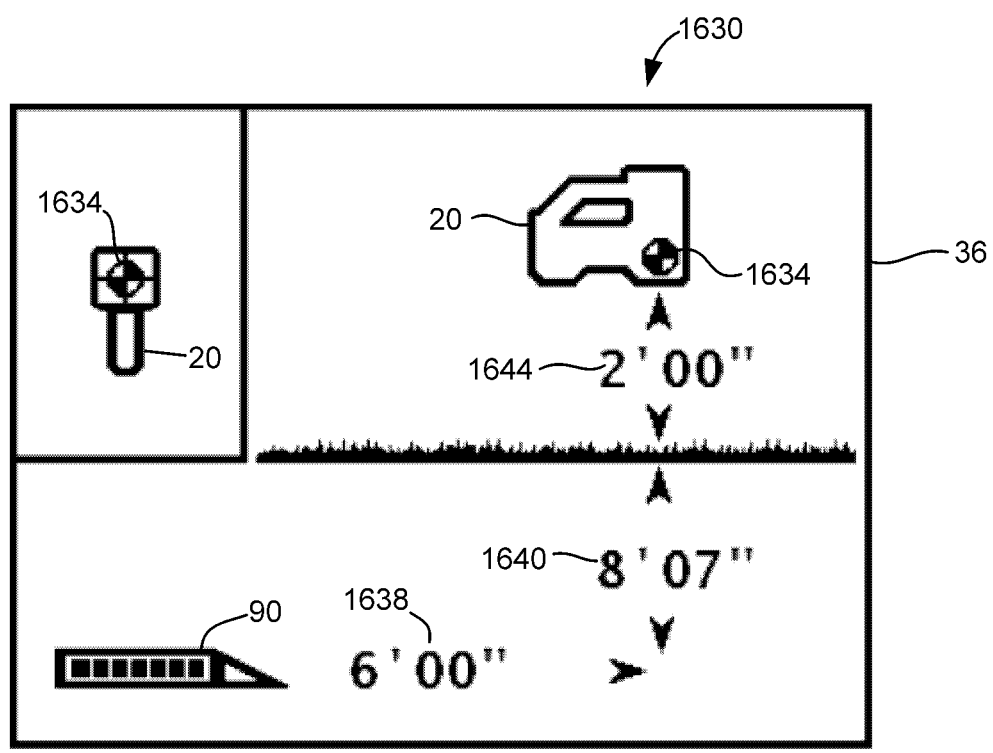
FIG. 26 is a diagrammatic illustration of an embodiment of the appearance of the display screen of a portable device operating in a normal mode in accordance with the present disclosure.

FIG. 26 is a diagrammatic illustration of an embodiment of the appearance of display 36 (FIG. 1) of portable device 20, operating in the normal mode, generally indicated by the reference number 1630. The portable device is seen in both an overhead view (upper left) and an elevational view (upper right). Boring tool 90 and the portable device are shown in relation to a forward locate point 1634. For additional information regarding the forward locate point see, for example, U.S. Pat. No. 6,496,008 which is commonly owned with the present application and incorporated herein by reference. A lateral distance 1638 from the boring tool to a position directly below the forward locate point is shown as 6 feet, 0 inches. A predicted depth of the boring tool 1640 at the boring tool, once the forward locate point is reached, is shown as 8 feet, 7 inches and a height above ground of the portable device 1644 is shown as 2 feet, 0 inches.

Figure 27:
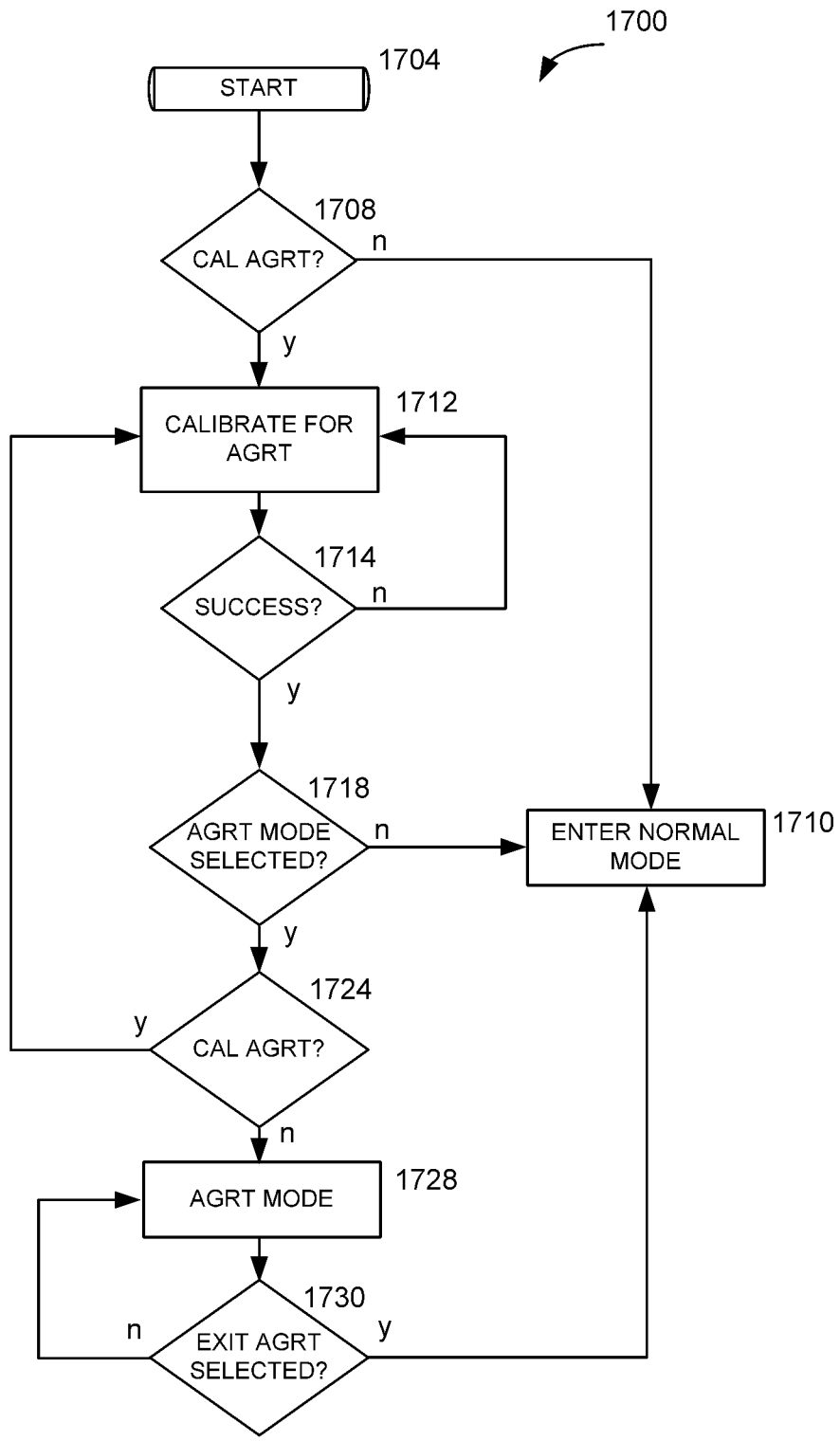
FIG. 27 is a flow diagram illustrating an embodiment of a method for operating a portable device in a dual mode configuration including an above ground range test mode and a normal mode in accordance with the present disclosure.

FIG. 27 is a flow diagram that illustrates an embodiment of a method, generally indicated by the reference number 1700, for the operation of portable device 20 in a dual mode configuration including an AGRT mode and a normal mode. The method begins at 1704 and proceeds to 1708 which monitors for a selection by the operator to perform a calibration for the AGRT mode. If AGRT calibration is not selected, operation proceeds to normal operation at 1710. On the other hand, if AGRT calibration is selected, operation moves to 1712 which initiates a calibration procedure, for example, as described above in connection with FIG. 25. At 1714, a determination is made as to whether the AGRT calibration was successful. The determination as to whether or not the AGRT calibration was successful can be based on various factors. For example, the determined value for constant k can be compared to an acceptable range. As another example, the value of k can be determined at different distances between the portable device and the boring tool and then compared. From the perspective of determining the value of k, based on Equation (20), one would expect the magnitude of the surface effect error to increase with increasing range between the portable device and the boring tool. If the calibration was not successful, step 1712 is reentered. If the calibration was successful, operation proceeds to 1718 which monitors for operator selection of the AGRT mode. If the operator does not select the AGRT mode, normal operation is entered at 1710. If the operator does select the AGRT mode, step 1724 allows the operator to return to 1712 for another AGRT calibration. If the additional calibration is not selected, the AGRT mode is entered at 1728. Step 1730 tests for whether or not the operator wishes to exit the AGRT mode, for example, based on actuating trigger 48 (FIG. 1). If the operator chooses to exit, normal operation 1710 is entered. Otherwise, operation is maintained in the AGRT mode. It should be appreciated that normal mode 1710 allows the operator to select calibration which can cause operation to return to 1724.

Figure 28:
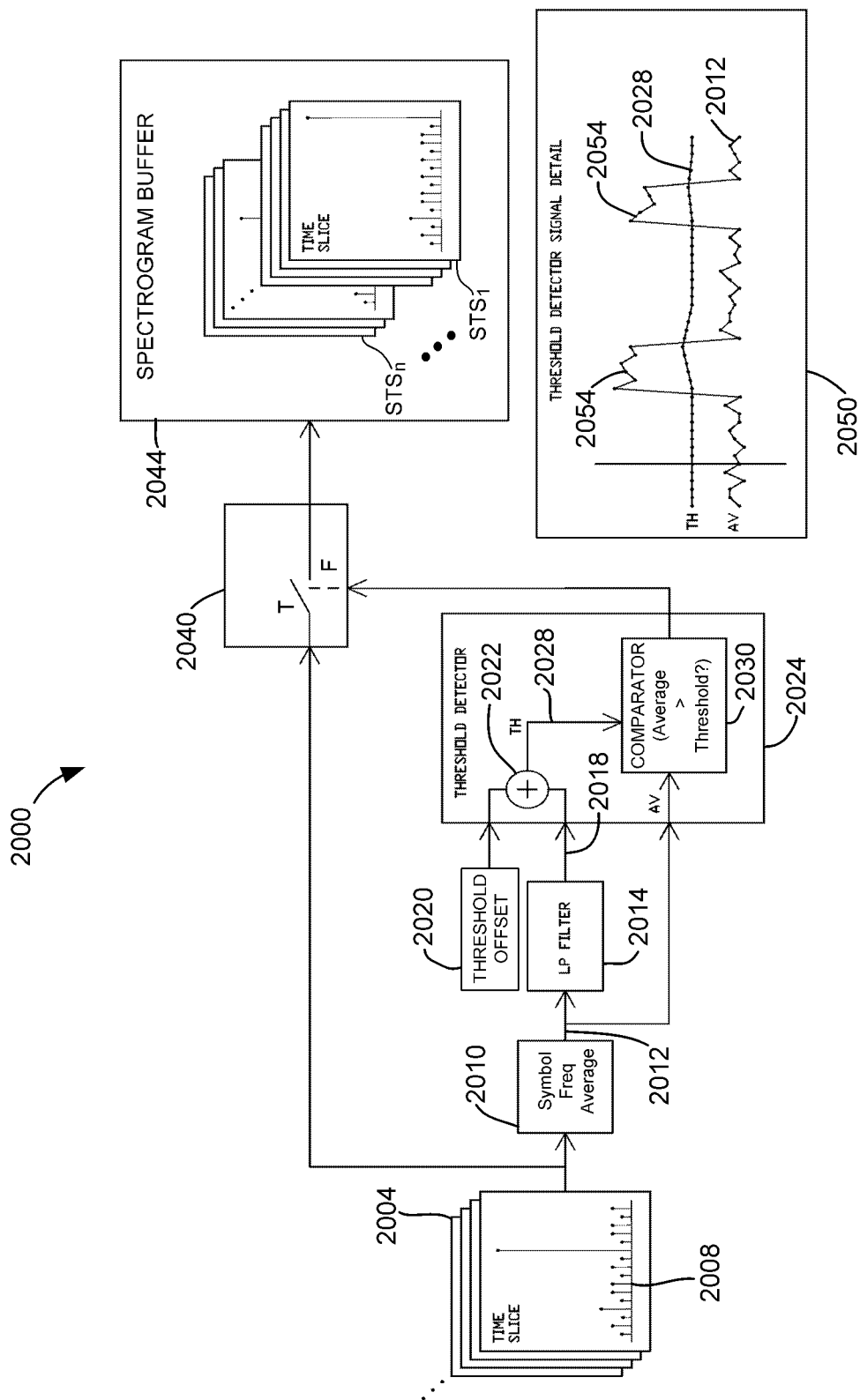
FIG. 28 is block diagram illustrating an embodiment of a receiver section, forming part of a portable device, which receives a multi-bit symbol stream in time slices for transfer to a spectrogram buffer and which excludes time slices from the spectrogram buffer that are determined as exceeding a noise threshold in accordance with the present disclosure.

Attention is now directed to FIG. 28 which is a block diagram of an embodiment of a receiver section, generally indicated by the reference number 2000 that can be implemented as part of device 20 of FIG. 9 for purposes of receiving and processing data signal 122. Receiver section 2000 includes a slicer for receiving the data signal in slices 2004 such that more than one slice is associated with the period of one symbol in the symbol stream that forms data signal 122. Each time slice may be referred to as a spectrogram time slice (STS). In the present embodiment, five time slices are received for each symbol period, although any suitable number of slices may be received. Accordingly, each symbol can be considered as being oversampled. Each STS characterizes the signal strength at all of the symbol frequencies that are in use, even though only one symbol frequency is active at any given time (see, for example, transmitter output 390 of FIG. 4). The active symbol frequency will generally be significantly higher in amplitude than the remaining frequencies, dependent upon the current noise environment. In the present example, 16 symbol frequencies 2008 are utilized, although the present description is applicable to any number of symbol frequencies. At 2010, for a current slice, an average signal level is determined for the combination of symbol frequencies that is in use such that the measured signal level at each symbol frequency contributes to the determined average signal level. The average signal level is output at 2012. A low pass filter 2014 applies filtering to the average signal level. Any suitable form of low pass filter such as, for example, a low pass Butterworth filter can be utilized. The low pass filter is configured with a time constant that is long compared to the time period of a symbol such that contributions from instantaneous noise events or pulses, represented as part of the average signal level of each time slice, are effectively averaged out. In this way, output 2018 of the filter tracks or follows the ambient noise level based on contributions of signal strengths from inactive symbol frequencies for each slice in combination with a contribution from an active symbol frequency. A threshold offset section 2020 specifies an incremental value to be added to the average signal level. The value that is added, for example, can correspond to some percentage of the average signal level such as, for example, a fixed amount. An adder 2022, which forms part of a threshold detector 2024, adds the value to output 2018 of the low pass filter to output a threshold at 2028. Average signal level 2012 is also received by a comparator 2030, which forms another part of threshold detector 2024. The comparator compares threshold 2028 to average value 2012 and drives a time slice switch 2040 responsive to this comparison. A spectrogram buffer 2044 is configured to selectively receive time slices from the time slice switch. The spectrogram buffer can include a length that provides for storing all of the time slices $STS_1$ through $STS_n$, that are associated with a complete packet. By way of non-limiting example, if a packet includes 20 symbol positions, some of which can be associated with error correction, and each symbol period is sliced five times, the spectrogram buffer is configured to store 100 time slices such that n=100. If comparator 2030 determines that current average value 2012 for a current time slice is greater than threshold 2028, time slice switch 2040 is set to the T (True) position such that the current time slice is not routed into one of the STS positions in spectrogram buffer 2044. As will be seen, the appropriate pointer STS position, in this case, is filled with zeros. On the other hand, if comparator 2030 determines that current average value 2012 is not greater than threshold 2028, time slice switch 2040 is set to the F (False) position such that the current time slice is routed into the appropriate one of the STS positions in the spectrogram buffer. Based on the foregoing and as shown by an inset plot 2050, it should be appreciated that average signal level 2012 will generally fall below threshold 2028, except during noise bursts 2054. Thus, slices that occur during noise bursts 2054 are blocked from contributing to the packet that is within the length of spectrogram buffer 2044.

Figure 29:
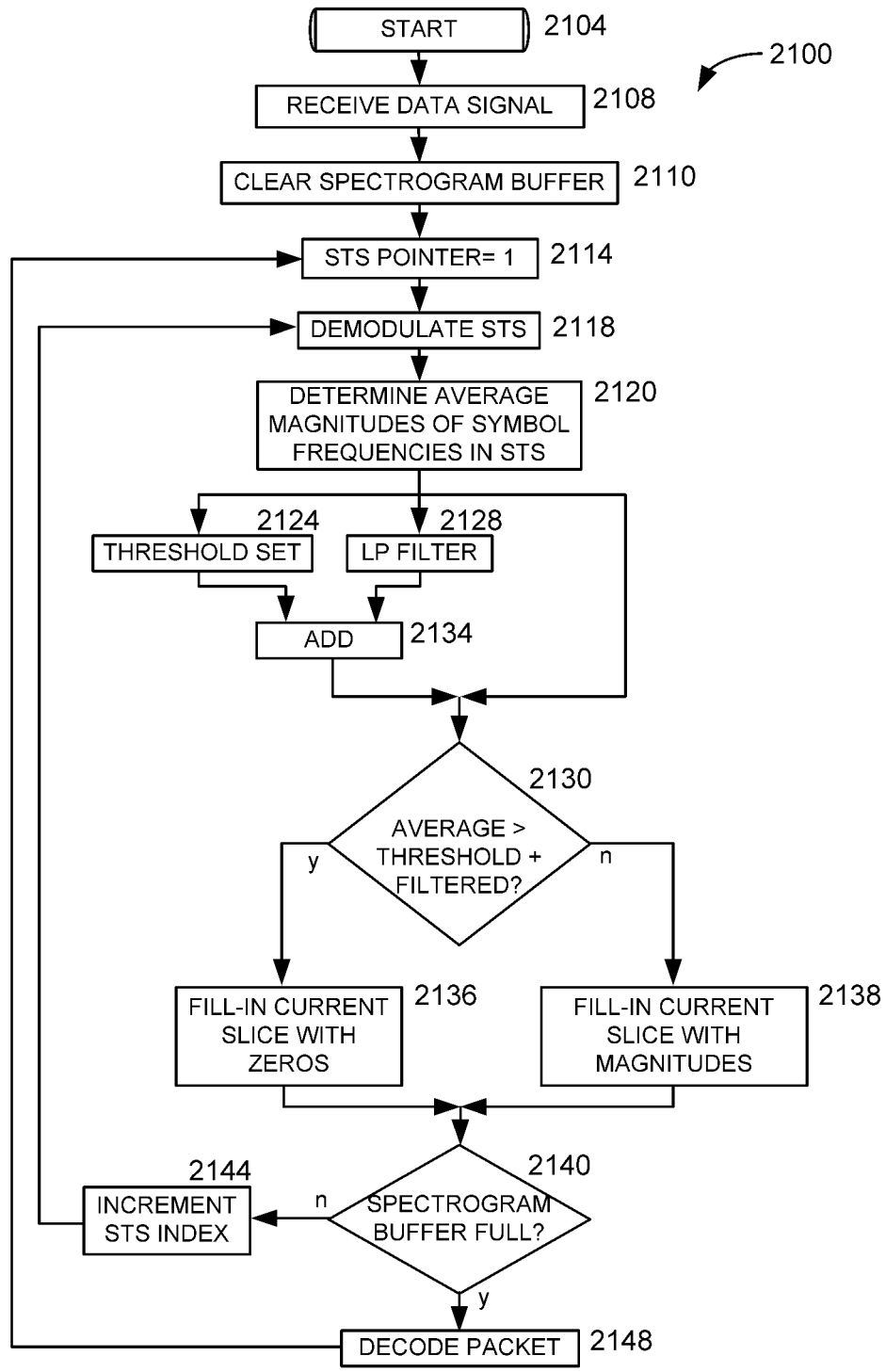
FIG. 29 is a flow diagram illustrating an embodiment of a method for loading spectrogram time slices into spectrogram buffer and for subsequently decoding the time slices to recover packet data in accordance with the present disclosure.

Attention is now directed to FIG. 29 which illustrates an embodiment of a method, generally indicated by the reference number 2100, for loading spectrogram time slices into spectrogram buffer 2044 of FIG. 28. The method begins at 2104 and proceeds to 2108 which receives data signal 122. At 2110, spectrogram buffer 2044 is cleared. At 2114, a spectrogram buffer pointer is reset to indicate a first one of the STS positions in the buffer. At 2118, the current slice is demodulated to measure the signal level at the frequency of each symbol in the slice. In the present example, 16 symbol frequencies are being employed such that 16 signal levels are determined. At 2120, an average signal level is determined based on the measured signal levels. The average signal level is transferred to a threshold set step 2124 (see item 2020 in FIG. 28), a low pass filter 2128 (see item 2014 in FIG. 28) and a comparison step 2130 (see item 2024 in FIG. 28). Threshold set 2124 adds an incremental value to the average signal level, as discussed above, and provides this value to an adder step 2134 (see item 2022 in FIG. 28). LP filter 2128 applies low pass filtering to the average signal level, as discussed above, and provides a filtered output to adder 2134. The latter adds the incremental value to the filtered output to provide a threshold to comparison step 2130. Comparison step 2130 compares the threshold to the current average value of the current slice. If the current average value is greater than the threshold, operation is routed to 2136 which loads the current STS position (pointed to by the STS pointer) with zeroes. In this way, instantaneous noise anomalies are not allowed to inappropriately increase the average value of a particular slice which can lead to an increase in decoding errors. On the other hand, if the current average value is less than the threshold, the current STS position is loaded at 2138 with the measured levels at the symbol frequencies (16 measured levels in the present example). At 2140, the STS pointer value is tested to determine whether spectrogram buffer 2044 is full. If not, the STS pointer is incremented at 2144. If the spectrogram buffer is full, operation proceeds to 2148 which decodes the packet. Details of an embodiment of the packet decoding process will be described hereinafter. For the moment, it is noted that, while the length of the spectrogram buffer is matched to the length of the packet, the actual starting position of the packet within the spectrogram buffer is unknown at this juncture for decoding purposes. Subsequent to 2148, operation returns to 2114 to reset the STS pointer in preparation for the next packet.

Figure 30:
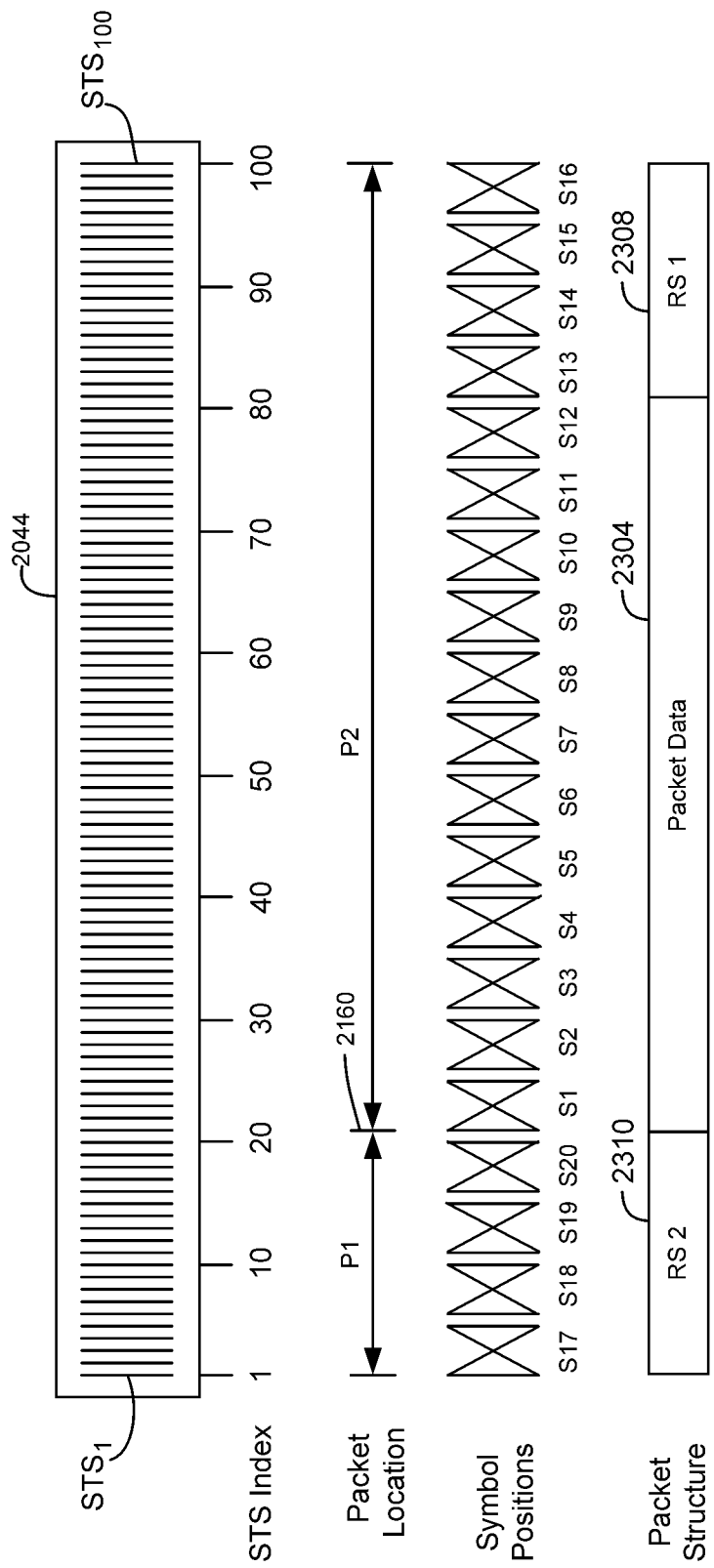
FIG. 30 is a diagrammatic illustration showing the contents of the spectrogram buffer and details relating to decoding the contents in accordance with the present disclosure.

FIG. 30 diagrammatically illustrates the contents of spectrogram buffer 2044 resulting from loading the buffer according to method 2100 of FIG. 29, as well as additional details relating to this content. In the present example, a packet structure comprising 20 symbols is utilized wherein each symbol is represented by 5 spectrogram time slices in the buffer. As discussed above, packets are received in what is essentially an asynchronous manner. The time period of the overall packet structure and each of its symbols is assured based on sufficient stability of the clocking on both the transmission and reception ends of the process. Data is typically loaded or streamed into the length of the spectrogram buffer beginning at an arbitrary slice of some arbitrary symbol within a current packet and extending into an initial portion of the next packet. The time slices for a given symbol can be consecutive within the spectrogram buffer or can wrap around the end of the spectrogram buffer. Accordingly, the packet structure can begin at an arbitrary packet start position somewhere in the spectrogram buffer. In the present example, a concluding portion of a first packet, designated as P1, is loaded into STS positions 1-20 and an initial portion of a second packet, designated as P2, is loaded into STS positions 21-100 to fill the spectrogram buffer. A packet start position 2160 is at STS 21. Thus, P2 includes symbols S1-S16 and P2 includes symbols S17-S20 comprising data from two consecutive, but distinct packets. In order to expedite synchronization of the process being described, transmitter 130 (FIG. 1) can be held motionless such that packet content is essentially constant from one packet to the next and the contents of the spectrogram buffer are essentially representative of a single packet. Data signal 122, for purposes of the present example, is encoded with a forward error correction code. While any suitable form of forward error correction code can be used, the present embodiment employs a Reed Solomon error correction code such that at least one block of error correction data accompanies measured and other data of interest. Thus, packet data 2304, as part of the packet structure shown in FIG. 30, can represent orientation parameters such as pitch and roll, as well as parameters that are indicative of the operational status of transmitter 130 (FIG. 1) such as, for example, temperature, pressure and battery status. The packet data is followed by an overall block of error correction data that is made up of a first portion of error correction data RS 1, indicated by the reference number 2308, and a second portion of error correction data RS 2, indicated by the reference number 2310 such that the overall block of correction data carries over from the end of the spectrogram buffer back to its beginning. Through the use of the Reed Solomon error correction code, a particular number of errors can be corrected for each packet, dependent upon the size of the block of error correction data. For purposes of the present example, the error correction code is capable of two corrections per packet although any suitable correction power can be utilized. It should be appreciated that the illustrated packet structure is not intended as being limiting and that any suitable packet structure can be utilized while remaining within the scope of the teachings that have been brought to light herein.

Figure 31:
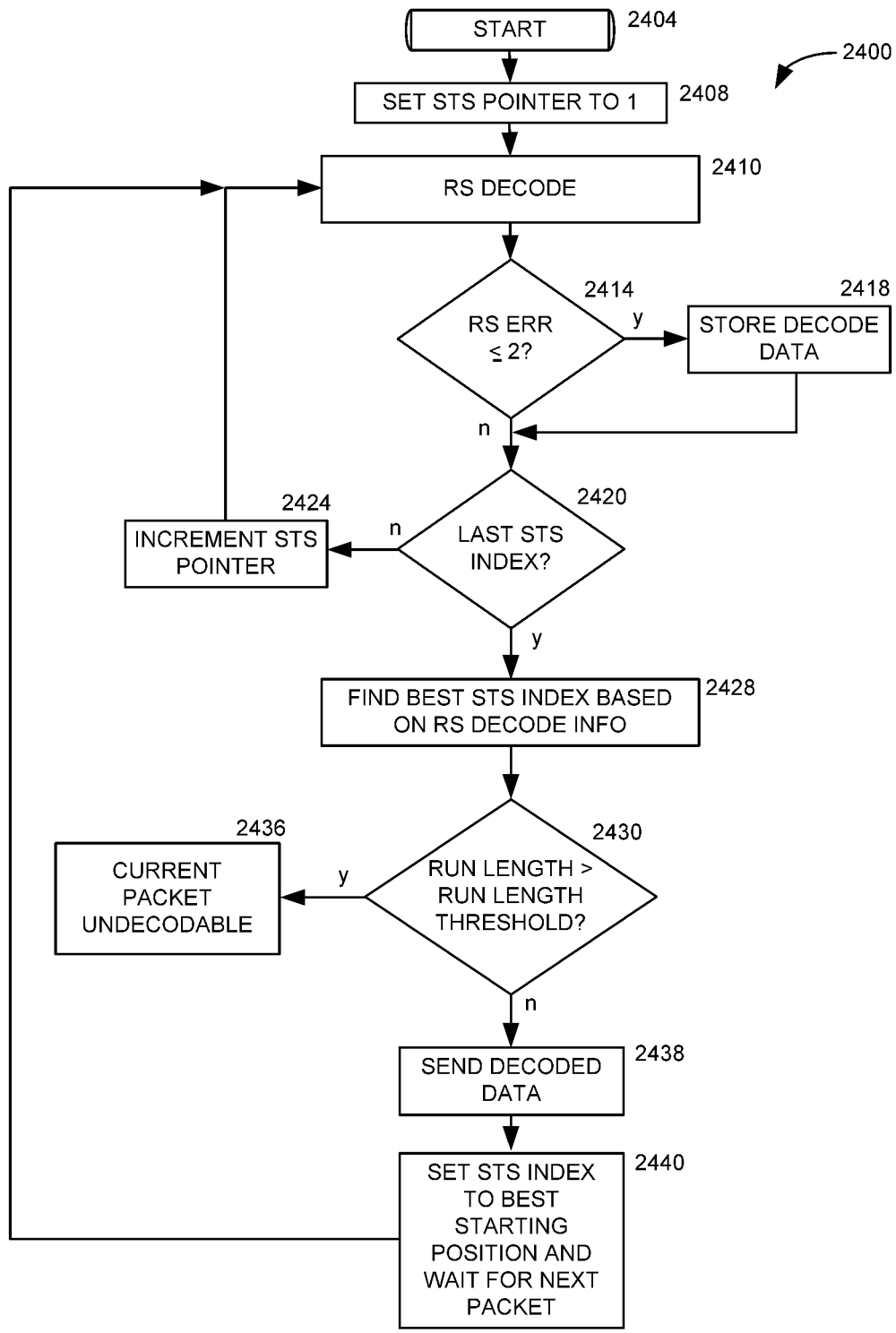
FIG. 31 is a flow diagram illustrating an embodiment of a decode process for recovering packet data from the spectrogram buffer of FIG. 30 in accordance with the present disclosure.

Attention is now directed to FIG. 31 in conjunction with FIG. 30. The former is a flow diagram illustrating an embodiment of a decode process, generally indicated by the reference number 2400, that can be employed as decode step 2148 of FIG. 29. The method begins at 2404 and proceeds to 2408 which sets the STS pointer to 1. The latter can be incremented or set to point to any STS index value (1-100) shown in FIG. 30. At 2410, decoding is applied under the assumption that the STS pointer is pointing to an STS slice that represents a slice within the first symbol of the overall packet structure. In particular, the data that is utilized by the Reed Solomon decode process starts with the data at STS 1 and utilizes every fifth subsequent slice within the spectrogram buffer. That is, for the initial decode, slices 1, 6, 11, 16, 21, 26, 31, 36, 41, 46, 51, 56, 61, 66, 71, 76, 81, 86, 91 and 96 are used. In this way, one slice from each of the 20 symbols in the overall packet structure contributes to an attempt to correctly decode what may be referred to hereinafter as a slice packet. Each slice of a slice packet is taken from the same slice position of each symbol. At 2414, the number of Reed Solomon error corrections for the decode attempt is compared to the maximum correction power of the correction code, which in the present example, is assumed to be 2. If the number of corrections is less than or equal to 2, operation proceeds to 2418 which stores the decoded data for the slice packet. Operation is then routed to 2420. On the other hand, if 2414 determines that the number of corrections is greater than 2, operation is routed directly to 2420 which determines whether the STS pointer is set to the last STS index value in the spectrogram buffer. If not, step 2424 increments the STS pointer by 1 and returns operation to RS Decode step 2410. According, by looping back to step 2410, an RS decode attempt is made starting from each STS index position in the spectrogram buffer. Each time that a successful decode is achieved, step 2418 stores the decoded data. Step 2414 stores the number of corrections that were made in association with each successfully decoded slice packet and can designate slice packets that were not successfully decoded as undecodable. Table 4, by way of non-limiting example, indicates the results of the decode attempts for slice packets 1-100. Successful decodes were achieved for slice packets 21-25, while all the remaining slice packets were found to be undecodable.

TABLE 4

| START SLICE | NUMBER OF CORRECTED ERRORS |
| --- | --- |
| 1-20 | ALL SLICE PACKETS UNDECODABLE |
| 21 | 1 |
| 22 | 0 |
| 23 | 0 |
| 24 | 0 |
| 25 | 2 |
| 26-100 | ALL SLICE PACKETS UNDECODABLE |

With reference to FIG. 30, it should be appreciated that slices 21-25 correspond to the set of slices that is associated with the first symbol (S1) of the packet. On this basis, the center of the initial symbol of the packet has been identified as corresponding to slice 23. While all five slice packets starting with slices 21-25 of symbol S1 might be decoded with no errors, it should be appreciated that errors can be introduced, for example, by noise. In such a case, one or more of the slices of one of these slice packets may have been loaded with zeros during method 2100 of FIG. 29.

Returning to the discussion of FIG. 31, once step 2420 detects the last STS index, operation proceeds to 2428 which finds the best STS index or slice packet based on the number of corrected errors in Table 4. In the present example, STS 23 is identified as corresponding to the center position of the starting symbol of the packet. In an embodiment, the data that is decoded for the slice packet associated with STS 23 can be considered as the best data for the packet since each slice of the slice packet originates from a center position of each symbol. With regard to the correction process, the likelihood of decoding erroneous data (i.e., incorrectly correcting the data) when using the described process is very low. Of course, the probably of incorrectly decoding or recovering data decreases in proportion to the correction power of the forward error correction code. Most often, the process either successfully decodes a slice packet, recovering the correct data, or identifies the slice packet as undecodable. Undecodable slice packets can result, for example, from noise bursts such that a significant number of slices in the slice packet are loaded with zeros. At 2430, the method checks whether the run length for the current packet exceeds a run length threshold. The latter can be set to the number of slices per symbol. Under high signal to noise ratio conditions (low ambient noise), the number of successful slice packet decodes should correspond to but not exceed the number of slices per symbol. In the present example, if more than five slice packets are successfully decoded for a packet, there is a high probability that one of slice packets was incorrectly decoded, since that slice packet inherently starts in a symbol that is not the first symbol of the packet. If the run length exceeds the run length threshold, the packet is identified as undecodable at 2436. If the run length does not exceed the run length threshold, the decoded data is stored and/or transferred for use by other processes at 2438. The data can include, by way of non-limiting example, pitch, roll, battery status, temperature and pressure. At 2440, the STS pointer is set to a starting position for decoding spectrogram buffer 2044. In one embodiment based on the example of FIG. 30 and Table 4, the starting position can be STS 21, the first slice of the packet). In another embodiment, the starting position can be STS 23, the center slice of the first symbol of the packet. In still another embodiment, once a given symbol in the spectrogram buffer has been identified as the first symbol of the packet, subsequent decoding can, at least initially, be limited to decoding the set of slice packets that is associated with the given symbol.

Referring to FIGS. 9 and 30, in an embodiment, receiver 20 can be configured to receive data signal 122 as characterized by an in-phase component, I, and a quadrature component, Q. On this basis, spectrogram buffer 2044 can be configured for storing two sets of magnitudes for the symbol frequencies of each STS. One set of magnitudes represents the in-phase components and the other set of magnitudes represents the quadrature components. Stated in another way, the magnitudes associated with each time slice are stored in a complex format. Although not required, Applicants have discovered a process that is beneficial for purposes of determining the average magnitude of each symbol frequency. First, the in-phase, I component, subject to noise, for each symbol frequency in a slice is averaged separately from an average that is determined for the quadrature, Q component, subject to noise, of each symbol frequency in the slice. Second, the two averages are added. Third, the square root of the sum is taken. This process can be expressed by equation (5), as follows:

$$\text{Symbol Freq Av Mag} = \sqrt{\left(\frac{1}{n}\sum_{i=1}^{n} I_i\right)^2 + \left(\frac{1}{n}\sum_{i=1}^{n} Q_i\right)^2} \qquad \text{EQN (5)}$$

In this equation, n is the number of samples of each symbol frequency, i is an index value, $I_i$ represents the set of in phase magnitudes of the symbol frequencies and $Q_i$ represents the set of quadrature magnitudes of the symbol frequencies. Using this technique, Applicants have recognized that the noise contributions measured as part of the in-phase and quadrature components tend to cancel one another. In contrast, a prior art process is characterized as:

$$\text{Symbol Freq Av Mag} = \frac{1}{n}\sum_{i=1}^{n} \sqrt{(I_i^2 + Q_i^2)} \qquad \text{EQN (6)}$$

Applicants submit that, because the $I_i$ and $Q_i$ values are subject to noise, the average value that is produced by equation (6) tends to rectify the noise and improperly add the noise to the resulting average value. By using equation (5), the determined average values more accurately track the actual ambient noise and signal strength of received symbols.

Based on FIGS. 28-31, as well as equation (5), it should be appreciated that Applicants have recognized and implemented an encode/decode process that is extraordinarily robust and does not require the use of a synchronization symbol or symbols, or sync bits within the packet itself. By eliminating the need for sync symbols or bits as part of the packet structure, the available bandwidth for data transmission is increased. The process further exhibits noise immunity that is submitted to be heretofore unseen in the field of horizontal directional drilling and associated inground operations.

The foregoing description of the invention has been presented for purposes of illustration and description. It is not intended to be exhaustive or to limit the invention to the precise form or forms disclosed, and other modifications and variations may be possible in light of the above teachings. Accordingly, those of skill in the art will recognize certain modifications, permutations, additions and sub-combinations of the embodiments described above.

What is claimed is:

1. A transmitter for use in conjunction with a horizontal directional drilling system that includes a drill string that extends from a drill rig to an inground tool that supports the transmitter such that extension and retraction of the drill string moves the inground tool through the ground during an inground operation, said transmitter comprising:
    an antenna;
    one or more sensors for generating one or more sensor signals;
    a processor configured for generating a multi-bit symbol stream based on the sensor signals; and
    an antenna driver arrangement for electrically driving said antenna to emit a dipole locating signal, as a depth signal, for aboveground reception at least for use in determining a depth of the inground tool and for electrically driving the antenna based on the multi-bit symbol stream to emit an electromagnetic symbol stream for aboveground recovery of the sensor signals.

2. The transmitter of claim 1 wherein said antenna driver arrangement includes a first driver for electrically driving the antenna to emit the depth signal and a second antenna driver for electrically driving the antenna to emit the electromagnetic symbol stream.

3. The transmitter of claim 1 wherein the multi-bit symbol stream includes at least four different symbols such that each symbol represents at least two bits.

4. The transmitter of claim 3 wherein the symbols are each transmitted at a symbol frequency that is unmodulated such that the different symbols are transmitted at different symbol frequencies.

5. The transmitter of claim 4 wherein said processor is configured for transmitting each of the symbol frequencies at a specified power level based on a power allocation such that one of the symbol frequencies is transmitted at a first power level that is different than a second power level for at least one other symbol frequency.

6. The transmitter of claim 1 further comprising:
    a direct digital synthesizer configured to generate the multi-bit symbol stream.

7. The transmitter of claim 6 wherein the direct digital synthesizer includes a first channel dedicated to generating a depth signal for additionally driving the antenna to emit a dipole locating signal and a second channel dedicated to generating the multi-bit symbol stream.

8. The transmitter of claim 7 wherein the depth signal is continuously transmitted at a fixed depth signal frequency, independent of the electromagnetic symbol stream.

9. The transmitter of claim 6 wherein the direct digital synthesizer is operable to generate a plurality of symbol frequencies across a wide frequency bandwidth and the direct digital synthesizer is configured to limit the symbol frequencies to a narrow bandwidth that is less than the wide frequency bandwidth and at least approximately matched to said antenna.

10. A transmitter for use in conjunction with a horizontal directional drilling system that includes a drill string that extends from a drill rig to an inground tool that supports the transmitter such that extension and retraction of the drill string moves the inground tool through the ground during an inground operation, said transmitter comprising:
    an antenna;
    one or more sensors for generating one or more sensor signals;
    a direct digital synthesizer configured for generating a symbol stream, made up of a plurality of fixed-frequency symbols, and the direct digital synthesizer is configured to customize a drive waveform shape for different symbol frequencies; and an antenna driver for electrically driving the antenna based on the symbol stream to emit an electromagnetic symbol stream for aboveground recovery of the sensor signals.

11. The transmitter of claim 10 wherein the direct digital synthesizer is configured to transmit across a wide frequency bandwidth in response to the sensor signals such that at least a portion of the wide frequency bandwidth is mismatched to the antenna and to customize the waveform shape at least to control transmitter power consumption associated with the different symbol frequencies which transmitter power consumption would otherwise vary across the wide frequency bandwidth as compared to a constant drive voltage and waveform.

12. The transmitter of claim 11 wherein the wide frequency bandwidth is at least approximately 9 KHz to 45 KHz.

13. The transmitter of claim 10 wherein the direct digital synthesizer includes a set of lookup tables defining a corresponding set of waveform shapes that cover the wide frequency bandwidth and the different symbol frequencies are customized based on the waveform shapes of the series of lookup tables.

14. The transmitter of claim 13 wherein the waveform shapes of the set of waveform shapes change responsive to increasing frequency from a sinusoidal shape to a stepped shape at a particular frequency in the wide frequency bandwidth.

15. The transmitter of claim 14 wherein an uppermost group of the waveform shapes above the particular frequency change from pulse-like to a square wave with increasing frequency.

16. The transmitter of claim 10 wherein said direct digital synthesizer includes a shaper to taper a magnitude of each symbol to start and end with a zero magnitude to limit spectral spreading of the symbols.

17. The transmitter of claim 10 wherein the direct digital synthesizer includes a frequency increment for generating the different symbol frequencies within an overall bandwidth of the transmitter such that one of the symbol frequencies is positionable midway between any given adjacent powerline harmonics of a 50 Hz and 60 Hz powerline frequency.

18. The transmitter of claim 17 wherein each symbol frequency includes a spectrum having a fundamental peak that falls between the given adjacent powerline harmonics and the spectrum exhibits a null at every powerline harmonic frequency of a given one of the 50 Hz and 60 Hz powerline frequencies.

19. A portable device for use in conjunction with a transmitter that is configured to move through the ground in a region during an operational procedure while transmitting a transmitter signal that is receivable by the portable device subject to electromagnetic noise that can vary within said region, said portable device comprising:
a receiver configured to (i) measure the electromagnetic noise and identify a set of symbol frequencies in response to the measured electromagnetic noise for subsequent transmission from said transmitter to form a multi-bit symbol stream based on the set of symbol frequencies, each of which multi-bit symbols corresponds to one of the symbol frequencies, at least to characterize sensor information relating to the operation of the transmitter, and (ii) receive the multibit symbol stream from the transmitter during the inground operation to recover the sensor information.

20. The portable device of claim 19 wherein the receiver is configured to automatically select the set of symbol frequencies.

21. The portable device of claim 19 wherein said receiver is configured to identify at least four symbol frequencies in said set.

22. The portable device of claim 19 further comprising:
an communication arrangement for transferring the identified symbol frequencies to said transmitter such that the transmitter thereafter transmits at the identified symbol frequencies.

23. The portable device of claim 19 wherein said receiver is configured to measure the electromagnetic noise by scanning using an incremental fixed frequency step across a frequency bandwidth to produce a set of noise measurements that characterize the noise across the frequency bandwidth at each incremental fixed frequency step.

24. The portable device of claim 23 wherein the incremental fixed frequency step is set to correspond to a symbol frequency resolution of said transmitter that defines a minimum frequency spacing between different symbol frequencies.

25. The portable device of claim 24 wherein the incremental fixed frequency step is 5 Hz.

26. The portable device of claim 23 wherein the frequency bandwidth covers a plurality of sub-bands such that the transmitter is limited to transmission of the symbol frequencies in a particular one of said sub-bands and the receiver is configured to identify said set of symbol frequencies in each sub-band.

27. The portable device of claim 26 wherein said receiver is configured to determine an average noise per sub-band based on the set of symbol frequencies identified for each sub-band.

28. The portable device of claim 26 further comprising:
a display for displaying the average noise per sub-band.

29. The portable device of claim 23 wherein the frequency bandwidth covers a plurality of sub-bands and the receiver is configured for operator modification of the set of symbol frequencies in at least a selected sub-band.

30. The portable device of claim 26 further comprising:
a display that is configured to display at least one statistical value of the noise for each sub-band in a frequency selection mode and to actively update the display for each sub-band based on a series of updates of the statistical value.

31. The portable device of claim 29 wherein said operator modification includes moving at least one symbol frequency of the set of symbol frequencies from the selected sub-band to a different sub-band.

32. The portable device of claim 31 including a display for displaying at least the selected sub-band and for zooming-in on the selected sub-band.

33. The portable device of claim 19 wherein said receiver is configured to measure the electromagnetic noise by scanning using an incremental fixed frequency step across a frequency bandwidth to produce a set of noise measurements that characterize the noise across the frequency bandwidth at each incremental fixed frequency step.

34. The portable device of claim 23 wherein said receiver is configured to characterize the noise in a set of frequency sub-bands that span the frequency bandwidth and to recommend a selected one of the frequency sub-bands for transmission of the symbol frequencies based on at least one statistical value of the noise corresponding to the recommended frequency sub-band as compared to the statistical value of the noise corresponding to other sub-bands.

35. The portable device of claim 34 wherein the statistical value is at least one of peak noise, minimum noise and standard deviation.

36. The portable device of claim 34 wherein the receiver recommends the selected sub-band based on a plurality of statistical values of the noise including average noise in conjunction with at least one of peak noise, minimum noise and standard deviation.

37. The portable device of claim 23 wherein each noise measurement in the set of noise measurements characterizes the noise as a vector sum to establish a three dimensional noise value.

38. The portable device of claim 23 configured to selectively display the noise for each noise measurement along a single receiving axis.

39. The portable device of claim 19 wherein said receiver is configured to measure the electromagnetic noise by scanning using an incremental fixed frequency step across a frequency bandwidth to produce a set of noise measurements that characterize the noise across the frequency bandwidth at each incremental fixed frequency and said receiver chooses the set of symbol frequencies based on at least one of average noise, standard deviation and peak noise across the set of noise measurements.

40. The portable device of claim 39 wherein said receiver is configured to apply a keep-out window that is centered on each symbol frequency to exclude any symbol frequency for which a noise peak falls within the keep-out window at a different incremental fixed frequency and violates a noise threshold.

41. The portable device of claim 19 wherein said transmitter transmits each symbol frequency with a symbol frequency spectrum and said receiver is configured to receive each symbol frequency with a receiver response that is matched to the symbol frequency spectrum.

42. The portable device of claim 41 wherein each symbol frequency spectrum includes a null at every powerline harmonic frequency of a given powerline frequency and the receiver response exhibits a corresponding null at every powerline harmonic frequency of the given one of a 50 Hz and 60 Hz powerline frequency such that electromagnetic noise at the powerline harmonic frequencies is suppressed by the receiver.

43. The portable device of claim 19 wherein said receiver is configured at least to determine a depth of the transmitter during the inground operation based on reception of the symbol frequencies.

44. The portable device of claim 19 wherein the receiver is configured at least to determine a depth of the transmitter during the inground operation based on a depth signal that is transmitted by the transmitter independent of the symbol frequencies.

45. A portable device for use in conjunction with a transmitter that is configured to move through the ground in a region during an operational procedure while transmitting a transmitter signal that is receivable by the portable device subject to electromagnetic noise that can vary within said region, said portable device comprising:
a receiver configured to (i) measure the electromagnetic noise and identify a set of symbol frequencies in response to the measured electromagnetic noise for subsequent transmission from said transmitter at least to characterize sensor information relating to the operation of the transmitter, (ii) receive the symbol frequencies from the transmitter during the inground operation to recover the sensor information and (iii) allocate a transmit power to each of the symbol frequencies.

46. The portable device of claim 45 further comprising:
a communication arrangement for transferring the transmit power allocated to each symbol frequency to said transmitter such that the transmitter thereafter transmits at the allocated transmit power for each symbol frequency.

47. The portable device of claim 45 wherein said receiver is configured for reallocating transmission power of the transmitter among the symbol frequencies on-the-fly to change transmission powers allocated to the symbol frequencies during operation of the transmitter.

48. The portable device of claim 45 wherein said receiver is configured for allocating transmission power of the transmitter among the symbol frequencies based on a running average signal strength of each symbol frequency.

49. The portable device of claim 45 wherein said receiver is configured for allocating transmission power of the transmitter unevenly to the symbol frequencies in a way that at least approximately maintains a target power consumption for the transmitter.

50. The portable device of claim 45 wherein said processor is configured for allocating transmission power of the transmitter to the symbol frequencies to reduce an overall power consumption of the transmitter at least as compared to transmitting all symbol frequencies at an equal power.

51. A portable device for use in conjunction with a transmitter that is configured to move through the ground in a region during an operational procedure while transmitting a transmitter signal that is receivable by the portable device subject to electromagnetic noise that can vary within said region, said portable device comprising:
a receiver configured to receive a packet structure from the transmitter that is made up of a plurality of multi-bit symbols in the symbol stream including at least one group of multi-bit symbols characterizing the sensor information as packet data and at least another group of multi-bit symbols serving as a block of error correction data, said packet data characterizing a set of sensor information relating to the operation of the transmitter during the inground operation;
a slicer for receiving each multi-bit symbol as a plurality of symbol slices that are spaced apart in time and each symbol slice includes a set of symbol frequency magnitudes including a magnitude for each symbol frequency;
a spectrogram buffer having a length made up of a series of slice positions, each of which slice positions is configured to store at least one set of said symbol frequency magnitudes, and the length of the spectrogram buffer is sufficient to store a total number of symbol slices corresponding to a time duration of the packet structure;
a time slice switch for routing the symbol slices to the slice positions of the spectrogram buffer to sequentially and selectively store the set of symbol frequency magnitudes associated with each successive symbol slice; and
a decoder configured to detect, as part of recovering the packet data, a start symbol of the packet structure in the spectrogram buffer based on the block of error correction data.

52. The portable device of claim 51 further comprising:
a threshold detector for driving the time slice switch to exclude the symbol frequency magnitudes of any given symbol slice that is subject to a noise burst, based on a noise threshold, from being loaded sequentially into a given one of the spectrogram buffer slice positions.

53. The portable device of claim 52 wherein the threshold detector is configured to load the given symbol slice position in the spectrogram buffer with zeros.

54. The portable device of claim 51 wherein said decoder is configured to recover the packet data without a synchronization symbol as part of the packet structure.

55. The portable device of claim 51 wherein each symbol is characterized by n symbol slices in the spectrogram buffer and said decoder is configured to initiate a decode attempt starting from each slice position in the spectrogram buffer and to record a number of correction errors for each slice position with each decode attempt based on a slice packet starting from a given slice position along with every $n^{th}$ slice position from the given slice position in the length of the spectrogram buffer such that the number of correction errors for each slice packet is indicative of the position of the start symbol in the spectrogram buffer.

56. The portable device of claim 51 wherein said spectrogram buffer is configured to store the set of symbol frequency magnitudes for each time slice in a complex number format.

57. A system for use in horizontal directional drilling that includes a drill string that extends from a drill rig to an inground tool such that extension and retraction of the drill string moves the inground tool through the ground during an inground operation, said system comprising:
 a transmitter that is supported by the inground tool including an antenna, one or more sensors for generating one or more sensor signals, a processor configured for generating a multi-bit symbol stream based on the sensor signals, and an antenna driver for electrically driving the antenna to emit an electromagnetic symbol stream based on the multi-bit symbol stream; and
 a portable device including a receiver configured to receive the multibit symbol stream in a normal mode during the inground operation to recover the set of sensor information subject to the electromagnetic noise;
 wherein said receiver is operable in a frequency selection mode to measure the electromagnetic noise, absent the transmission of said electromagnetic symbol stream, and identify a set of symbol frequencies based on the measured electromagnetic noise for subsequent transmission from said transmitter to form the multi-bit symbol stream based on the set of symbol frequencies, each of which multi-bit symbols corresponds to one of the symbol frequencies.

58. A transmitter for use in conjunction with a horizontal directional drilling system that includes a drill string that extends from a drill rig to an inground tool that supports the transmitter such that extension and retraction of the drill string moves the inground tool through the ground during an inground operation, said transmitter comprising:
 an antenna;
 one or more sensors for generating one or more sensor signals;
 a modulator for generating at least one modulated data frequency at a carrier frequency based on the sensor signals;
 a depth tone generator for producing an unmodulated depth tone frequency that is twenty or more times less than the carrier frequency; and
 an antenna driver for electrically driving at least one antenna to emit the depth tone frequency and the carrier frequency for aboveground detection of the depth tone frequency and for recovery of the sensor signals from the modulated data frequency.

59. The transmitter of claim 58 wherein said depth tone frequency is less than or equal to 1.5 KHz.

60. The transmitter of claim 59 wherein the single carrier frequency is in a range from 30 KHz to 45 KHz, inclusively.

61. The transmitter of claim 58 further comprising:
 a direct digital synthesizer including a first channel serving as the depth tone generator to generate the depth tone frequency and a second channel that generates the single carrier frequency.

62. A portable device for use in conjunction with a horizontal directional drilling system that includes a drill string that extends from a drill rig to an inground tool such that extension and retraction of the drill string moves the inground tool through the ground during an inground operation and the inground tool supports a transmitter that transmits an electromagnetic signal for detection by the portable device such that extension and retraction of the drill string moves the inground tool through the ground during an inground operation, said portable device comprising:
 a receiver for detecting the signal with the transmitter above ground in a first operational mode and below a surface of the ground in a second operational mode; and
 a processor configured for selective operation in (i) said first mode to determine an above ground range from the portable device to the transmitter based on an above ground measured signal strength of said electromagnetic signal and a surface effect compensation, and (ii) said second mode with the transmitter in the ground to determine a depth of the transmitter below the surface based on a below ground measured signal strength of said electromagnetic signal.

63. The portable device of claim 62 wherein said second mode is configured to establish the determined depth without applying any compensation.

64. The portable device of claim 62 wherein the second mode is configured to apply a form of compensation other than surface effect compensation to the determined depth to establish a compensated below ground depth.

65. The portable device of claim 64 wherein the form of compensation is skin effect compensation.

66. The portable device of claim 62 wherein the surface effect compensation is determined based at least approximately on a cube of the determined above ground range to establish the surface effect compensated range.

67. The portable device of claim 66 wherein the surface effect compensation is determined additionally based on a calibration constant.

68. The portable device of claim 62 wherein a surface effect compensated above ground range ($AGR_{COMP}$) is determined as:

$$AGR_{COMP} = d_{ss}(1 + kd_{ss}^2)$$

where $d_{ss}$ is the above ground range from the portable device to the transmitter with the transmitter above the surface of the ground based on an above ground measured signal strength of said signal and k is a calibration constant.

69. The portable device of claim 68 wherein k is determined based on a known above ground distance between the portable device and the transmitter and a value for d—that is determined at the known above ground distance.

* * * * *